(12) United States Patent
Herz et al.

(10) Patent No.: US 12,506,919 B2
(45) Date of Patent: Dec. 23, 2025

(54) CONFIGURABLE CONTENT FOR GROUPED SUBSETS OF USERS

(71) Applicant: Warner Bros. Entertainment Inc., Burbank, CA (US)

(72) Inventors: Justin Herz, Burbank, CA (US); William Zajac, Burbank, CA (US); Ha Nguyen, Burbank, CA (US); Arvel A. Chappell, III, Burbank, CA (US); Gregory Gewickey, Burbank, CA (US); Pamela J. Allison, Burbank, CA (US); Rana Brahma, Burbank, CA (US); Prashant Abhyankar, Burbank, CA (US); Michael Zink, Burbank, CA (US); Shaun Novak, Burbank, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 0 days.

(21) Appl. No.: 18/740,721

(22) Filed: Jun. 12, 2024

(65) Prior Publication Data
US 2024/0333997 A1    Oct. 3, 2024

Related U.S. Application Data

(63) Continuation of application No. 17/311,682, filed as application No. PCT/US2019/065095 on Dec. 6, 2019, now Pat. No. 12,015,817.
(Continued)

(51) Int. Cl.
*H04N 21/414* (2011.01)
*H04N 21/442* (2011.01)
(Continued)

(52) U.S. Cl.
CPC . *H04N 21/41422* (2013.01); *H04N 21/44218* (2013.01); *H04N 21/4532* (2013.01); *H04N 21/458* (2013.01); *H04N 21/8549* (2013.01)

(58) Field of Classification Search
CPC ....... H04N 21/41422; H04N 21/44218; H04N 21/4532; H04N 21/458; H04N 21/8549;
(Continued)

(56) References Cited

U.S. PATENT DOCUMENTS 9,272,708 B2   3/2016   Cuddihy
2011/0214046 A1   9/2011   Haberman
(Continued)

FOREIGN PATENT DOCUMENTS

CN    206910325 U    1/2016
CN    108574701 A    9/2018
(Continued)

OTHER PUBLICATIONS

Extended European Search Report dated Jun. 20, 2022 for the corresponding European Application No. 19892800.4.
(Continued)

*Primary Examiner* — Anthony Bantamoi
(74) *Attorney, Agent, or Firm* — Bookoff McAndrews, PLLC

(57) ABSTRACT

Methods and apparatus for personalizing a vehicle with a sensory output device include receiving, by one or more processors, a signal indicating an identity or passenger profile of a detected passenger in or boarding the vehicle, accessing preference data and geographic location data for the passenger, and selecting sensory content for delivery to the passenger in the vehicle based on the preference data and geographic location data. Methods and apparatus for producing video customized for a preference profile of a person or cohort include associating each of the stored video clips
(Continued)

with a set of characteristic parameters relating to user-perceivable characteristics, receiving user profile data relating to the person or cohort, selecting video clips from the data structure based at least partly on the user profile data, and automatically producing a video including the preferred video clips.

20 Claims, 23 Drawing Sheets

Related U.S. Application Data

(60) Provisional application No. 62/777,025, filed on Dec. 7, 2018.

(51) Int. Cl.
*H04N 21/45* (2011.01)
*H04N 21/458* (2011.01)
*H04N 21/8549* (2011.01)

(58) Field of Classification Search
CPC ............ H04N 21/441; H04N 21/4524; H04N 21/854; G06Q 30/0265; G06Q 30/0269
See application file for complete search history.

(56) References Cited

U.S. PATENT DOCUMENTS

| | | |
|---|---|---|
| 2014/0111629 A1 | 4/2014 | Morris et al. |
| 2014/0188920 A1* | 7/2014 | Sharma .................. G06F 17/30 |
| 2015/0282769 A1 | 10/2015 | Song et al. |
| 2015/0312632 A1* | 10/2015 | Hoctor ............... H04N 21/4667 |
| 2016/0364678 A1 | 12/2016 | Cao |
| 2017/0055017 A1 | 2/2017 | Christie et al. |
| 2017/0309072 A1 | 10/2017 | Li et al. |
| 2018/0357233 A1* | 12/2018 | Daze ................. G06F 17/30029 |

FOREIGN PATENT DOCUMENTS

| | | | |
|---|---|---|---|
| FR | 3016459 A1 * | 7/2015 | ....... G06F 17/30707 |
| JP | 2016-197273 A | 11/2016 | |
| KR | 10-2013-0047915 A | 5/2013 | |
| KR | 10-1654256 B1 | 9/2016 | |
| KR | 10-1765151 B1 | 8/2017 | |
| KR | 10-1894573 B1 | 9/2018 | |

OTHER PUBLICATIONS

Extended European Search Report dated Oct. 11, 2022 for the corresponding European Application No. 19892800.4.

* cited by examiner

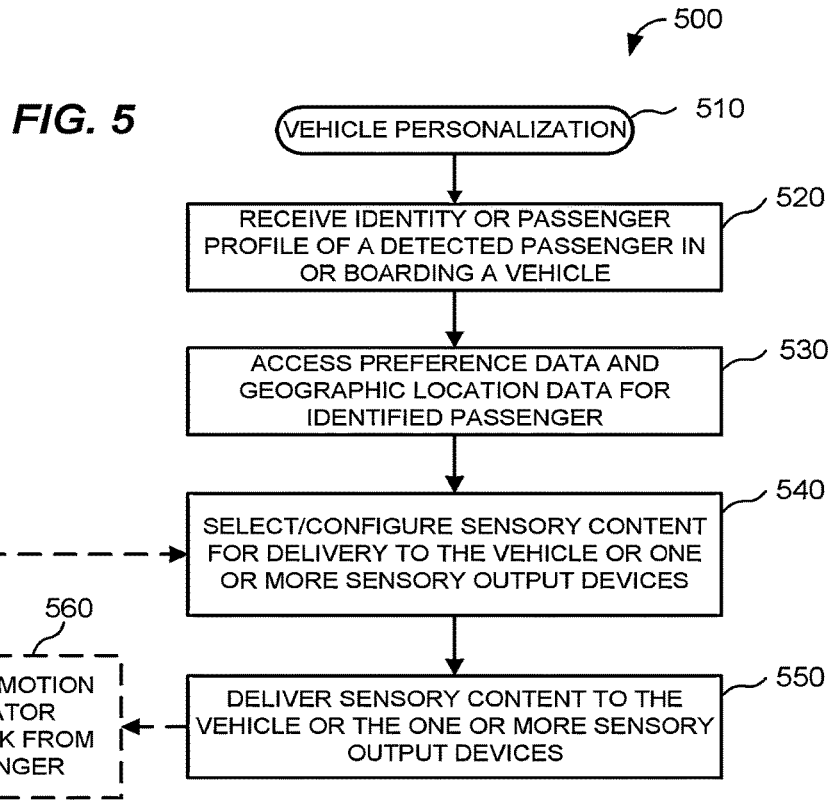
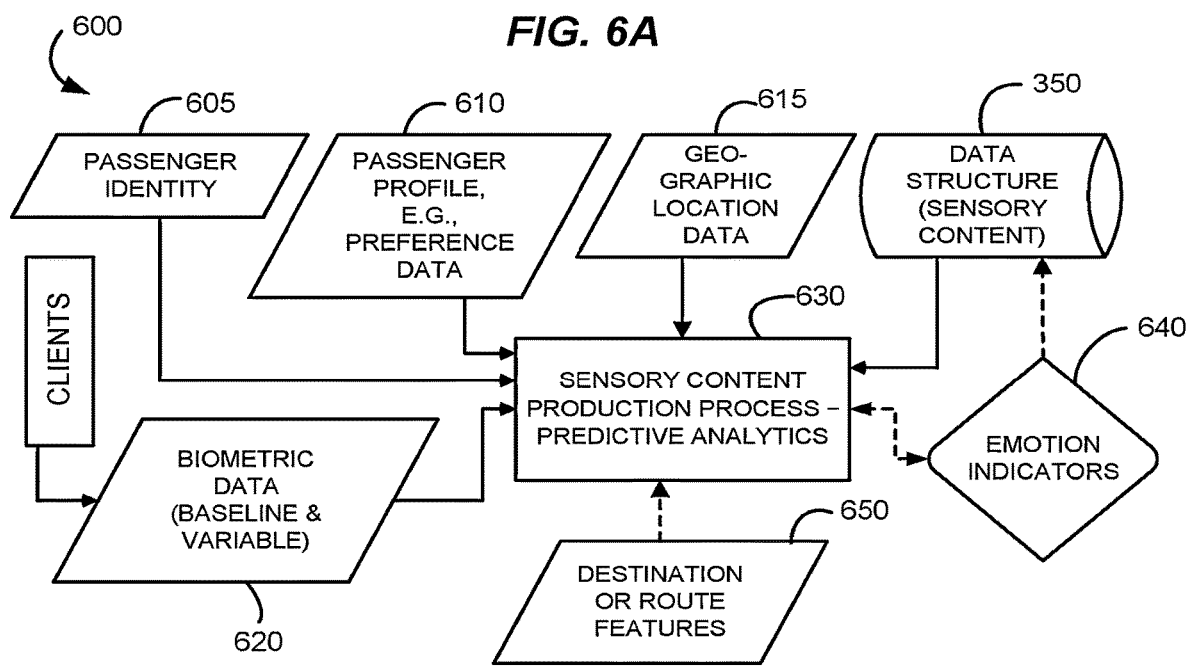

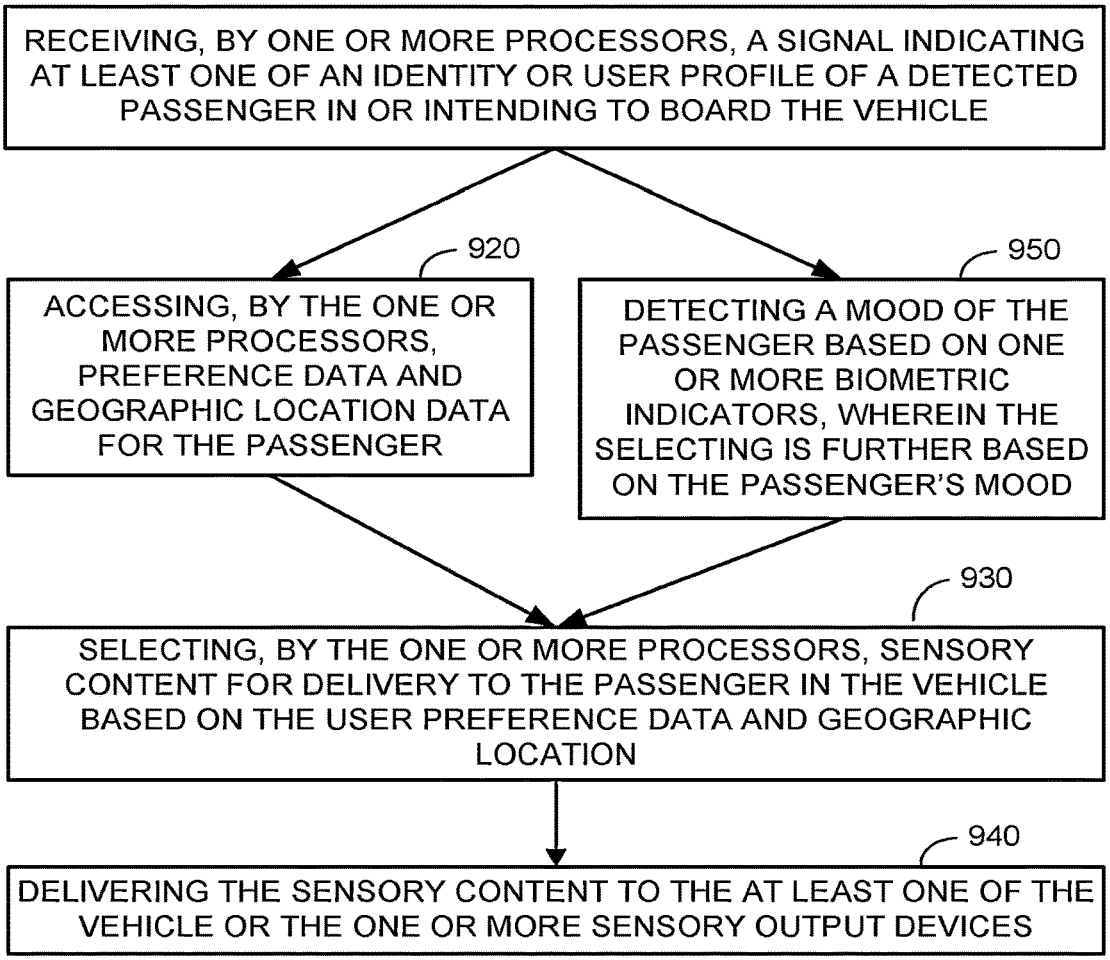
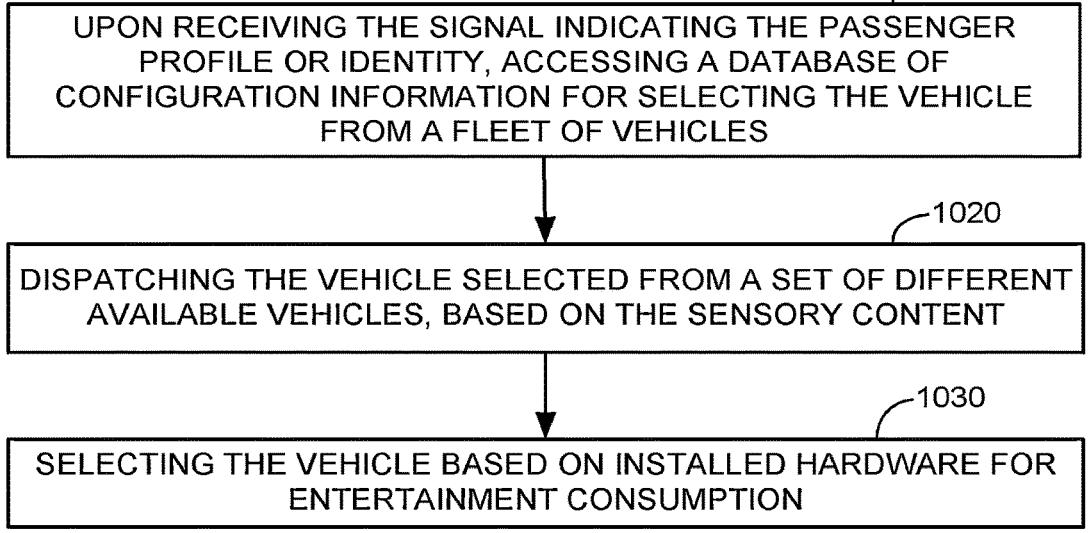

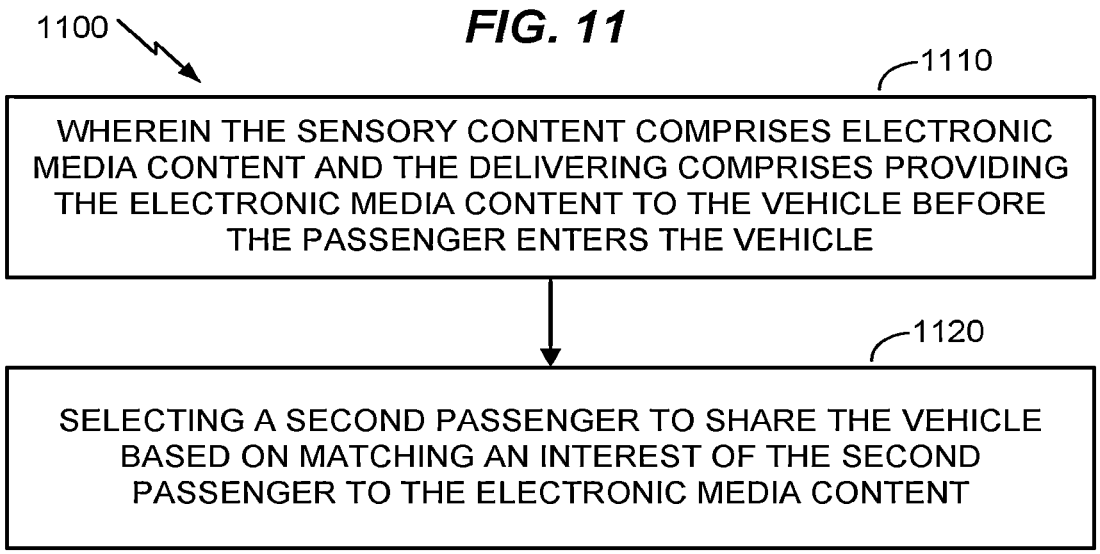
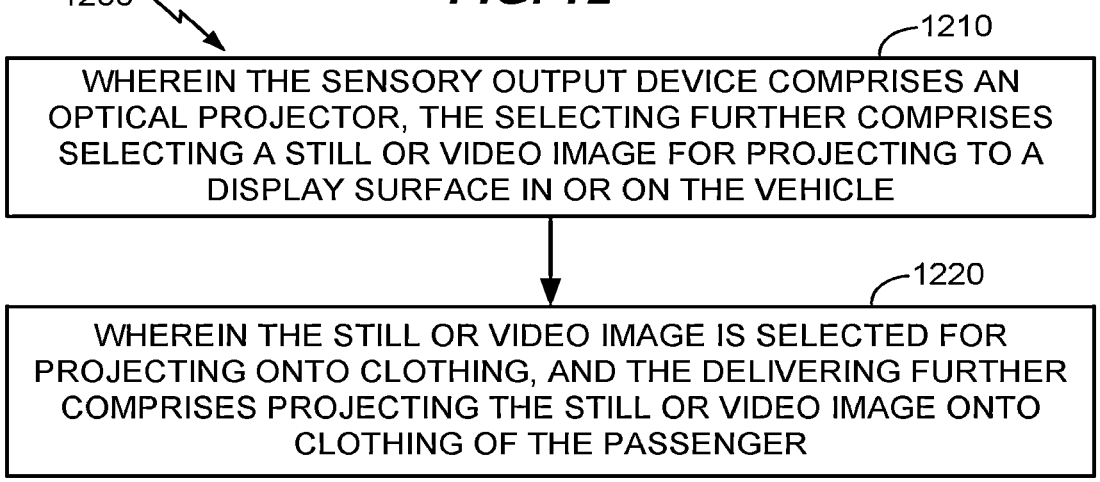
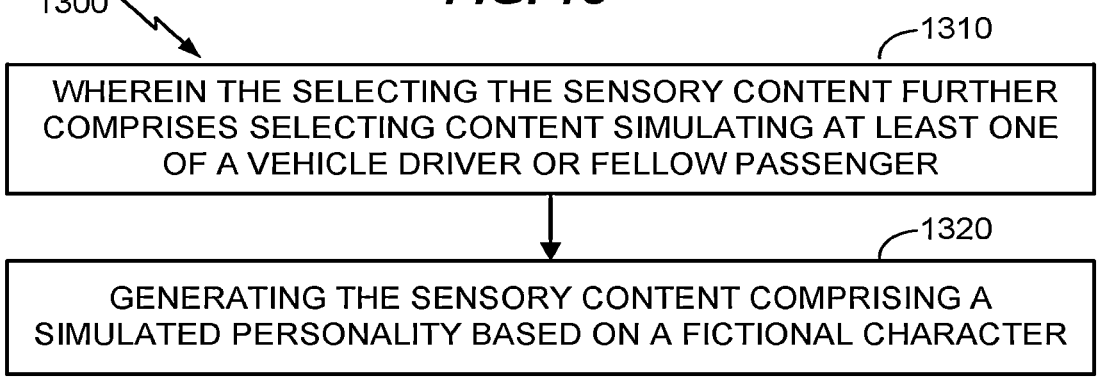

CONFIGURABLE CONTENT FOR GROUPED SUBSETS OF USERS

CROSS-REFERENCE TO RELATED APPLICATION(S)

This patent application is a continuation of and claims the benefit of priority to U.S. application Ser. No. 17/311,682, filed on Jun. 7, 2021, the entirety of which is incorporated in its entirety herein by reference.

FIELD

The present disclosure relates to methods and apparatus for personalizing audio-video or other sensory content presented in a vehicle, based on a trip profile that may include passenger profiles and biometric response data.

BACKGROUND

As people increasingly use ride-sharing services for transportation and investment in self-driving cars increases, they increase consumption of content consumption during transportation. Already, consumers can choose their own entertainment from channels available through their car's audio system, their smartphone's interface, or a seatback entertainment system as in airplanes, buses and trains. Passengers can watch their vehicle as it navigates towards its destination. But they cannot personalize their vehicles or content consumed during travel except by manual effort.

Personalized electronic content is known in several platforms. Branching narratives in computer-generated audio-video entertainment date back to the 1980's or earlier. Sophisticated video games of the present day blur the boundary between narrative and interactive entertainment, blending branching and interactive techniques. Immersive entertainment technologies such as virtual and augmented reality bring further opportunities to enthrall viewers. Data mining by machine learning enables discovery of new correspondences between low-level data and various targets, including consumer preferences and propensities. Proliferation of mobile phones and Internet of Things (IoT) devices drive an explosion of network-connected sensors. Much data for vehicle personalization, including personalization of electronic content available in vehicles, is available from various sources. But technologies for using this content to deliver personalized transit experiences are rudimentary.

It would be desirable, therefore, to develop new methods and other new technologies for personalizing electronic content and other sensory aspects of vehicular travel during or in relation to specific trips by specific passengers, that overcome these and other limitations of the prior art and deliver more compelling entertainment experiences for the audiences of tomorrow.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a vehicle may include one or more sensory output devices communicatively coupled to a server. A computer-implemented method for personalizing the vehicle may include: receiving, by one or more processors, a signal indicating at least one of an identity or passenger profile of a detected passenger in, boarding, or waiting for the vehicle; accessing, by the one or more processors, preference data and geographic location data for the passenger; selecting, by the one or more processors, sensory content for delivery to the passenger in the vehicle based on the user preference data and geographic location data; and delivering the sensory content to the at least one of the vehicle or the one or more sensory output devices. A sensory output device for example, may be or include a display screen, a projector, an audio system, a tactile interface device, a scent generator, a mixed reality headset, visor or glasses, or a port to a smartphone, notepad computer, or similar mobile device.

The method may further include, upon receiving the signal accessing a database of configuration information for the vehicle. The method may further include dispatching the vehicle selected from a set of different available vehicles, based on the sensory content. The method may further include selecting the vehicle from the set of available vehicles based on installed hardware for entertainment consumption.

In an aspect, the method may further include detecting a mood of the passenger based on one or more biometric indicators, wherein the selecting is further based on the passenger's mood.

In an aspect, the sensory content may include electronic media content and the delivering includes providing the electronic media content to the vehicle before the passenger enters the vehicle. The method may further include selecting a second passenger to share the vehicle based on matching an interest of the second passenger in the electronic media content.

In an aspect, the sensory output device may include an optical projector, and the selecting may further include selecting a still or video image for projecting to a display surface in or on the vehicle. In an aspect of the method, the still or video image may be selected for projecting onto clothing, and the delivering further includes projecting the still or video image onto clothing of the passenger.

In an aspect of the method, the selecting the sensory content may further include selecting content simulating at least one of a vehicle driver or a fellow passenger. The method may further include generating the sensory content for a simulated personality based on a fictional or actual celebrity character.

In another aspect of the disclosure, a computer-implemented method produces video customized for a preference profile of a person or cohort. The method may include: maintaining a data structure of video clips suitable for including in a video; associating each of the video clips with a set of characteristic parameters relating to user-perceivable characteristics; receiving user profile data relating to a person or group of people via a computer network; selecting preferred video clips from the data structure based at least partly on the user profile data; automatically producing a video including the preferred video clips; and providing the video to a video player device operated by the person or by at least one of the group of people.

In an aspect of the method, the user profile data relates to the group of people, and the method further includes determining membership in the group based on one or more of demographic or psychographic parameters.

In an aspect of the method, the user profile data relates to the group of people, and the method further includes determining membership in the group based on history of digital content consumption.

In an aspect of the method, associating each of the video clips with the set of characteristic parameters may include associating each of the video clips with data indicating compatibility with adjacent clips. For example, in the method, the data indicating compatibility with adjacent clips identifies one of a sequence number or sequence group number for the clip. In an aspect of the method, automatically producing the video may include placing selected clips in one of a sequence order.

In an aspect of the method, associating each of the video clips with the set of characteristic parameters may include associating each of the video clips with a parameter indicating at least one of a clip length, an actor's identity, an actor's dialog, a pace, a mood, technical format, a color temperature, a scene position, an intensity, or special effects metric.

In an aspect of the method, the video is a trailer promoting entertainment content.

The method may further include developing clip selection criteria at least in part by correlating viewer response metrics to the video clip parameters and user profile data using a predictive analytics machine learning algorithm. The method may further include supplying sample input and output data to the predictive analytics machine learning algorithm, wherein the sample input may include combinations of video clip parameters for one or more videos and user profile data, the sample output may include the viewer response metrics after viewing the video, and the output identifies positive correlations between sample input, user profile and desired viewer response. In an aspect of the method, selecting the preferred video clips is performed in part by automatically applying the clip selection criteria and in part by manual selection.

The foregoing methods may be implemented in any suitable programmable computing apparatus coupled to a sensory output device such as a video player device, by provided program instructions in a non-transitory computer-readable medium that, when executed by one or more computer processors (hereinafter collectively or individually may be referred to as "processor"), cause the apparatus to perform the described operations. The processor may be local to the apparatus and user, located remotely, or may include a combination of local and remote processors. An apparatus may include a computer or set of connected computers installed in a vehicle, or portable devices (e.g., smartphones or notepad computers) coupled to a node or network via an access point in a vehicle or otherwise linked to a vehicle for a specific trip. A sensory output device may include, for example, a personal computer, mobile phone, notepad computer, projector, haptic interface, scent dispenser, virtual reality device, or augmented reality device. In some implementations, the sensory output device may include hardware elements or configurations located on or in a vehicle, for example: a 4D film presentation system and/or any of its components, such as a motion generating system or moving seat, e.g., D-BOX seats by D-BOX Technologies Inc. (Canada) or MX4D® theatre seats by MediaMation, Inc. (Torrance, CA); a noise cancellation technology such as Quiet Bubble™ by Silentium Ltd. (Israel); mixed reality gears and equipments, e.g., a VR vest such as KOR-FX by Immerz, Inc. (Cambridge, MA); a display screen configuration including one or more displays, tactile gear/interface, olfactory interface, haptic devices, pneumatic devices, hydraulic devices, motorized devices, a port to a mobile phone, or other output devices for stimulating or altering human perception in response to encoded electronic signals.

As used herein, "vehicle" is defined as a movable physical body or structure that may house one or more persons including a passenger as defined herein, for example, an autonomous vehicle; a passenger car, an amusement ride; an interior of transportation vessels such as an elevator, taxi, airplane, bus, etc.; a movable kiosk; a movable house, (e.g., a motorhome, a camper, or a traditional home); a mobile office space, and the like, with uses that may include transportation of people and other uses when stationary. In an aspect, the vehicle may be a connected vehicle or other vehicle coupled to a mobile mesh network. As the connected vehicle travels along a route, it may connect to and exchange data with servers of a mobile mesh network or other network based at least on proximity to the vehicle, quality of wireless connectivity between each prospective mobile mesh network server and a receiver, for example a media player within the connected vehicle, or servers at places of interest. As used in the present disclosure, connected vehicles may be referred to simply as vehicles and may include various suitable types of vehicles, whether driven autonomously or driven by a person. Connection and disconnection of nodes of the mobile mesh network may themselves be geographic location data.

Other elements of the apparatus may include, for example, an audio output device and a user input device, which participate in the execution of the method. An apparatus may include, or may couple to, a virtual or augmented reality device, such as a headset or other display that reacts to movements of a user's head and other body parts. The apparatus may include, or may couple to, biometric sensors that provide data used by a controller to control details of the cinematic content.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 5 is a flow chart illustrating high-level aspects of a method for personalizing sensory output for a vehicle or in relation to a vehicular trip.

FIG. 6A is a block diagram illustrating high-level aspects of a system or apparatus for personalizing sensory output for a vehicle or in relation to a vehicular trip.

FIG. 9 is a flow chart illustrating aspects of a method for personalizing sensory output for a vehicle or in relation to a vehicular trip.

FIGS. 10-13 are flow charts illustrating further optional aspects or operations of the method diagrammed in FIG. 9.

DETAILED DESCRIPTION

Various aspects are now described with reference to the drawings. In the following description, numerous specific details are set forth in order to provide a thorough understanding of one or more aspects. It may be evident, however, that the various aspects may be practiced without these specific details. In other instances, well-known structures and devices are shown in block diagram form to facilitate describing these aspects.

Figure 1:
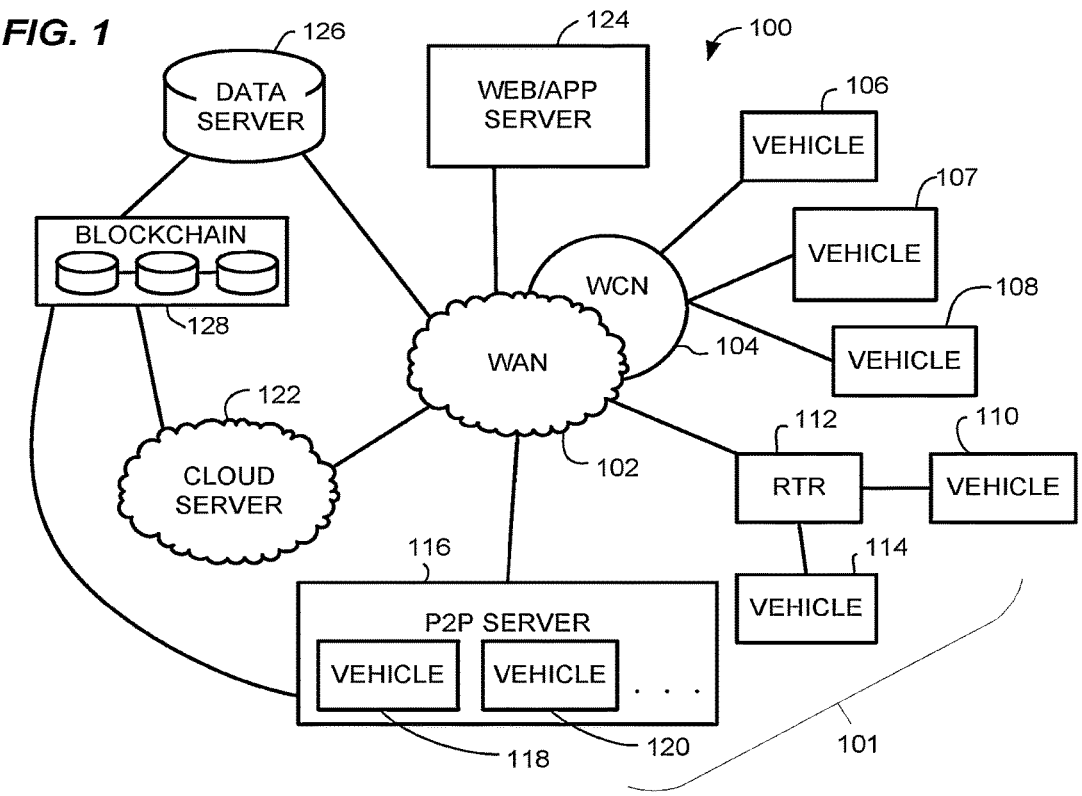
FIG. 1 is a schematic block diagram illustrating aspects of a system and apparatus for personalizing sensory content output for a vehicle or in relation to a vehicular trip, coupled to one or more vehicular systems and client devices.

FIG. 1 illustrates aspects of an exemplary environment 100 in which a system and apparatus for implementing the method for personalizing a vehicle including one or more sensory output devices communicatively coupled to a server, or producing video customized for a preference profile of a person or cohort, may operate. In some aspect, the method allows for personalizing sensory content such as multimedia or other content and parameters of a vehicle or its space, in which the content may be viewed on the fly, based on user preferences and environmental information, that may be implemented in the vehicle-server environment 100. Other architectures may also be suitable.

The methods may include using a passenger profile to select or configure sensory contents. As used herein, "passenger profile" or "user profile data" is defined as profiling data pertaining to a passenger and includes, e.g., physical location/city of the passenger, passenger's surrounding context such as weather and temperature (e.g., sunny, raining, snowing, daytime/nighttime, hot vs. cold, etc.), social trends in general or in the passenger's own social network, personal attributes of the passenger such as age/sex/height/weight/race, favorite actors, fictional characters or other celebrities, passenger's status in a role-play game, or passenger status in a real or fantasy social network. Passenger profile may also include the reward status or points earned in one or more venues of a franchise (e.g., retail stores, amusement parks, live events, etc.) hosted or sponsored by an entertainment company, and subscription status in a subscription-based membership service, e.g. Gold level in DC Universe by Warner Bros. Entertainment Inc. Passenger profile information may be used to select or configure sensory contents to satisfy at least one of the passenger's interests, preferences, or safety needs. Other passenger profile information used may include travel context data regarding the traveler relevant to a purpose of a trip, for example time, place, booking information, stated reason, such that the media components are directed to furthering the purpose of the trip, for example, by preparing the travelers for the destination or revisiting an experience at the origin or places along the route. A processor may determine a purpose of a trip based on the origin or destination, or both, for example, a theme park, a conference, an outdoor activity, a sporting event, a musical performance, a dramatic performance, a cinematic experience, a shop or collection of shops, a restaurant or collection of restaurants, a social event, or a holiday celebration. In an aspect, the purpose of the trip may be determined or received from a tour application.

In a network architecture, sensor data may be collected and processed locally, and used to control streaming of sensory content to the client(s) from a network source. In some embodiments, sensory content may be controlled locally, and log data provided to a remote server for improving predictive analytics algorithms and tracking use. As used herein, "sensory content" is defined as digital computer-readable content for generating output from a sensory output device, and "predictive analytics algorithm" may include any one or both of a machine-learning algorithm or a rules-based algorithm.

A processor may provide sensory content to a user/passenger/player actor via software or hardware or both during a time spent in a vehicle (e.g., a trip in an autonomous vehicle, or an enjoyment of a simulated ride or 4D cinematic experience augmented with environmental effects such as motion, tactile effects, haptics, scents/odors, light/strobes, sound, fog machine, bubbles, snow, water sprays, wind/air, humidity, etc.). Sensory content may include, for example, electronic media content for generating output such as audio, video and text; virtual or augmented reality (AR/VR) content; vehicle simulation; image projection/projection mapping (e.g., on clothing, vehicle interior/exterior, etc.); surround screen; olfactory or tactile stimulus; merchandise; vehicle environment (e.g., seat/space configuration), climate control, noise cancellation, etc.); output from a robot or simulated character (e.g., driver/passenger/user avatar or simulated personality such as a cartoon character by way of image being displayed, audio being played, etc.); and the like.

In some embodiments, providing sensory content may include arranging for delivery of a physical article, for example an action figure or a configuration of the vehicle itself. For example, a processor may arrange for delivery of a content for simulating a celebrity or fictional character or such character's vehicle. For further example a processor may arrange for delivery of a vehicle simulating a "Presidential Limousine" or "Batmobile" in respect to the vehicle appearance, interior configuration, items and objects within the vehicle, or other features. In some implementations, the sensory content may include simulation or avatar of a vehicle driver, a fellow passenger, or a companion. For example, the simulation or avatar may include simulating at least one of the vehicle driver or a fellow passenger for furthering a narrative or for providing companionship such as a conversational counterpoint for passengers. In other examples, the sensory content may include a social robot that can be configured to consider passenger preferences and trip information, such as a persona of the vehicle configuring itself and then displaying a visage with its unique personality on the vehicle's main display screen. In some implementations, a passenger's smartphone may contain an application that simulates a character from movies, online video, television, video gaming or other fiction. When the application senses or receives a message informing it that the passenger is traveling, it may activate the character simulation and operate the simulation to entertain or inform the passenger using the voice and mannerisms of the character. In some embodiments, the passenger's smartphone or similar device may supply a vehicle-embedded display or other sensory output device, e.g. by showing a relevant video or other digital content stored on or otherwise accessible via the smartphone or similar device.

In other aspects, the sensory content may be, or may include, digital audio-video content that is arranged at least in part by a script designed to entertain and evoke emotions in viewers according to a scheme for narrative tension sometimes referred to herein as an "emotional arc." The sensory content may also be configured to support interactive features resembling video game features or may be devoid of interactive features except for responding to data indicative of user neurological or neurophysiological states.

As used herein, users (e.g., passengers) are always consumers of sensory content from which a system node collects real-time emotional response data for use in controlling sensory output. When actively participating in content via an avatar or other agency, users may also be referred to herein as player actors. Viewers are not always users. For example, a bystander may be a passive viewer that does not interact with the content via an emotional response. As used herein, a "node" includes a client or server participating in a computer network.

When interacting with sensory content production process (e.g., sensory content AI) by expression of emotion, the user is a player actor in the sensory content AI narrative. Player actors can interact with content in various ways, including for example natural language communication with NPCs and other player actors, locomotion and virtual locomotion within an immersive experience, and emotional feedback loop interaction with other player actors, NPCs and the narrative environment.

Users of sensory content, e.g., passengers, may react passively during viewing by natural expression of their emotions. As used herein "passenger" includes all vehicle occupants to the extent their attention will not be diverted by entertainment from safely driving the vehicle, including non-drivers for all forms of content described herein and drivers only for non-distracting content, including mainly hands-free audio, imagery, olfactory or tactile content presented at times and in modes that will not distract the driver from driving. Significant use cases for the present technology include autonomous vehicles in which all occupants are passengers and no danger of distracting the driver by entertainment content exists. Use cases may also include human-driven vehicles, in which the entertainment content should be presented in a mode that does not distract the driver, for example, on a mobile device or mixed reality headset.

If the content is configured to support it, passengers (e.g., "player actors") may also actively interact with characters or other objects appearing in the sensory content. As used herein, a "player actor" is a passenger of the vehicle and a user of a client device or interface equipped with or coupled to a sensory output device or biometric sensors, who uses the client device or interface to interact with characters or objects in sensory content by involuntarily entering a neurological, cognitive, or neurophysiological state (e.g., emoting), whether or not also using a controller to provide direct input, such that the narrative behavior of the character or object changes without requiring an intentional action by the player actor. "Narrative behavior" means behavior that changes the narrative, for example, character dialogue or actions. Thus, player actors include users who affect the narrative by emoting inwardly or outwardly without taking an intentional action, as distinct from "player characters" in certain prior interactive content. Player characters interact with the narrative by manipulating a controller (e.g., keyboard or dedicated game controller) or other direct input. Unlike player actors, player characters cannot alter the narrative by achieving a biometric-detectable neurological state without any intentional action. Although player actors can alter the narrative without intentional action, the technology herein does not preclude them from also altering the narrative by some intentional action detected by the biometric sensors or other devices. The processor may process and act on biometric data, with or without distinguishing between intentional and unintentional qualities of the data. The processor may distinguish between intentional and unintentional data states based on side signals (e.g., from a user interface designed to receive intentional input only) or by pattern recognition (e.g., speech recognition).

In an aspect, the methods may include using predictive analytics in producing (e.g., selecting or configuring) sensory contents. As used herein, "predictive analytics" encompasses machine learning algorithms, rules-based predictive modeling algorithms, statistical algorithms, and other techniques to forecast future or unknown events based on current and historical data. A predictive analytics process may predict an affinity of a detected passenger based at least in part on a passenger profile, including the preference data and geographic location data. The affinity may then become part of the passenger profile. In some embodiments, a processor may execute recognition/image analysis software, either rules-based, heuristic or a combination of the foregoing, to associate content elements with semantic categories or tags relating to, for example, user preferences for dramatic, stylistic, format, or other aspects of content elements. Predictive analytics may be used to predict affinities of users for simple or complex sets of various semantic categories associated with content elements.

The present description uses "user," "passenger," and "player actor" interchangeably when discussing sensory content production process. Sensory content production enables adaptation of the sensory content to increase or maintain narrative tension experienced by the user, based at least in part on real time neurological or cognitive feedback through physical or biometric sensing of the user's involuntary neurological, cognitive, or neurophysiological states, e.g., valence and arousal as these terms are defined herein below. Sensory content production using predictive analytics enables adaptation of the sensory content based at least in part on data inputs from physical or environmental sensors as discussed in more detail below.

Referring to FIG. 1, a suitable vehicle-server environment 100 may include various computer servers and other network entities including client entities in communication via one or more networks, for example a Wide Area Network (WAN) 102 (e.g., the Internet) and/or a wireless communication network (WCN) 104, for example a cellular telephone network, using any suitable high-bandwidth wireless technology or protocol, including, for example, cellular telephone technologies such as 3rd Generation Partnership Project (3GPP) Long Term Evolution (LTE), fifth-generation cellular wireless (5G), Global System for Mobile communications (GSM) or Universal Mobile Telecommunications System (UMTS), and/or a wireless local area network (WLAN) technology using a protocol such as Institute of Electrical and Electronics Engineers (IEEE) 802.11, and equivalents thereof. The servers and other network entities (collectively referred to as "nodes") connect directly, dynamically and non-hierarchically to as many other nodes as possible and cooperate with one another to efficiently route data from/to client devices. This lack of dependency on one node allows for every node to participate in the relay of information. Mesh networks dynamically self-organize and self-configure. The servers can connect to client devices in a server-client structure. Some client devices can also act as servers.

Client devices may include, for example, portable passenger devices 113, 115 (PPDs, FIG. 2) such as smartphones, smartwatches, notepad computers, laptop computers, mixed reality headsets, and special purpose media players and servers, such as vehicle media controllers (VMCs, FIG. 2) installed as part of vehicular electronic systems. VMCs 162 may be coupled to vehicle controllers (VCs) 164 as a component of a vehicular control system. The VC may control various other functions with various components, for example, engine control, interior climate control, interior or external lighting, anti-lock braking, navigation, or other functions, and may help coordinate media output of the VMC to other vehicular functions, especially navigation.

Computer servers may be implemented in various architectures. For example, the environment 100 may include one or more Web/application servers 124 containing documents and application code compatible with World Wide Web protocols, including but not limited to HTML, XML, PHP and JavaScript documents or executable scripts, for example. The environment 100 may include one or more data servers 126 and/or cloud server 122 for holding data, for example video, audio-video, audio, graphical content components of sensory content for consumption using a client device, software for execution on or in conjunction with client devices, for example sensor control and emotion detection applications, and data collected from users or client devices. Data collected from client devices or users may include, for example, passenger (user) identity, passenger profile (user profile data), sensor data and application data. Passenger identity, passenger profile, and sensor data may be collected by a background (not user-facing) application operating on the client device, and transmitted to a data sink, for example, a cloud-based data server 122 or discrete data server 126. Application data means application state data, including but not limited to records of user interactions with an application or other application inputs, outputs or internal states. Applications may include software for control of cinematic content and supporting functions. Applications and data may be served to one or more system nodes including vehicles 101 (e.g., 106-120) from one or more of the foregoing servers (e.g., 122, 124, 126) or other types of servers, for example, any server accessing a distributed blockchain data structure 128, or a peer-to-peer (P2P) server 116 including a peer-to-peer network such as a mesh network (including partial, full, and wireless mesh networks), such as may be provided by a set of vehicle devices 118, 120, etc., and the like, operating contemporaneously as micro-servers or clients.

In an aspect, information held by one or more of the content server 126, cloud-based content server 122, distributed blockchain data structure 128, or a peer-to-peer (P2P) server 116 may include a data structure of sensory contents, which may include, but not limited to, media components such as video clips suitable for including in the sensory content such as a video. The data structure may relate user-perceivable aspects of sensory contents to identifiers of the media components, for example by using profile values, and to one or more indicators of semantic meaning relevant to one or more travel events, and other unique metadata sets characterizing each of the components. As used herein, a "media component" is a discrete package or collection of data that encodes a component of sensory content. Media components may include, for example, "media segments," which are sets of audio, video, audio-video, or other encodings of sensory output by a sensory output device or a media player having a beginning, end, and duration. An audio clip, a video clip, or an audio-video clip are examples of a media segment. Media segments may comprise parallel tracks of encoded data, each of which is itself a media segment. For example, an audio-video segment includes a video segment in parallel to an audio segment. If the media player supports other sensory output modalities, other types of media segments may include, for example, a motion simulation segment for driving a motion simulator, an olfactory segment for driving an odor generator, a tactile segment for driving a tactile output device, and so forth. Other media components are not segments but nonetheless are data that encodes sensible output. For example, three-dimensional (3D) model data and related texture data are not media segments but once rendered by a game engine will appear in output media content and are necessary to render the content as intended.

The network environment 100 may include various vehicles (collectively referred to as vehicles 101), for example an autonomous or connected vehicle 106, smart home/office 107, airplane 108, elevator 109 (not shown), kiosk, etc., that may be connected to servers via the WCN 104 and/or WAN 102; any one of the foregoing vehicle devices including 118, 120, or a personal computer device 110, a mixed reality (e.g., virtual reality or augmented reality) device 114 that may be connected to servers via a router 112 and the WAN 102 and/or WCN 104, and the like. In general, vehicles 101 may be, or may include or communicably connected to, computers used by users to access sensory content provided via a server or from local storage.

Figure 2:
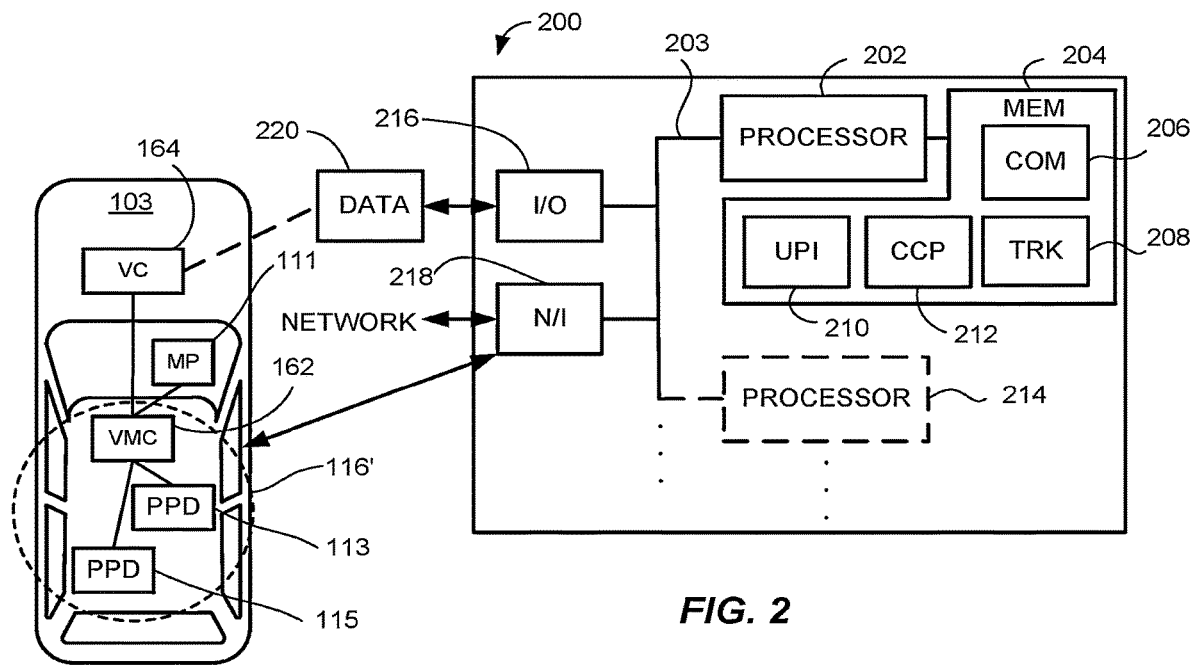
FIG. 2 is a schematic block diagram illustrating aspects of a server for personalizing sensory content output for a vehicle or in relation to a vehicular trip.

Referring to FIG. 2, the vehicle 103 in the network environment 100 may include various passenger portable devices, for example a mobile smartphone client (not shown) of a user who has not yet entered the vehicle 103, for example while waiting for the vehicle to arrive or coming to meet the vehicle. Other client devices may include, for example, a notepad client, or a portable computer client device, a mixed reality (e.g., virtual reality or augmented reality) client device, or the VNCs 162. PPDs may connect to one or more networks. For example, the PPDs 112, 114, in the vehicle 101 may connect to servers via a vehicle controller 164, a wireless access point (not shown) communicably connected to the wireless communications network (WCN) 104, the WCN 104 and the WAN 102, in which the VC 164 acts as a router/modem combination or a mobile wireless access point (WAP). For further example, in a mobile mesh network 116', nodes 113, 115, 162 may include small radio transmitters that function as a wireless router. The nodes 113, 115, 162 may use the common Wi-Fi standards to communicate wirelessly with client devices, and with each other.

Mesh network nodes may be programmed with software that tells them how to interact within the larger network. By following a set of common mesh network protocols, the mesh network nodes may transport information across the network by hopping the information wirelessly from one mesh node to the next. The nodes may automatically choose the quickest and most reliable path in a process known as dynamic routing. In a wireless mesh network, only one node needs to be physically wired to a network connection like an Internet modem. That one wired node then shares its Internet connection wirelessly with all other nodes in its vicinity. Those nodes then share the connection wirelessly with the nodes closest to them. The more nodes, the further the connection spreads, creating a wireless "cloud of connectivity". In general, client devices may be, or may include, computers or media players used by users to access media content provided via a server or from local storage. In traveling vehicles such as the example vehicles 101, use of a mobile mesh network protocol may enable nearby vehicles to share network bandwidth and information more efficiently using different frequencies and cached content.

For example, passengers in two or more vehicles 101 traveling to a popular destination such as a sporting event or theme park may be interested in the same or similar content. Continuing the example, suppose that the first vehicle 103 has already downloaded many media components making up the shared content and its mobile mesh network 116' comes within range of a second vehicle, e.g., one of the vehicles 118, 120 in a compatible mesh network 116. Then, one or more of the VMC 162, media player (MP) 111 and PPDs 113, 115 of vehicle 103 may join the mesh network 116 of vehicle 118. Once the new nodes have joined, the nodes of the mesh network 116' of vehicle 103 may cooperate to transmit media components or other data to the new nodes in the second vehicle 118 or 120, without needing to pass data through the WCN 104 or WAN 102. Thus, demands on other networks may be reduced. Mesh networks may be useful in delivering route-configured content because client devices in vehicles following similar routes may be both more likely to request similar content and to be relatively near to each other.

FIG. 2 further shows a sensory content server 200 for controlling output of personalized digital sensory content, which may operate in the environment 100, in similar networks, or as an independent server. The server 200 may include one or more hardware processors 202, 214 (two of one or more shown). Hardware may include firmware. Each of the one or more processors 202, 214 may be coupled to an input/output port 216 (for example, a Universal Serial Bus port or other serial or parallel port) to a source 220 for sensor data indicative of vehicle states, users' emotional states and viewing history. Vehicle states may include road conditions, location, multi-axial velocity and/or acceleration, estimated arrival time, destination, and other information. Viewing history may include a log-level record of variances from a baseline script for a content package or equivalent record of control decisions made in response to player actor emotional states and other input. Viewing history may also include content viewed on TV, Netflix and other sources. The processor may control output of sensory content responsive to sensor data indicating a user's emotional state, for example as described in International (PCT) application Serial No. PCT/US2018/053614 by inventors hereof, incorporated by reference herein. Any source that contains a derived emotional arc may be useful for input to an emotional-reacting content control algorithm.

Some types of servers, e.g., cloud servers, server farms, or P2P servers, may include multiple instances of discrete servers 200 that cooperate to perform functions of a single server. In some embodiments, the source 220 may be separately or additionally used for sensor data indicative of vehicle or travel conditions. Suitable sources may include, for example, Global Positioning System (GPS) or other geolocation sensors, one or more cameras configuring for capturing road conditions and/or passenger configurations in the interior of the vehicle 150, one or more microphones for detecting exterior sound and interior sound, one or more temperature sensors for detecting interior and exterior temperatures, door sensors for detecting when doors are open or closed, and any other sensor useful for detecting a travel event or state of a passenger.

The server 200 may include a network interface 218 for sending and receiving applications and data, including but not limited to sensor and application data used for controlling sensory content. The content may be served from the server 200 to a vehicle 101 or stored locally by the client device. If stored local to the client device, the client and server 200 may cooperate to handle sensor data and other player actor functions. In some embodiments, the client may handle all content control functions and the server 200 may be used for tracking only or may not be used at all. In other embodiments, the server 200 performs content control functions.

Each processor 202, 214 of the server 200 may be operatively coupled to at least one memory 204 holding functional modules 206, 208, 210, 212 of an application or applications for performing a method as described herein. The modules may include, for example, a communication module 206 for communicating with client devices and servers. The communication module 206 may include instructions that when executed by the processor 202 and/or 214 cause the server to communicate control data, content data, and sensor data with a client device via a network or other connection. A tracking module 208 may include functions for tracking emotional response and other interactive data for a user or cohort, for one or more content titles, subject to user permissions and privacy settings. In some embodiments, tracking module 208 may include functions for tracking travel events using sensor data from the source(s) 220 and/or navigation and vehicle data received through the network interface 218 or other coupling to a vehicle controller.

The modules may include, for example, a user profile integration (UPI) module 210. The UPI module 210 may include instructions that when executed by the processor 202 and/or 214 cause the server to perform one or more of determining associations of sensory contents or video clips with one or more parameters indicating user-perceivable characteristics of the sensory contents or the video clips. For example, the UPI module 210 may apply a rule-based algorithm, a heuristic machine learning algorithm (e.g., a predictive analytics algorithm or a deep neural network), or both, to create one or more sets of content identifiers consistent with the input parameters. In some embodiments, the UPI module 210 may apply the rule-based algorithm or the heuristic machine learning algorithm to data indicative of player actor emotional reactions thereby identifying a user's internal state useful for a content control algorithm. The UPI 210 when executed by the processor may cause the server to assign a likelihood of a targeted outcome, e.g., a defined emotional state targeted for the sensory content's emotional arc, for specific control actions. The UPI module 210 may perform other or more detailed operations for selecting sensory content or preferred video clips as described in more detail herein below.

The modules may further include a content configuration process (CCP) module 212. The CCP module 212 may include instructions that when executed by the processor 202 and/or 214 cause the server 200 to perform one or more of assembling or configuring sensory content for delivery to the passenger in the vehicle, or producing or configuring a video including preferred video clips from a data structure based at least in part on the user profile data, at least in part by one or more of selecting or configuring ones of content components or video clips based at least in part on one or more of preference data and geographic location, and/or user profile data, and further operations as described in more detail herein below. In alternative embodiments, the content configuration process or function may be omitted from the server memory 204 and provided in the memory of a client device. The memory 204 may contain additional instructions, for example an operating system, and supporting modules.

Figure 3A:
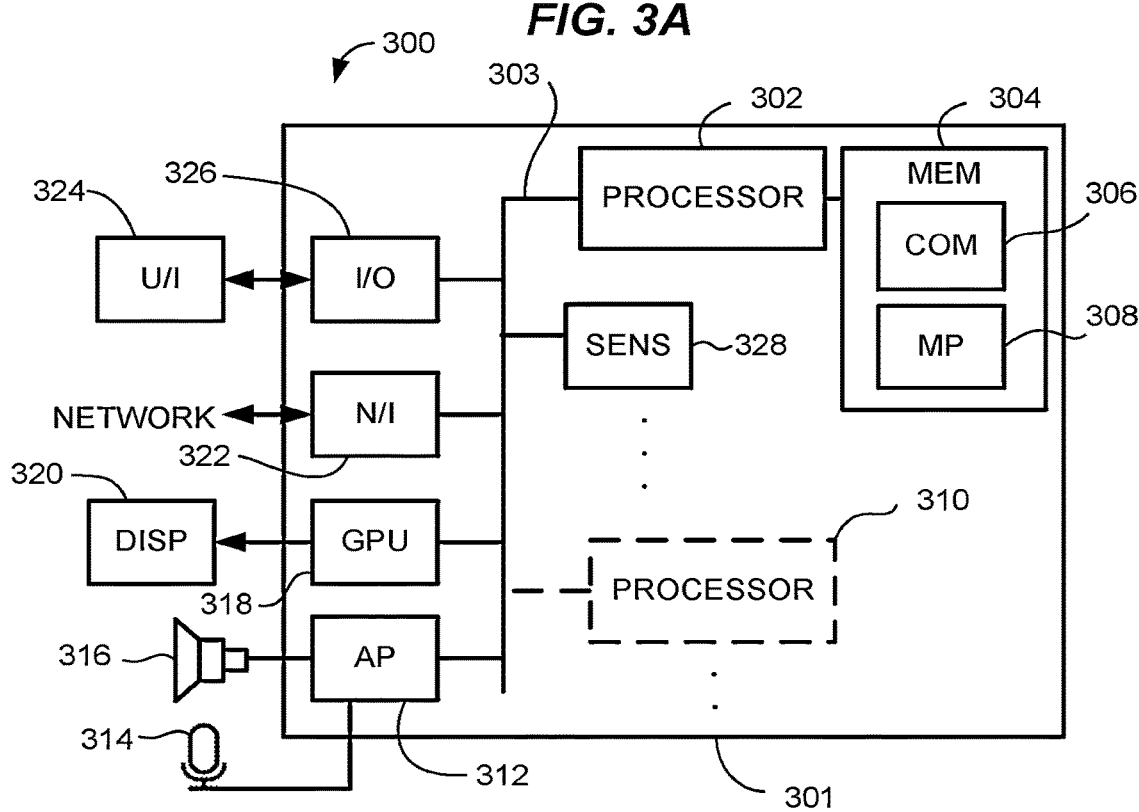
FIG. 3A is a schematic block diagram illustrating aspects of a client device for personalizing sensory content output for a vehicle or in relation to a vehicular trip.

Referring to FIG. 3A, aspects of a content consumption apparatus (client) 300 for controlling output of sensory content responsive to sensor data are described. In some embodiments, the same computing device (e.g., apparatus 300) may operate both as a content consumption apparatus and as a content configuration server, for example, as a node of a mesh network. In such embodiments, the computing device may also include functional modules and interface devices as described above for the server 200.

The apparatus 300 may be located in or on the vehicle 100. The client 300 may include a processor 302, for example a central processing unit based on 80×86 architecture as designed by Intel™ or AMD™, a system-on-a-chip as designed by ARM™, or any other suitable microprocessor(s). The processor 302 may be communicatively coupled to auxiliary devices or modules of the content consumption apparatus 300, using a bus or other coupling. In some aspects, the processor 302 and its coupled auxiliary devices or modules may be housed within or coupled to a housing 301, for example, a housing having a form factor of a dashboard inside an automobile, an onboard infotainment system inside an automobile (e.g., an entertainment system built in or connected to a passenger seat, the ceiling, or any other part of a vehicle), a kiosk, an elevator infotainment display, a digital signage, an in-flight entertainment system, an amusement ride, seats in 4D venues, a television, a set-top box, a smartphone, a tablet, wearable goggles, glasses, visor, or other form factors.

A user interface device 324 may be communicably coupled to the processor 302 for providing user control input to a sensory content production process as described herein. The process may include outputting video and audio for a conventional flat screen or projection display device. In some embodiments, the sensory content process may be, or may include, audio-video output for an immersive mixed reality content display process operated by a mixed reality immersive display engine executing on the processor 302.

User control input may include, for example, selections from a graphical user interface or other input (e.g., textual or directional commands) generated via a touch screen, keyboard, pointing device (e.g., game controller), microphone, motion sensor, camera, or some combination of these or other input devices represented by block 324. Such user interface device 324 may be coupled to the processor 302 via an input/output port 326, for example, a Universal Serial Bus (USB), Bluetooth®, Wi-Fi™, or equivalent ports. Control input may also be provided via one or more sensors 328 coupled to the processor 302. The sensors 328 may comprise, for example, a motion sensor (e.g., an accelerometer), a position sensor, a camera or camera array (e.g., stereoscopic array), a biometric temperature or pulse sensor, a touch (pressure) sensor, an altimeter, a location sensor (for example, a Global Positioning System (GPS) receiver and controller), a proximity sensor, a motion sensor, a smoke or vapor detector, a gyroscopic position sensor, a plenoptic camera, a radio receiver, a multi-camera tracking sensor/controller, an eye-tracking sensor, an infrared/heat signature sensor, a microphone or a microphone array. In some aspect, any or all of the sensors 328 may be housed in a single or multiple devices, such as a smartphone and the like.

In some implementations, the sensors 328 may be located inside the vehicle, outside (e.g., on the exterior of) the vehicle, or both. For example, accelerometers, bump cancelling sensors, audio/noise canceling sensors, and/or light canceling sensors may be located outside, and position sensors (e.g., sensing position(s) of passenger(s)), depth sensors, gesture sensors (e.g., Kinect™ by Microsoft Corporation in Redmond, WA), and/or microphone(s) may be located inside, the vehicle 100. For example, a smartphone device, an IoT device, a smart device (e.g., Apple Watch by Apple, Inc, Google Home by Google, Inc., Amazon Echo by Amazon, Inc., etc.) or other network-enabled device may house and provide or augment functionalities of one or more of the foregoing sensors. The sensor or sensors 328 may detect biometric data used as an indicator of the user's emotional state, for example, facial expression, skin temperature, pupil dilation, respiration rate, muscle tension, nervous system activity, or pulse. In addition, the sensor(s) 328 may detect a user's context, for example an identity position, size, orientation and movement of the user's physical environment and of objects in the environment, motion or other state of a user interface display, for example, motion of a virtual-reality headset. The sensor or sensors 328 may generate orientation data for indicating an orientation of the apparatus 300 or a passenger using the apparatus. For example, the sensors 328 may include a camera or image sensor positioned to detect an orientation of one or more of the user's eyes, or to capture video images of the user's physical environment or both. In some aspect, a camera, image sensor, or other sensor configured to detect a user's eyes or eye movements may be integrated into the apparatus 300 or into ancillary equipment coupled to the apparatus 300. The one or more sensors 328 may further include, for example, an interferometer positioned in the support structure 301 or coupled ancillary equipment and configured to indicate a surface contour to the user's eyes. The one or more sensors 328 may further include, for example, a microphone, array or microphones, or other audio input transducer for detecting spoken user commands or verbal and non-verbal audible reactions to output of the media content.

The apparatus 300 or a connected server may track users' biometric states and viewing history. Viewing history may include a log-level record of control decisions made in response to player actor biometric states and other input. Viewing history may also include content viewed on TV, Netflix™ and other sources. The server 200 may track user actions and biometric responses across multiple content titles for individuals or cohorts.

Sensor data from the one or more sensors 328 may be processed locally by the CPU 302 to control display output, and/or transmitted to a server 200 for processing by the server in real time, or for non-real-time processing. As used herein, "real time" refers to processing responsive to user input without any arbitrary delay between inputs and outputs; that is, that reacts as soon as technically feasible. "Non-real time" refers to batch processing or other use of sensor data that is not used to provide immediate control input for controlling the display, but that may control the display after some arbitrary amount of delay.

To enable communication with another node of a computer network, for example the sensory content server 200, the client 300 may include a network interface 322, e.g., an Ethernet port, wired or wireless, or a 4G/LTE/5G cellular communications network interface, etc. Network communication may be used, for example, to enable multi-user experiences, including immersive or non-immersive experiences of sensory content. The system may also be used for multi-user applications, for example social networking, group entertainment experiences, instructional environments, video gaming, and so forth. Network communication can also be used for data transfer between the client 300 and other nodes of the network, for purposes including data processing, content delivery, content control, and tracking. The client 300 may manage communications with other network nodes using a communications module 306 that handles application-level communication needs and lower-level communications protocols, preferably without requiring user management.

A display 320 may be coupled to the processor 302, for example via a graphics processing unit 318 integrated in the processor 302 or in a separate chip. The display 320 may include, for example, a flat screen color liquid crystal (LCD) display illuminated by light-emitting diodes (LEDs) or other lamps, a projector driven by an LCD display or by a digital light processing (DLP) unit, a laser projector, a light field display (e.g., support near-eye solution and far-eye solution, or generate images from different planes a-la wave guide bending), a pass-through display e.g., a head-mounted virtual retinal display by Magic Leap, Inc. (Plantation, FL) or other digital display device. For example, a switchable electric glass screen that transitions from transparent to opaque, paired with a 4K transparent LCD display, may be used. Example of such display device includes the display screens used in "Field Trip to Mars" by Framestore VR Studio (http://framestorevr.com/field-trip-to-mars/). Other digital display devices may also be used.

The display device 320 may be incorporated into a vehicle (incl. virtual reality headset worn by a passenger inside a vehicle) for example, a window of an autonomous vehicle, an amusement ride, an interior of transportation vessels such as an elevator, taxi, airplane, bus, etc., a kiosk, or other immersive display systems. Video output driven by a mixed reality display engine operating on the processor 302, or other application for coordinating user inputs with an immersive content display and/or generating the display, may be provided to the display device 320 and output as a video display to the user. Similarly, an amplifier/speaker or other audio output transducer 316 may be coupled to the processor 302 via an audio processor 312. Audio output correlated to the video output and generated by the media player module 308, sensory content control engine or other application may be provided to the audio transducer 316 and output as audible sound to the user. The audio processor 312 may receive an analog audio signal from a microphone 314 and convert it to a digital signal for processing by the processor 302. The microphone can be used as a sensor for detection of emotional state and as a device for user input of verbal commands, or for social verbal responses to NPC's or other player actors.

The content consumption apparatus 300 may further include a random-access memory (RAM) 304 holding program instructions and data for rapid execution or processing by the processor during controlling sensory content in response trip information or other data. When the client 300 is powered off or in an inactive state, program instructions and data may be stored in a long-term memory, for example, a non-volatile magnetic, optical, or electronic memory storage device (not shown). Either or both RAM 304 or the storage device may comprise a non-transitory computer-readable medium holding program instructions, that when executed by the processor 302, cause the device 300 to perform a method or operations as described herein. Program instructions may be written in any suitable high-level language, for example, C, C++, C#, JavaScript, PHP, or Java™, and compiled to produce machine-language code for execution by the processor.

Program instructions may be grouped into functional modules 306, 308, to facilitate coding efficiency and comprehensibility. The modules, even if discernable as divisions or grouping in source code, are not necessarily distinguishable as separate code blocks in machine-level coding. Code bundles directed toward a specific type of function may be considered to comprise a module, regardless of whether machine code on the bundle can be executed independently of another machine code. The modules may be high-level modules only. The media player module 308 may perform operations of any method described herein, and equivalent methods, in whole or in part. Operations may be performed independently or in cooperation with another network node or nodes, for example, the server 200.

Figure 3B:
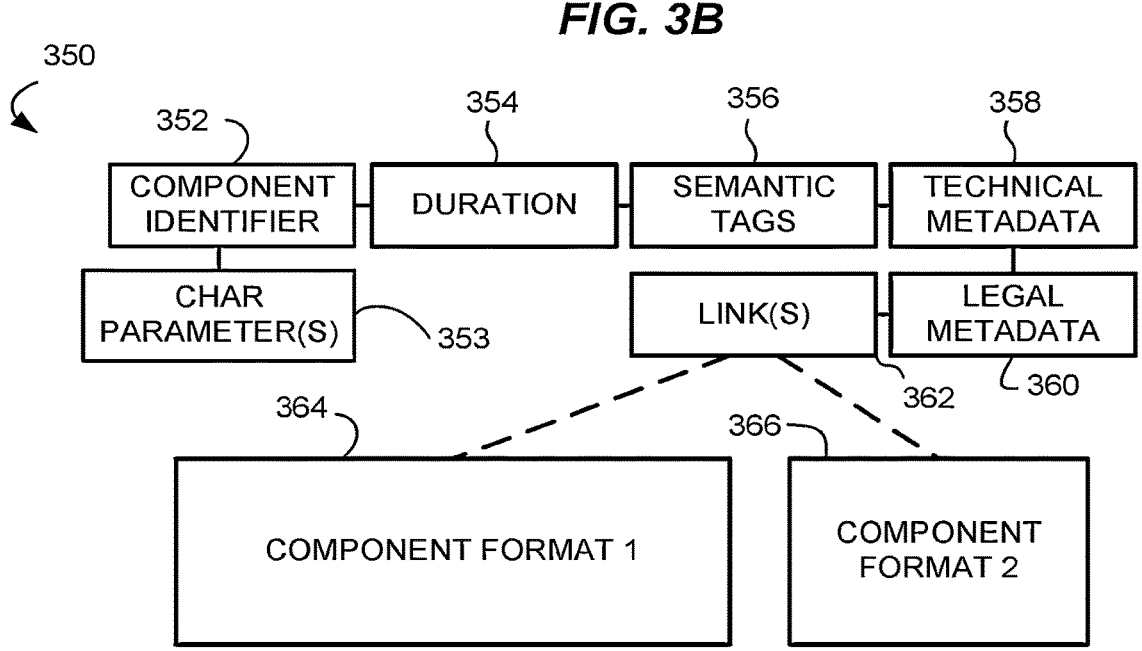
FIG. 3B illustrates an example of a data structure that relates sensory contents in an ordered arrangement of media components to one or more parameters for sensory content.

Systems, apparatus and methods as described herein may make use of a data structure that relates sensory contents in an ordered arrangement of media components to one or more parameters for sensory content, including at least one or more indicators of semantic meaning relevant to one or more travel events. FIG. 3B shows an example of a data structure 350 for relating content components of sensory contents each referenced by a component identifier 352 to passenger identity, passenger profile including preference data and geographic location data, user profile data, and/or other data. The data structure may be implemented as a relational database, a flat data table, a distributed ledger, or by any other useful computer-readable digital data structure for storing, locating and accessing related components of binary-encoded data. The data structure 350 may include self-associated records each including a unique identifier 352 of a content component (e.g., an index number), a duration 354 value (e.g., frames or seconds) of a content segment if applicable, one or more semantic tags 356 relevant to passenger profile or user profile data, technical metadata 358 as needed to select, configure or produce a sensory content or a video that includes the content component or video clips identified by the identifier 352, legal metadata such as for example license or censorship requirements applicable to the media component, and one or more links to non-transitory, computer-readable copies 364, 366 of the media component. The copies 364, 366 may be identical copies for redundancy or more efficient distribution, may be copies in different formats (e.g., a large format 364 and a small format 366) for different output modes, or both. The output may also rely on metadata or other indicia to derive a subset of a component copy, e.g. a video image formatted in a non-native aspect ratio to fit a display, or a multichannel audio stream for rendering on a stereo system. It may be efficient to store the copies 364, 366 in a different storage system than the metadata 350 for more efficient operation of the server 200. For example, the server 200 may load the data structure 350 into its Random Access Memory (RAM) and access the component copies 364, 366 on a remote server or local magnetic or electronic memory device.

Figure 4A:
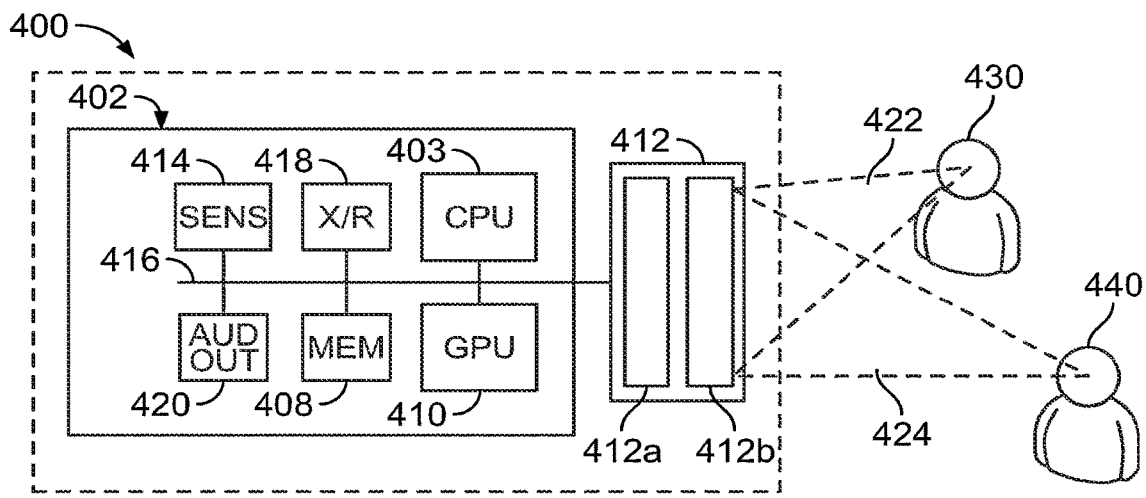
FIG. 4A is a schematic diagram showing features of an apparatus for personalizing sensory content output for a vehicle or in relation to a vehicular trip, involving a light field display.

FIG. 4A is a schematic diagram illustrating one type of a virtual display device 400, as an example of the display installed in client 300 (e.g., on a window in of any vehicle shown in FIGS. 1-2) as an example of a more specific form factor. That is, in addition to conventional 2D output or 3D output for display on two-dimensional (flat or curved) screens (e.g., by televisions, mobile screens, or projectors), the vehicle personalization methods disclosed herein may be used with Virtual Reality (VR) or Augmented Reality (AR) output devices. In an alternative or in addition, each of the passengers may consume the sensory content on a personal computing device, for example a smartphone, notepad computer or mixed reality headset. The sensory content output device, e.g., display for the client 300 may be provided in various form factors, of which device 400 provides but one example. The innovative methods, apparatus and systems described herein are not limited to a single form factor but may be used in any video output device suitable for sensory content output.

The virtual display device 400 may include a light field display 412 including a switchable electric glass screen 412a that transitions from transparent to opaque, paired with a 4K transparent LCD display 412b. The device 400 supports near-eye 422 solution and far-eye 424 solution, for example, by generating images from different planes a-la wave guide bending. For example, a user 430 viewing the light field display 412 from a position or plane that is nearer to the display 412 (as indicated by near-eye plane or position 422) than a user 440 viewing the display from a different position or plane (e.g., far-eye 424), may each view alternate or different views of the sensory content being displayed on the light field display 412.

The virtual display device 400 may include additional electronic components such as a simulation display processing unit 402 (e.g., a computing device such as a notebook computer, tablet, smartphone, etc.). The display 412 may be driven by the Central Processing Unit (CPU) 403 and/or Graphics Processing Unit (GPU) 410 via an internal bus 416. Components of the unit 402 may further include, for example, a transmit/receive component or components 418, enabling wireless communication between the CPU and an external server via a wireless coupling. The transmit/receive component 418 may operate using any suitable high-bandwidth wireless technology or protocol, including, for example, cellular telephone or wireless technologies as described elsewhere herein. The transmit/receive component or components 418 may enable streaming of video data to the display and communications unit 402 from a local or remote video server, and uplink transmission of sensor and other data to the local or remote video server for control or audience response techniques as described herein.

Components of the simulation display processing unit 402 may further include, for example, one or more sensors 414 coupled to the CPU 403 via the communications bus 416. Such sensors 414 may include, for example, an accelerometer/inclinometer array providing orientation data for indicating an orientation of the simulation display processing unit 402 and/or the virtual display device 400, or an eye-tracking sensor for tracking eye position or movement of the users (e.g., user 430 and user 440). The one or more sensors 414 may further include, for example, a Global Positioning System (GPS) sensor indicating a geographic position of the user (e.g., users 430 and 440). The one or more sensors 414 may further include, for example, a camera or image sensor positioned to detect an orientation of one or more of the user's facial expressions, or to capture video images of the user's physical environment (for VR mixed reality), or both. In some embodiments, an eye-tracking sensor, a camera, image sensor, or other sensor configured to detect a user's eyes or eye movements may be mounted in or on the light field display 412 or the simulation display processing unit 402 and coupled to the CPU 403 via the bus 416 and a serial bus port (not shown), for example, a Universal Serial Bus (USB) or other suitable communications port. The one or more sensors 414 may further include, for example, an interferometer positioned in the support structure 404 and configured to indicate a surface contour to the user's eyes. The one or more sensors 414 may further include, for example, a microphone, array or microphones, or other audio input transducer for detecting spoken user commands or verbal and non-verbal audible reactions to display output. The one or more sensors may include, for example, electrodes or microphone to sense heart rate, a temperature sensor configured for sensing skin or body temperature of the user, an image sensor coupled to an analysis module to detect facial expression or pupil dilation, a microphone to detect verbal and nonverbal utterances, or other biometric sensors for collecting biofeedback data including nervous system responses capable of indicating emotion via algorithmic processing.

Components of the display and communications unit 402 may further include, for example, an audio output transducer 420, for example a speaker or piezoelectric transducer in the display and communications unit 402 or audio output port for headphones or other audio output transducer mounted in headgear 424 or the like. The audio output device 420 may provide surround sound, multichannel audio, so-called 'object-oriented audio' (e.g., Dolby Atmos and DTS:X), positional audio effects (e.g., 3D Audio), or other audio track output accompanying a stereoscopic immersive VR video display content. In an aspect, different passengers in a vehicle (e.g., users 430 and 440) hear different audio output from the audio output device 420 depending on where the passengers are located in the vehicle. Components of the display and communications unit 402 may further include, for example, a memory device 408 coupled to the CPU 403 via a memory bus. The memory 408 may store, for example, program instructions that when executed by the processor cause the apparatus 400 to perform operations as described herein. The memory 408 may also store data, for example, audio-video data in a library or buffered during streaming from a network node.

Figure 4B:
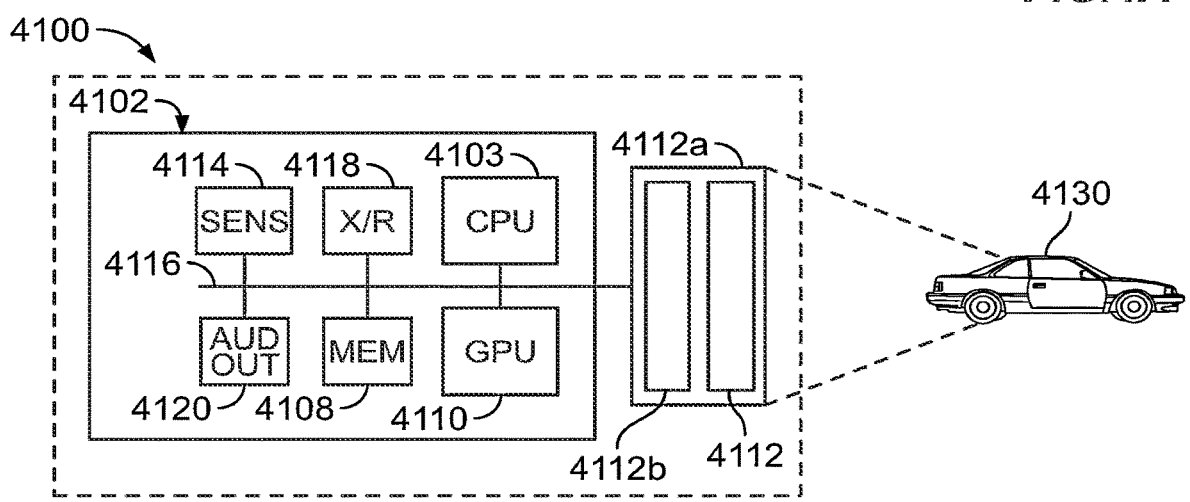
FIG. 4B is a schematic diagram showing features of an apparatus for personalizing sensory content output for a vehicle or in relation to a vehicular trip, involving projecting sensory content to a display surface in or on the vehicle.

FIG. 4B is a schematic diagram illustrating another type of a virtual display device 4100, as an example of the display installed in client 300, e.g., on a body of a vehicle 4130. That is, the virtual display device 4100 involves projecting sensory content to a display surface in or on the vehicle. as an example of the display installed in client 300, e.g., on the interior and/or exterior of an autonomous vehicle 106 as an example of another more specific form factor. In some embodiments, the virtual display device 4100 may include a display 4112, which may be a light field display that includes a switchable electric glass screen 4112a that transitions from transparent to opaque, paired with a 4K transparent LCD display 4112b. Similar to the device 400, the device 4100 may support near-eye solution and far-eye solution, for example, by generating images from different planes a-la wave guide bending. Alternatively, other display technologies may be employed for the display 4112, such that the near-eye and far-eye solution may or may not be supported.

The virtual display device 4100 may include additional electronic components such as a simulation display processing unit 4102, a CPU 4103, a GPU 4110, one or more sensors 4114, an internal bus 4116, a transmit/receive component or component 4118, an audio output transducer 4120, whose structures and/or functionalities may be similar or identical to the corresponding components identified in FIG. 4A.

For example, in some implementations, the virtual display device 4100 may display sensory contents onto the (interior and/or exterior surface of) autonomous vehicle 4130 to simulate a celebrity vehicle, such as the Presidential Limousine, Batmobile, etc.

Figure 4C:
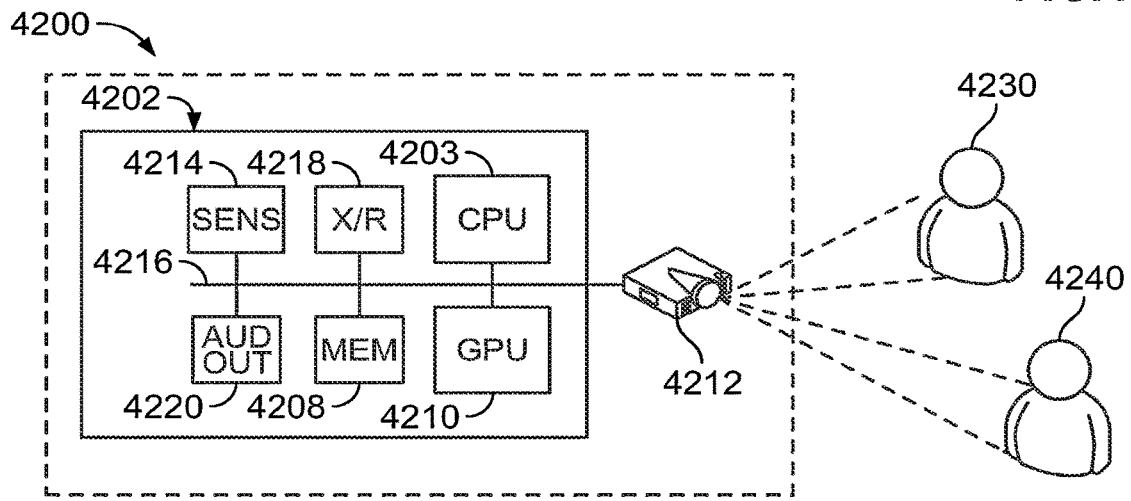
FIG. 4C is a schematic diagram showing features of an apparatus for personalizing sensory content output for a vehicle or in relation to a vehicular trip, involving projecting sensory content onto clothing (of the passenger(s)), or a simulated personality.

FIG. 4C is a schematic diagram illustrating another type of a virtual display device 4200, as an example of the display installed in client 300, e.g., in or on an autonomous vehicle 106 as an example of a more specific form factor. In some embodiments, the virtual display device 4200 may include a display 4212, which may be a projector that projects real or holographic image onto a medium such as an object or in midair. For example, in some implementations, the virtual display device 4200 involves projecting sensory content onto clothing (of the passenger(s)) or projecting a simulated personality in midair or on a display screen in an autonomous vehicle 106. Apparatus for midair projection may include, for example, frosted orthogonal translucent screens or volumes with suspended reflective particles enclosed by transparent panes.

The virtual display device 4200 may include additional electronic components such as a simulation display processing unit 4202, a CPU 4203, a GPU 4210, one or more sensors 4214, an internal bus 4216, a transmit/receive component or component 4218, an audio output transducer 4220, whose structures and/or functionalities may be similar or identical to the corresponding components identified in FIG. 4A.

Having described examples of suitable clients, servers, and networks for performing the methods for personalizing a vehicle including one or more sensory output devices communicatively coupled to a server, or for producing video customized for a preference profile of a person or cohort, more detailed aspects of these methods will be addressed. The apparatus 200 and 300 may each perform the aforementioned methods, alone or working in cooperation.

FIG. 5 illustrates an overview of the methods 500 for personalizing a vehicle including one or more sensory output devices communicatively coupled to a server, which may include related operations in any functional order or in parallel that may be performed by one or more processors (e.g., 202, 214, 302, 310). References will also be made to (elements appearing in) preceding FIGS. 1-4C and to elements referenced in the subsequent FIG. 6A in discussing FIG. 5.

A vehicle personalization begins at process 510, when a passenger is detected in a vehicle, or boarding a vehicle (e.g., the vehicle 101 shown in FIG. 2). At the process 520, one or more processors receive signals indicating at least one of an identity 605 or passenger profile (including preference data 610) of the detected passenger in the vehicle or boarding the vehicle. As used herein, "boarding" includes entering the vehicle and waiting to enter the vehicle, for example, waiting at a designated location for the vehicle to arrive after hailing a ride. In some embodiments, the processor(s) access a database (e.g., any one or more of 116, 122, 124, 126, 128, 220, etc.) including configuration information for the vehicle 101 upon receiving the signals. As used herein, "passenger" is defined as an occupant of the vehicle 101, and may include, for example, a passenger of an autonomous vehicle 106 who may drive the vehicle 106 in some instances. In some implementations, the passenger profile may include digitally encoded data bits concerning information related to the passenger, such as: the passenger's favorite characters (e.g., Warner Bros. cartoon characters such as Bugs Bunny, Tweety, etc.) or amusement rides (e.g., theme park attraction rides such as Justice League 3D—The Ride at Warner Bros. Movie World, etc.); social graph, status or topic for a meeting or social event preparation (e.g., a Facebook status, etc.); activity level or likes/ dislikes for outdoor activity; favorite teams or players (e.g., professional sports teams/players, fictional teams/characters, etc.); favorite artists or songs; preferred merchandise and shopping style (e.g., Warner Bros. cartoon character goods, or shopping at a particular retail store, etc.); culture; age; personal interests; and sensory preferences (e.g., for holiday, season, religion, etc.), and the like.

In some aspect, the one or more processors at a content server may maintain a data structure holding components for sensory content. The data structure may be of any useful type, for example as described herein above in relation to FIG. 3B. In an aspect, the sensory content may include a defined narrative such as audio video work, for example a movie, an episode of a serial drama, a documentary, an infomercial, a video game, an advertisement, a talk show or social game, or other programs, animated or not. The data structure may further include an ordered arrangement of components for the sensory content, for example audio video clips or an episode of a series and the like.

The passenger identity 605 and/or passenger profile 610 may be received or retrieved from one or more of the servers 122, 124, 126, 128, 116, and the like. In some aspect of the present disclosure, the sources of the passenger identity 605 or passenger profile 610 may include another server, or from an application (or "app"), or from a third-party server. For example, the source may be a server or an application from a tour company. In an aspect, passenger identity or profile may include at least the vehicle's trip origin, destination, an estimated duration, and places along the trip's route. In one aspect, the passenger uses her smartphone communicably connected to the vehicle 106 to hail the vehicle 106 using a ridesharing app (e.g., Uber, etc.) to take a trip on the vehicle 106 to a desired destination. As part of hailing the vehicle 106, passenger identity 605 and passenger profile 610 may be collected from the smartphone by the processor 202, 214, or 302. For example, at least the destination and timing (trip start time and estimated or actual end time) may be collected. In other embodiments, the passenger profile 610 may be collected or inferred from input by the passenger via U/I 324, or from available information on the internet including social media information pertaining to the passenger (e.g., Facebook accounts, etc.). In certain embodiments, passenger profile 610 may include data bits that signify mood (discussed in more detail below), desired vehicle experiences, passenger watchlists or alert lists, news and current events, and other information of evident interest. Similarly, the processor may collect passenger identity 605 and passenger profile 610 for use cases other than the ridesharing scenario described above, using similar or other means that may be appreciated by those having ordinary skill in the art.

At the process 530, the one or more processors access preference data 610 and geographic location data 615 for the detected passenger. As used herein, the preference data is a subset of a passenger profile, and it is defined as electronic data that describes the preferences of one or more users for sensory output, and may include, for example, favorite types of entertainment, actors, characters, genres, colors, color scheme, music, and so forth. The geographic location data is defined as data representing geospatial location of a data target, and may include, for example, positional coordinates such as the latitude, longitude, and height relative to an ellipsoidal Earth model as may be provided by a satellite-based radio navigation system such as the Global Positioning System (GPS), street address, name (e.g., landmark or building names such as the Golden Gate Bridge, San Francisco International Airport, Stanford University, city name, etc.), street view (e.g., Street View available on Google Maps, etc.), and the like of the data target. The preference data 610 and geographic location data 615 may be accessed from one or more of the servers 122, 124, 126, 128, 116, and the like, and they may be collected in a manner like the examples for that of the passenger identity 605 and passenger profile 610 described above.

At the process 540, the method may include producing sensory content by at least one of selecting or configuring the sensory content components from the sensory content database. In an aspect, the selection or configuration of the components is based on the preference data 610 and the geographic location data 615. In another aspect, the selected or configured components refer to at least one place along the route while in-bound from or out-bound to a trip destination as part of the defined narrative. In an aspect, time (for example, hour, day, month, season, etc.) of the trip may also be used in the selection or configuration of the sensory content components. The method may also include selecting or configuring, and producing the sensory content based in part on the specifications of the hardware such as the media player for entertainment consumption at each vehicle, for example whether the media player has 3D or virtual reality/ augmented reality capabilities. In another aspect, the selection or configuration of the components is based on the passenger's mood as indicated by, or detected based on, one or more emotion indicators 640. In further aspect, the selection or configuration of the components includes selecting a second passenger to share the vehicle based on matching an interest of the second passenger to the sensory content. In some aspect, the sensory content may be a still or video image for projecting to a display surface in or on the vehicle 101. The one or more processors at process 540 may use a sensory content algorithm, which may be a rule-based algorithm, a predictive analytics (AI) algorithm (sensory content AI), or a combination of both, to select and configure a sensory content for the identified passenger. Further details of the structure and operations of the sensory content algorithm will be discussed below with reference to FIGS. 6A-8C.

In some aspect, the selecting and configuring operation at the process 540 may be configured to process destination or route features. For example, destination or route features may include digitally encoded data bits concerning the fastest route to a destination, the shortest route, whether to avoid highways, whether to avoid tolls, whether the route includes one or more intermediate destinations, traffic condition (e.g., construction, weather, or accident causing a traffic delay), etc. The destination or route features may additionally or alternatively include data bits related to destination information, such as a theme park, a conference or meeting, an outdoor activity (e.g., national parks), baseball or other sports event, concert or other live performance, shopping or dining destination(s), social occasion of any type (e.g., birthday party, graduation party, etc.), holiday or season (e.g., Halloween, Fourth of July, etc.), and the like.

In some embodiments, the method executed by the one or more processors running rule-based algorithm responds to words uttered or otherwise expressed (e.g., via text input) by the passenger and detected by the vehicle 101 via the U/I 324, microphone 314, sensors 328, etc., or intentional gestures performed by the passenger and detected via the U/I 324, one or more sensors 328, or the like, and configure sensory content. For example, the passenger riding a vehicle 106 equipped with a virtual display device 400 may utter a voice command, "Play Harry Potter movie," upon riding the vehicle 106, and in response, the selecting/configuring process may select or configure an appropriate sensory content, for example, playing a movie file corresponding to the film, "Harry Potter and the Sorcerer's Stone" on a virtual display device 400.

In an aspect, the processor(s) executing the personalization method 500 may adopt the following rule-based algorithm (e.g., for passive viewing of sensory content):

Time_of_ride=Distance to location/AvgVelocityTrafficConditions ($T=D/V$)

(A) For a content package composed of three creator-defined story acts, 1-3, define story segments per act and give the segments a priority of 1-N. Story segments may be comprised of traditional story elements such as: Point of Attack, Inciting Incidents etc.

(B) For a given sensory content, define: Min_show_length as a summation of all high priority segments for each act. Ideal_Show_Length=min_show_length+Ride_length_uncertaintyFactor (all of the units are in time), where Ride_length_uncertaintyFactor is a calculated value for the average amount of time the time prediction for a length of the ride is wrong for a given day, time and route that a ride on a vehicle is requested by the passenger.

(C) After a ride is requested and Time_of_ride is calculated, present viewing options to the passenger based on the Ideal_Show_Length time, where content packages are not equal to min_show_length but min_show_length+margin, where the margin is produced by adding priority (2−(N−1)) segments.

(D) Add/combine said priority segments to come as close as possible to the Ride_length_uncertaintyFactor, such that the sensory content can be reliably altered in real time to converge on a show that adjusts to be substantially equal to the ride length.

For example, data for content selection may be based on Time_of_ride, previously viewed content history, demographics, personal preference, geographic location or ride origin/destination. Preference may be given to films or generated content (e.g., film-origin or VR/AR content, etc.) from geographic location of rides on a vehicle or personal preference locations. For example, personal preference may include preference data 610, or data representing user/passenger input via the U/I 324, sensors 328, microphone 314, etc., indicating that the passenger likes Batman and Gotham City settings, Marsscapes settings, Aquaman in underwater settings, or the like. Sensory content selection may reflect such personal preference.

In some embodiments, the predictive analytics (AI) algorithm 630 may be used to predict stories and story elements of the sensory content likely to appeal to the detected passenger, and/or to configure mood-sensitive content for the vehicle 101. The details of data streams and operations of an example of the predictive analytics algorithm 630 are described with reference to FIGS. 6A-6C, below. It should be noted that instead of or in conjunction with the biometric data 620, any one or more of the passenger identity 605, passenger profile preference data 610, geographic location data 615, and destination or route features 650 may be used, and instead of or in conjunction with the emotional indicators 640, other sensory data detected by sensors 328, or data input by a user (passenger) via U/I 324 or 314 and the like may be used.

In some embodiments, the vehicle personalization operation 500 may include supporting continuity of play or execution of sensory content between different vehicles, platforms, and or rides. For example, suppose the passenger initially receives a sensory content (e.g., the Happy Potter movie) for enjoyment inside a ride share (such as Uber, etc.) on vehicle 106 on his way to a first destination (e.g., the airport). Once arriving at the first destination (e.g., the airport) or upon receiving an input from the passenger to pause the play of the sensory content, the processor(s) executing the selecting/configuring operation 540 may pause the sensory content. The position of the pause in the sensory content may be stored as part of the passenger profile 610 as metadata or the like. Then, once the passenger boards another vehicle 108 (e.g., an airplane for the passenger's flight) or upon specifically requesting resuming the sensory content on a different vehicle 108 (or a different sensory output device 300), the sensory content may be seamlessly resumed to support continuity of the sensory content.

In an aspect, the vehicle personalization method 500 at the process 540 may configure mood-sensitive content components of the sensory content. For example, mood-sensitive content components may include lighting, music and/or ambiance settings of the vehicle 101. In some embodiments, the configuration of the mood-sensitive content may be based on destination or route features 615 such as the destination categories, recent travels (time zone) and time of day. Destination categories may be read, for example, from location history stored in the passenger profile 610, the passenger's smartphone or other connected device capable of location tracking, or the like. Examples of destination choices include, Work, Pleasure, Home, Weekend, Fun, Party, Drinks, Dinner, Date, and the like. Of course, other choices may be possible. That is, historic data which takes into account modus operandi of the passenger, e.g., music listening habits, times of day of travel, travel destination, and what routes the passenger travels, may be used to configure the mood-sensitive content. If such data does not exist for the passenger, then one may be preassigned (randomly or otherwise) as a default. For example, lighting inside the vehicle may be set to match a color temperature of outside environment if day time, and if night time, the lighting may be set based on the type of travel, e.g., a bright and flashy party lights for Party night-out, or a romantic soft lighting for Date, etc. Passenger may override the lighting/ambiance settings via voice commands or other user commands.

At the process 550, the one or more processors deliver the produced sensory content selected or configured at the process 540 to the vehicle or the one or more sensory output devices such as the sensory content consumption apparatus 300, including but not limited to the virtual display devices 400, 4100, and 4200 and any or all of the components thereof.

In some embodiments, the vehicle personalization method 500 includes dispatching the vehicle 101 selected from a set of different available vehicles, based on the sensory content, at the process 550. For example, the sensory content may be a merchandise, such as a plush toy of Bugs Bunny, or a Starbuck's coffee, in case the result of the process 540 or the passenger profile 610 or preference data 610 suggests that the identified passenger prefers such merchandise. Such merchandise may be located in the selected vehicle 101, or the merchandise may be delivered to the passenger or the vehicle 101 along its route, for example, before the vehicle 101 reaches its destination. The means of delivery may include drones or traditional delivery services such as a courier or a parcel service. In some embodiments, the sensory content will render the vehicle 101 as an "escape room," where the vehicle 101 pulls up at a location designated by the passenger for providing an ordered sensory content.

At the process 560, the one or more processors obtain one or more emotion indicator feedback from the passenger, which may be looped back to the process 540 to further refine the process of selecting or configuring of the sensory content. process 540 uses a predictive analytics algorithm to correlate biometric data for a user (passenger) or user cohort to an emotional indicator. Optionally, the predictive analytics algorithm may be configured to process context-indicating data in addition to biometric data, which may improve accuracy. Context-indicating data may include, for example, user location, user position, time-of-day, day-of-week, ambient light level, ambient noise level, and so forth. For example, if the user's context is full of distractions, biofeedback data may have a different significance than in a quiet environment. An emotional indicator may be a symbolic value that relates to an emotional arc. The indicator may have constituent elements, which may be quantitative or non-quantitative. For example, an indicator may be designed as a multi-dimensional vector with values representing intensity of psychological qualities such as cognitive load, arousal, and valence. Valence in psychology is the state of attractiveness or desirability of an event, object or situation; valence is said to be positive when a subject feels something is good or attractive and negative when the subject feels the object is repellant or bad. Arousal is the state of alertness and attentiveness of the subject. The predictive analytics algorithms may include at least one supervised machine learning (SML) algorithm, for example, one or more of a linear regression algorithm, a neural network algorithm, a support vector algorithm, a naïve Bayes algorithm, a linear classification module or a random forest algorithm.

The process 540 may select destination branches at narrative forks of sensory content, based on emotional indicators, predictions of emotional response, and a targeted emotional arc for the passenger/user or cohort. A participating control node may make predictions using machine learning tools to predict narrative elements likely to produce a targeted emotional state in the passenger/user or cohort. Once making the prediction, the control node selects the branch having the combination of elements scored as most likely to produce the targeted emotional response. In addition, the control node may base the branching decision partly on player actor direct input in a manner resembling an interactive video game, by weighing direct input together with emotional indicators. Direct user input may include, for example, spoken or texted verbal input, input from a game controller, bodily movement detected by a camera array, or selection of control links in a user interface. Further, the control node may base the branching decision partly on contextual indicators, such as dialog with NPC's or other player actors. Other examples of user input and emotional indicators may include, for example, eye tracking (gaze at ratio for engagement), facial action units (valance/arousal), heart rate (from a biometric sensor), IR (heat as a tell for arousal), and pupil dilation (arousal).

At a high level, in an aspect, sensory content may be caused to alter itself based on engagement (eye tracking gaze) and arousal from content and or from the emotional arcs. The sensory content will change and auto edit in order to keep passengers engaged. Content alterations for engagement at a basic level involve changing the music and SFX volume/mixing to re-engage. Brightness of the screen may also be adjusted.

In an aspect, if low engagement (eye tracking measured gaze angle/time) or low arousal based on biometric signals (lower than baseline arousal from sensors), the sensory content may be re-edited in real-time with alternate contents with more attention grabbing performances (as defined by the creative) to engage the passenger. Alternate segments may be identified and stored in a database described herein for this function.

An example of a rule-based algorithm for changing and auto editing the sensory content is provided below:

```
Baseline_arousal_for_rider = sensor_type_arousal_measurement under no
stimulus
    Start ride
    Start calibration signal
    Measure baseline arousal & valance
    Provide content selection
    Play content
    [ while content plays
        monitor arousal and engagement of viewer
        if (arousal && engagement (via eye gaze detection) < baseline_arousal &&
        engagement
        {
            increase volume by 5%
            play_Alternate_sequences_in_Show_to_increase_arousal count++; '
    count how many attempts made to re-engage viewer
        }
        if count >15 ' after 15 tries present user the option to change show
        {
        prompt user to ask if they would like to watch another show
        if yes present other show options and if no continue to play and disable
    content alterations via biometrics
        }
    ]
```

For example, engagement via gaze detection is determined by the type of content and average time engaged viewers watch the show without looking away.

A sensory content control node may be configured to change the characteristics or behaviors of characters, objects, or environments appearing in sensory content (collectively, "supportive content"), with or without altering the narrative. A supportive content selection operation at the process 540 selects characteristics and behaviors of audio-video elements based on emotional indicators, predictions of emotional response, and a targeted emotional arc for the passenger/user or cohort. Supportive content selection may predict responses to changes and weigh emotional inputs with user inputs, using techniques that parallel branch selection. For example, a first user's past responses may indicate an association between the color red and happiness, while a second user's responses indicate an association between green and happiness. For scenes intended to be happy, the supportive content selection operation may cause more red objects to be displayed for the first user, and more green for the second user. More complex supportive content selection may include character interactions, which is discussed further herein below.

How do you quantize emotion? Emotions cannot be measured directly therefore we must measure sentic modulation. Sentic modulations are modulations of biometric waveforms attributed to emotional states or changes in emotional states. In an aspect, to obtain baseline correlations between sentic modulations and emotional states, player actors may be shown a known visual stimulus (e.g., from focus group testing or a personal calibration session) to elicit a certain type of emotion. While under the stimulus, the test module may capture the player actor's biometric data and compare stimulus biometric data to resting biometric data to identify sentic modulation in biometric data waveforms.

Predictive analytics, including machine-learning algorithms sometimes referred to as artificial intelligence (AI), can be an efficient tool for uncovering correlations between complex phenomena. As shown in FIG. 6A, a system 600 for controlling output of sensory content responsive to sensor data (biometric data) 620 indicating a user's emotional state may use a sensory content production process 630, e.g., a predictive analytics algorithm using artificial intelligence (AI) to detect correlations between sensory content and narrative stimuli 620 and biometric data 610. The sensory content production process 630 may receive preference data 620 and/or geographic location data 615 that are time-correlated to the biometric data 620 from client devices (e.g., clients 300, 402, 4102, 4202, and the like). The data may be associated with a specific passenger/user or cohort or may be generic. Both types of input data (associated with a user and generic) may be used together. Generic input data can be used to calibrate a baseline for emotional response, to classify a baseline emotional response to a scene or arrangement of sensory content elements.

The sensory content production process 630 compares human and machine-determined scores of components or other sensory content elements and uses iterative machine learning methods as known in the art to reduce error between the training data and its own estimates. Sensory content analysts may score data from multiple users and vehicle trips based on their professional judgment and experience. Individual users may score their own content. For example, users willing to assist in training their personal "director software" to recognize their emotional states might score their own emotions, interests, affinities or the relevance of produced content to trip information while consuming the sensory content. A problem with this approach is that the user scoring may interfere with their normal reactions, misleading the predictive analytics algorithm. A combination of these and other approaches may be used to develop training data for the sensory content production process 630. Once the process has learned correlations for a user or group of users, it is ready to apply its learned correlations during real-time content consumption.

Figure 6B:
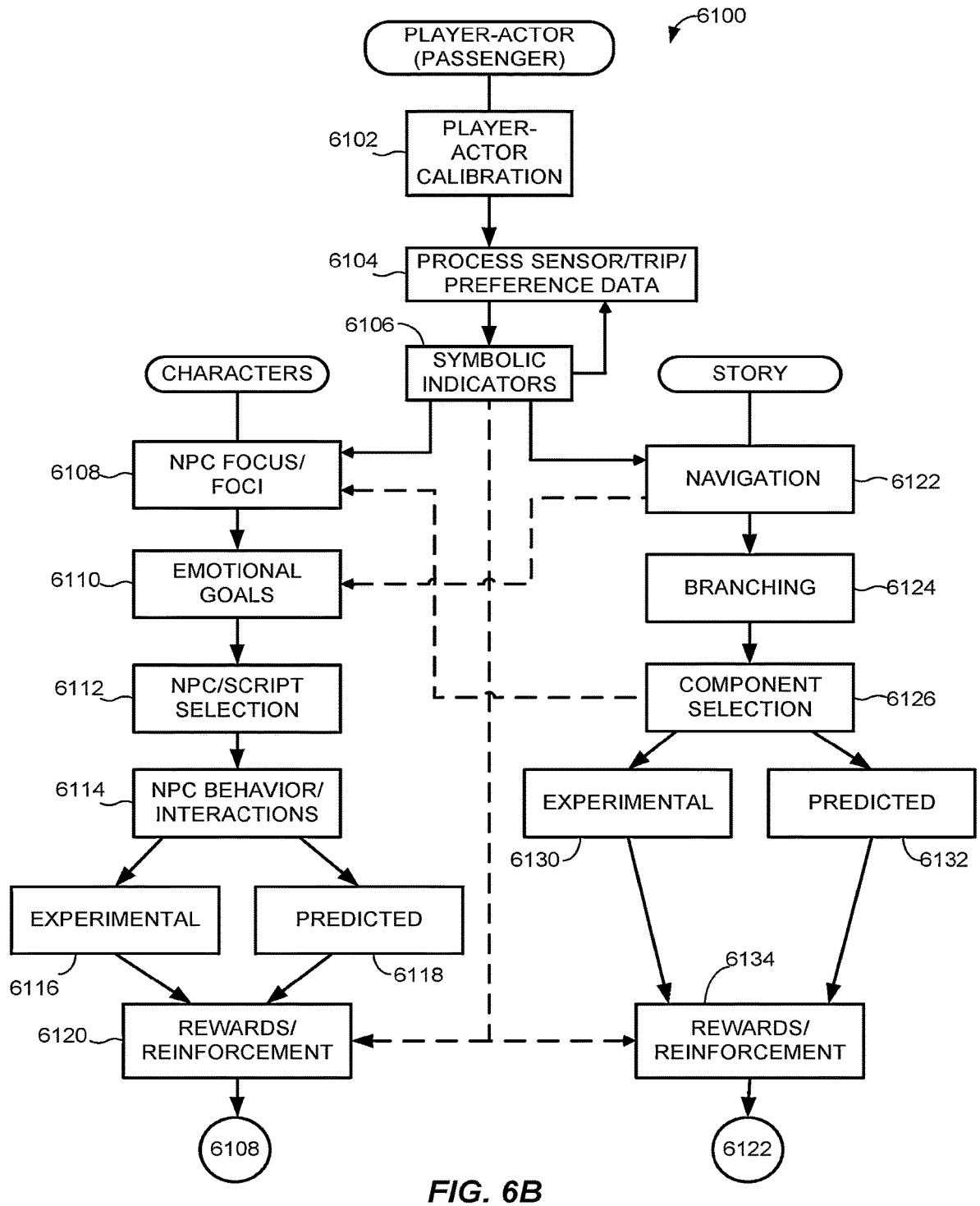
FIG. 6B is a flow diagram showing aspects of a method for personalizing sensory output for a vehicle or in relation to a vehicular trip, involving controlling output responsive to sensor data indicating a user's emotional state.

FIG. 6B shows aspects of a method 6100 for personalizing a vehicle by controlling output of sensory content responsive to sensor data indicating a user's emotional state, using cooperating AI loops. The method 6100 provides a more detailed example of an aspect of the methods overview 500 illustrated by FIG. 5, in which a player actor interacts with a story arc and with computer-controlled characters (e.g., "bots" or NPCs) that play roles within the sensory content. Such characters are an example of supportive content, which supports but does not nullify the narrative and emotional arcs that the sensory content is designed to follow.

Blocks 6102-6104 correspond to a player actor loop. At 6102, a sensory output device (e.g., content consumption apparatus 300) calibrates itself for use by a player actor. This may include training of a predictive analytics algorithm, taking baseline measurements, downloading available calibration data from a server for use in a session with the player actor, or other customization.

At 6104, the media player begins playing the sensory content and the player actor begins experiencing it while the content consumption apparatus's sensors begin detecting trip information for relating the output to the trip, personal affinity and preference data, and biometric signals used for emotional indication. Biometric sensors used to detect the biometric signals are known in medical fields and may be adapted for sensing in the present application. For example, sensors developed for medical uses capable of monitoring physiological signals may include, for example, electromyography (EMG) sensors, electroencephalography (EEG) sensors, galvanic Skin Response (GSR), electrocardiogram (ECG/EKG) sensors; optical sensors that detect body language, facial expressions, gaze direction and corneal deformation, microphones and other sensors as more fully described in International App. No. PCT/US2018/053614. The processor may receive trip information data from a ride hailing application and augment the data during a trip by the vehicle navigation system and road condition sensors. Road condition sensors may include, for example, accelerometers, cameras, microphones and laser distances sensors. The processor may obtain affinity and preference information from each passenger profile or log-level mobile activity. The processor may infer preference and affinity information based on emotional response data (e.g., valance and arousal) to genres, types, and other aspects of sensory content.

At 6106, the system 600 (e.g., the content consumption apparatus, optionally with participation by network nodes) digitizes and processes sensor data, thereby deriving symbolic emotional indicators that can be correlated by storytelling software to emotional targets of a story arc and semantic indicators for correlating trip information to media components. Machine learning/AI tools may be used to process the sensor data and derive indicators in real time.

Blocks 6108-6120 correspond to a non-player character (NPC) loop. At 6108, a processor of the media player determines a focus or foci on one or more NPCs. Relevant input to the determination 6108 may include emotional indicators from the player actor loop (block 6106) and a scene identifier from the story loop (block 6126). The scene identifier may be based on trip information. From the scene data, the processor narrows the list of available NPCs to those available for the scene at hand, for example using a database query to retrieve all NPC identifiers that the content designers have associated with the scene. The player actor's current emotional state from process 6106 is used at a later stage described below.

Further relevant input to process 6108 may include the NPCs' emotional impact scores. Each NPC may be associated with a predetermined emotional impact score, which may be generic or customized for the player actor. For example, a young child NPC might be scored high on a generic sympathy scale and low on a sympathy scale customized for a player actor who has an aversion to children. The emotional impact score is a predictive value based on experience of the content designer and/or empirical data. When well-crafted, the NPC's emotional impact score will predict the emotional reactions the NPC is most likely to evoke in the player actor. For example, a cute child NPC might score high on sympathy and low on fear. Similarly, the process 6108 may select a tactic for the NPC to use, e.g., confrontation, reassurance, and so forth. Each NPC may be associated with one or more tactics suitable for its emotional profile.

Before selecting an NPC based on emotional impact score, the one or more processors determine an emotional goal or goals for the player actor at 6110. For example, the one or more processors may determine from the emotional arc navigation process at 6122 that a targeted emotion for the player actor is suspenseful anxiety for the scene identified at 6126. Having received a current player actor emotional indicator value from the process 6106 via its upstream process 6108, the goal-setting process 6110 may compare the current value with the targeted value and determine an error. For example, suppose the target is suspense but the current emotional state indicator indicates that the player actor is bored. In response, the goal-setting process sets a goal of moving the player actor from boredom to suspense. The process 6110 may provide the goal to downstream process 6112, which selects an NPC and script for the NPC to operate. In an alternative, the process may select a different tactic for the NPC to follow, which may be associated with different scripts. Continuing the example, the selection process may select an NPC with an emotional impact profile that scores highly for transforming disinterest into suspense for the player actor, and a script that scores highly in the same category.

At 6114, the processor operates the selected NPC according to the selected script. The script may be interactive, such that the NPC behaves differently based on player actor direct interaction with it or on updated emotional indicators. In an aspect, the process 6114 may operate a predicted script illustrated at 6118. The predicted script is the one predicted by the process 6114 to be most likely able to correct the player actor's deviation from the targeted arc. If the predicted script fails, or based on random or quasi-random factors, the process 6114 may operate an experimental script illustrated at 716. Experimental scripts test the player actor's response to untried circumstance. Such scripts may be useful to avoid payer actor boredom with repeated scripts or themes, or when predicted response data is lacking.

At 6120, the processor records the emotional effect of the NPC and script in the relevant data structures used for training the AI algorithms responsible for NPC and script selection. Successes and failures thereby become new data for use in improving the future effectiveness of the method 6100 in using NPC interaction to nudge player actors towards an emotional target. If the nudging is unsuccessful, the process may select and implement a different NPC, tactic, or script at any point when the emotional sensor data indicates that the targeted reaction is not being elicited from the player actor. The method 708 may revert to block 6108 for the next scene.

Blocks 6122-6134 correspond to a story loop. The story loop proceeds similarly to the NPC loop, but is directed to component selection for the main sensory content instead of NPC selection and behavior. At 6122, the processor navigates its trip and story model. For example, the processor may compare its current location and velocity in real space to a location and velocity in a model used for rendering the sensory content, to a library of components related to locations along the route for the current trip, or both. In addition or in an alternative, the processor may compare the player actor's current emotional indicator to an emotional arc defined in digital data for the story as further described in PCT/US2018/053614.

At 6124, the processor may select a narrative branch based on predictive analytics for at least one of the player actor or trip information. For example, the processor may determine which narrative branch has the closest semantic relationship to objects along the route for which the passenger has an affinity. For further example, the processor may predict which narrative branch is most likely to result in the player actor experiencing the director's emotional arc, based on an emotional impact score for the branch. The processor may score semantic or emotional elements by taking an aggregate of scores for the scenes that the branch contains.

At 6126, the processor selects the next component in the narrative branch, again based on the scoring. A single narrative branch may contain alternative components that do not change the main story line but are tailored for greater semantic relevance, greater passenger affinity and/or emotional impact for users. For example, the same story may be told using different components for child and adult player actors. If the processor detects no emotional error, it may use a default component or branch. In an aspect, the processor may use an identity of the selected component for further customization of the NPC character as previously described.

At 6130 and 6132, the one or more processors select a component based on a predictive analysis 6132, or an experimental trial 6130. Predicted and experimental components may be selected by the one or more processors based on the same or similar factors used to decide between predicted and experimental NPCs and scripts. At 6134, the one or more processors record the measured emotional response for improving future AI predictions. Thus, a player actor loop, NPC loop, and story loop may run concurrently and cooperatively to actively implement schemes that interact with trip information and with sentic modulations of player actors, including the branch, scene and NPC control schemes for influencing player actors towards targeted emotional arcs and achieving relevance of content to travel undertaken as outlined above.

Figure 6C:
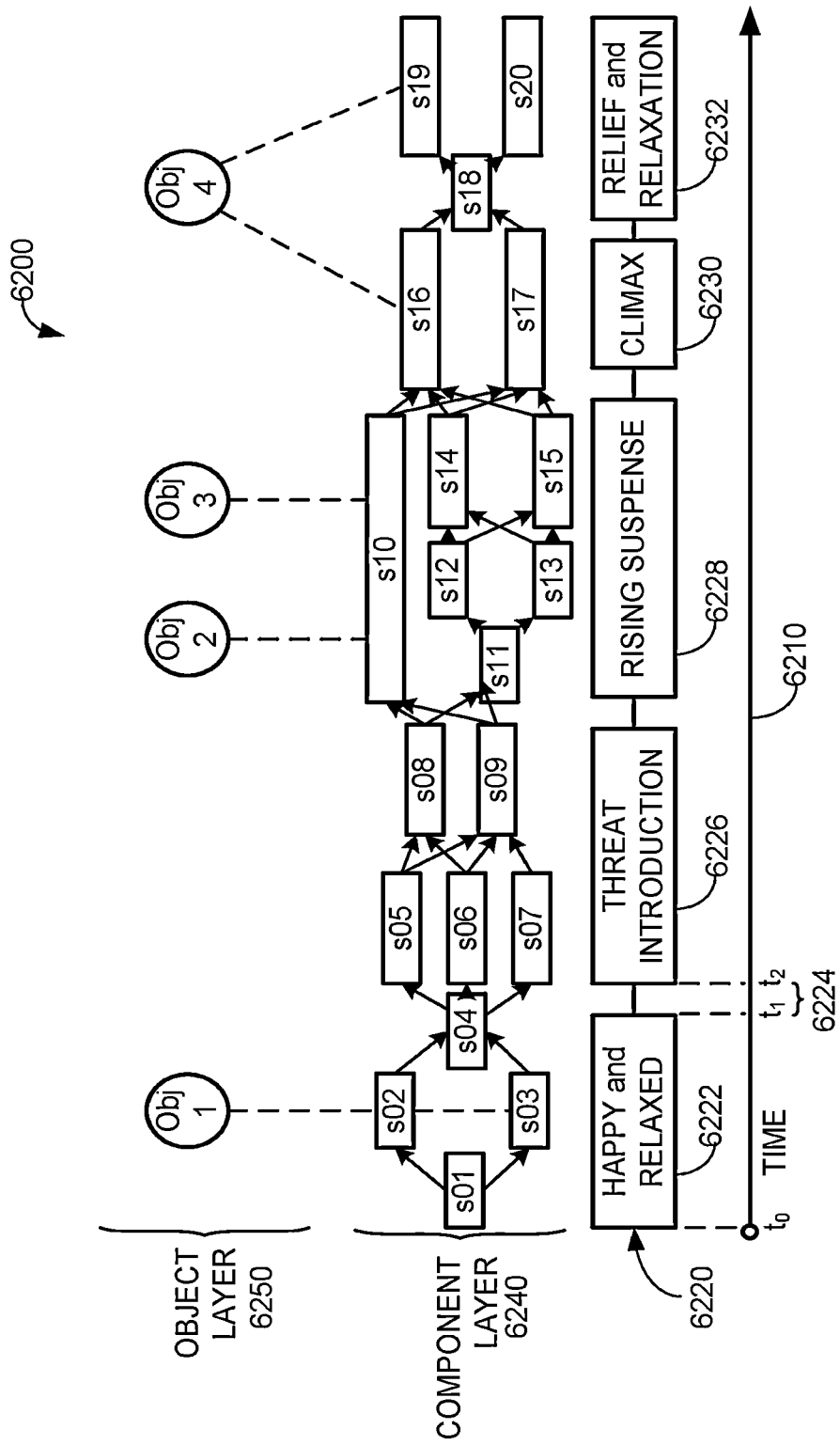
FIG. 6C is a concept diagram illustrating a map of layers and branching of sensory output for a vehicle with an emotional arc responsive to sensor data indicating a user's emotional state.

FIG. 6C shows a map 6200 of layers and branching of sensory content with an emotional arc 6220 responsive to sensor data indicating a user's emotional state. While the map is correlated to an emotional arc, in an alternative or in addition, the map may likewise be correlated to events during a trip and weighted by passenger affinity or preference information. The map is time-correlated against a timeline 6210 beginning at initial time t0. The emotional arc 6220 includes a sequence of target periods that summarize predominate emotions during a time interval. For example, a predominate emotion in the first segment 6222 is happy and relaxed, in the second interval 6226 threat awareness (mild fear), in a third interval 6228 rising suspense, in the fourth interval 830 climax (excitement), in the fifth interval 6232 relief and relaxation. The intervals may be separated by transition periods, a first 6224 between times t1 and t2, in which emotions overlap. Emotion arcs may be modeled by other models. For example, instead of a chain of intervals 6220, an emotional arc may be modeled as a vector of periodically (e.g., every 5 seconds or less) updated variable values, wherein each value of the vector represents a quantitative value of an emotional quality. The division into segments of predominate emotion is merely a convenient summary.

Component layer 6240 may be, or may include, a directed acyclic graph (DAG) of nodes (e.g., nodes s01-s20) each of which may be, or may include, a media segment. A story tree is a restricted form of DAG, in which each child node can have only one parent. Component layers can be arranged in trees, or in any other DAG. FIG. 6C shows a component layer 6240 in a DAG not restricted to a tree. Some downstream components can have more than one parent, and the layer can separate into parallel chains in spots. For example, component s04 has two parents, s02 and s03. Components s12-s14 form competing parallel sub-chains. Each component has a definite length in time. For example, story software may define a maximum length of time for interactive content components as the maximum time allowed for NPC's or components to reach an emotional target before giving up. Gaps are shown between components merely for illustrative separation. In most sensory content, each component should fit or blend smoothly with the next. Gaps may be avoided by predicting each player actor's preferences to delete certain components or moments, for example, based on prior offline data or an initial calibration exercise. In this manner, knowing that some gaps would otherwise occur if certain components or moments were to be abridged, the story controller may call up replacement components or moments, or implement seamless 'branching' to an appropriate next node or set of nodes to avoid gaps. In some embodiments, methods as described in U.S. Pat. No. 7,330,638 may be used to configure branching or other content that includes scenes.

Certain media segments may be configured by a processor to encourage user engagement with further content. For example, a processor may, based on detecting the last segment in a session (e.g., S19 or S20), a segment coinciding with certain events during a vehicle trip, segments at set intervals, or a segment satisfying any other useful condition, configure the segment to include a call to action, with or without offers of incentives such as, for example, discounts or perquisites. Configuring may include, for example, selecting a prerecorded call to action, constructing a call to action using a rules-based algorithm or heuristic algorithm, or any useful combination of the foregoing. In addition, a processor may save a content package produced for a certain user and trip for later replay by the user, or by other users.

Object layer 6250 holds any emotion-influencing objects that appear in any scene, affect the appearance or any sensory content component, or change the audio content of any component. Objects can include interactive NPCs and their scripts as previously described, props, backgrounds, environments, lighting schemes, surface colors and textures, audio tracks, or any other object in a component that is controlled to evoke an emotional response in a player actor. In layer 6250, a first object 'Obj. 1' can appear or operate in components s01-s02. Second and third objects 'Obj. 2' and 'Obj. 3' appear or operate in long components s10 only. A fourth object 'Obj. 4' can appear or operate in both components s16 or s19. Few objects are shown in the map 6200 for illustrative simplicity. In an actual map of most sensory content, most components will be associated with numerous different objects. Although the map 6200 is simplified, it illustrates an example of a map such as may be used to provide structure and guidance to sensory content production during a multi-loop control process 6100 as illustrated in FIG. 6B.

Figure 6D:
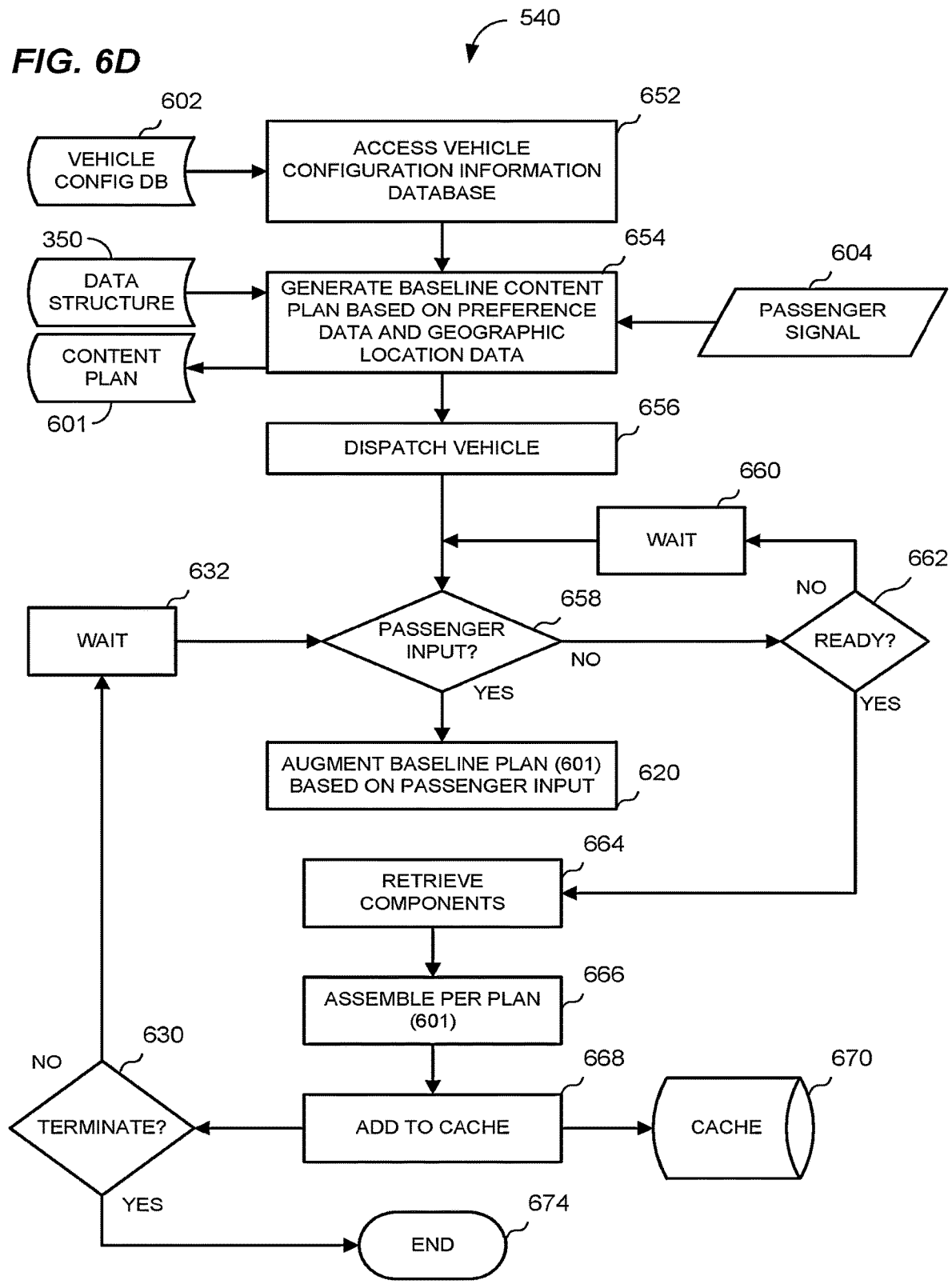
FIG. 6D is a is a flow chart illustrating aspects of assembling by one or more processors sensory content from a set of media components based on passenger signal information.

Based on the information as described in connection with data structures 350 and/or 1900, a server may assemble sensory content for use during a trip. For example, FIG. 6D shows a method 540 for assembling by one or more processors a sensory content for delivery to the passenger in a vehicle based on the preference data 610 and geographic location data 615 accessed by the processor at block 530 (FIG. 5). At 652, the processor may access vehicle configuration information database 602 and determine vehicle configuration for vehicle 101. For example, the vehicle 101 may be configured with 4D chairs, light field display 412, and one or more other sensory output devices suitable for 4D cinema experience.

At 654, the processor may generate baseline content plan based on the preference data 610 and geographic location data 615, which may be received as part of the received passenger signal 604, which may be contained in the data structure 350 (and/or 1900, not shown). For example, based on one or more records (e.g., in a passenger profile) stating the passenger prefers English-language content, lives in Los Angeles, and likes romantic content, the server may filter out identifiers for non-pertinent content components from its library of all available content components. The server or processor(s) may generate the plan based on passenger profile, the geographic location data such as the trip origin and destination, ride length, preference data, and other criteria as described elsewhere herein. The plan 601 may comprise a sequence of sensory content components with or without other content components, arranged in a list or other useful data structure. At 656, the processor may dispatch a vehicle 101 equipped with vehicle configurations that are compatible with the content plan 601 to the passenger.

At 658, the server may determine that a passenger input (e.g., biometric data 620) has been detected, via sensors 328, 402, 4102, 4202, etc., or via U/I 324. If the user input is detected, the server may update the content plan 601 based on the detections(s). Although not shown in FIG. 6D, the augmentation process 620 may use the most recent copies of the data structures 350 (or 1900) available. For example, if a preference data is deleted or changed, the server may remove components picked for a deleted preference, add components picked for the new preference, and adjust components based on changes in estimated ride length. At 660, the server may wait for the next passenger input to occur. If, at any time or times while waiting 660, the server determines at 662 that it is ready to assemble and produce the sensory content (e.g., video) for presentation in the vehicle under travel, at 664, it may retrieve the sensory content components for assembly. Then, at 666, the server may assemble the sensory components into the sensory content or portion thereof, for example by arranging content segments in a sequence and/or rendering a content component to produce a content segment including video.

At 668, the server may add the assembled components to a cache 670 for delivery to the vehicle 101 or one or more sensory output devices 300. Content in the cache may be streamed or delivered in periodic packages to a sensory output device in or on the vehicle, and thus, produced for consumption in real time. Once delivered, the server may delete delivered content from the cache 670, immediately after delivery, immediately after the trip is completed, or at some later time. At 672, the server may determine whether the production session is completed, for example in response to termination of the trip or termination of the session by the passenger. Once finished, the server may end the session at 674.

Figure 7:
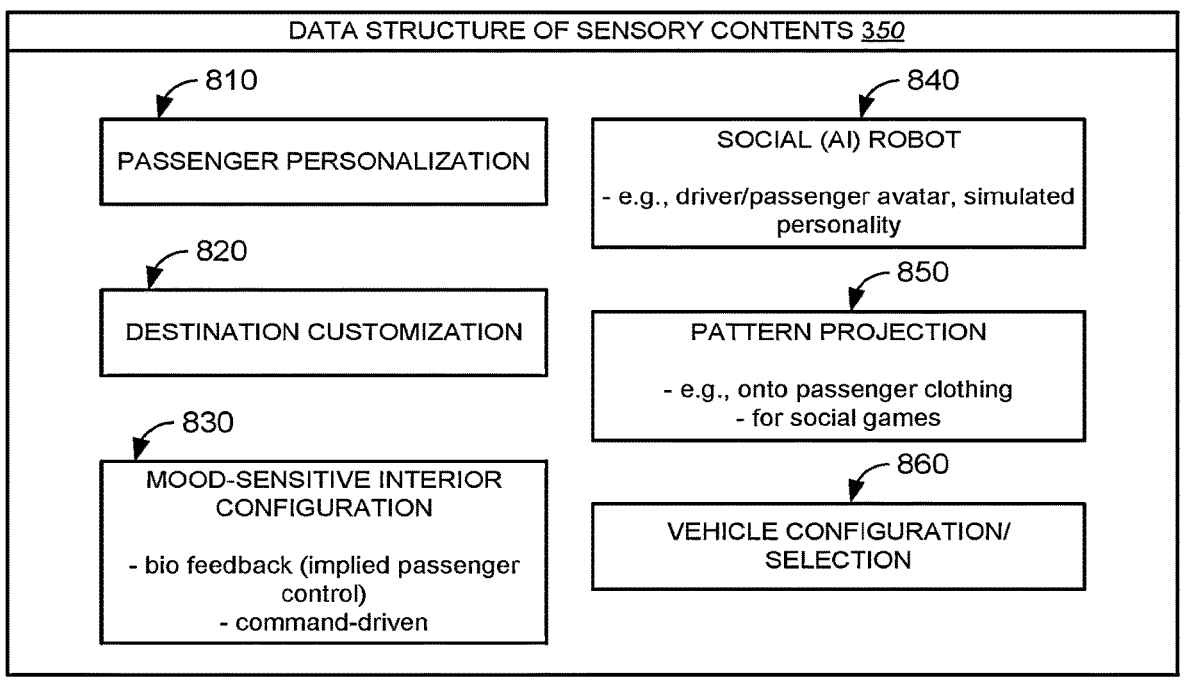
FIG. 7 is a schematic block diagram illustrating an example of a data structure of sensory contents.

FIG. 7 is a schematic block diagram illustrating an example of a data structure of sensory contents, that further elaborate on the data structure 350 in FIG. 3B above. As discussed, systems, apparatus and methods as described herein may make use of a data structure that relates sensory contents in an ordered arrangement of content components to one or more parameters for sensory content, including at least one or more indicators of semantic meaning relevant to one or more of passenger preference data and geographic location data. FIG. 7 shows an example of further details of a data structure 350 for relating content components each referenced by a component identifier 352 to one or more characteristic parameters (indicating strength of preference by, e.g., numerical or contextual value within a predetermined scale of preference, such as on a scale to 1-10, or Strongly Like/Like/Neutral/Dislike/Strongly Dislike, etc.) for the sensory content components, such as passenger personalization 810, destination customization 820, mood-sensitive vehicle interior configuration 830 (e.g., bio feedback that implies passenger control) and command-driven configuration), social (AI) robots 840 (e.g., driver/passenger avatar, simulated personality, etc.), pattern projection 850 (e.g., onto passenger clothing for social games, etc.), and vehicle configuration or selection 860, and/or other characteristic parameters. The data structure may be implemented as a relational database, a flat data table, a distributed ledger, or by any other useful computer-readable digital data structure for storing, locating and accessing related components of binary-encoded data. Related approaches for content customization may include, for example, methods as described in U.S. Pat. No. 7,805,453 issued Sep. 28, 2010, including analyzing received content based on predetermined criteria and rendering only acceptable content for the device wherein user preferences are received via a user interface.

Figure 8A:
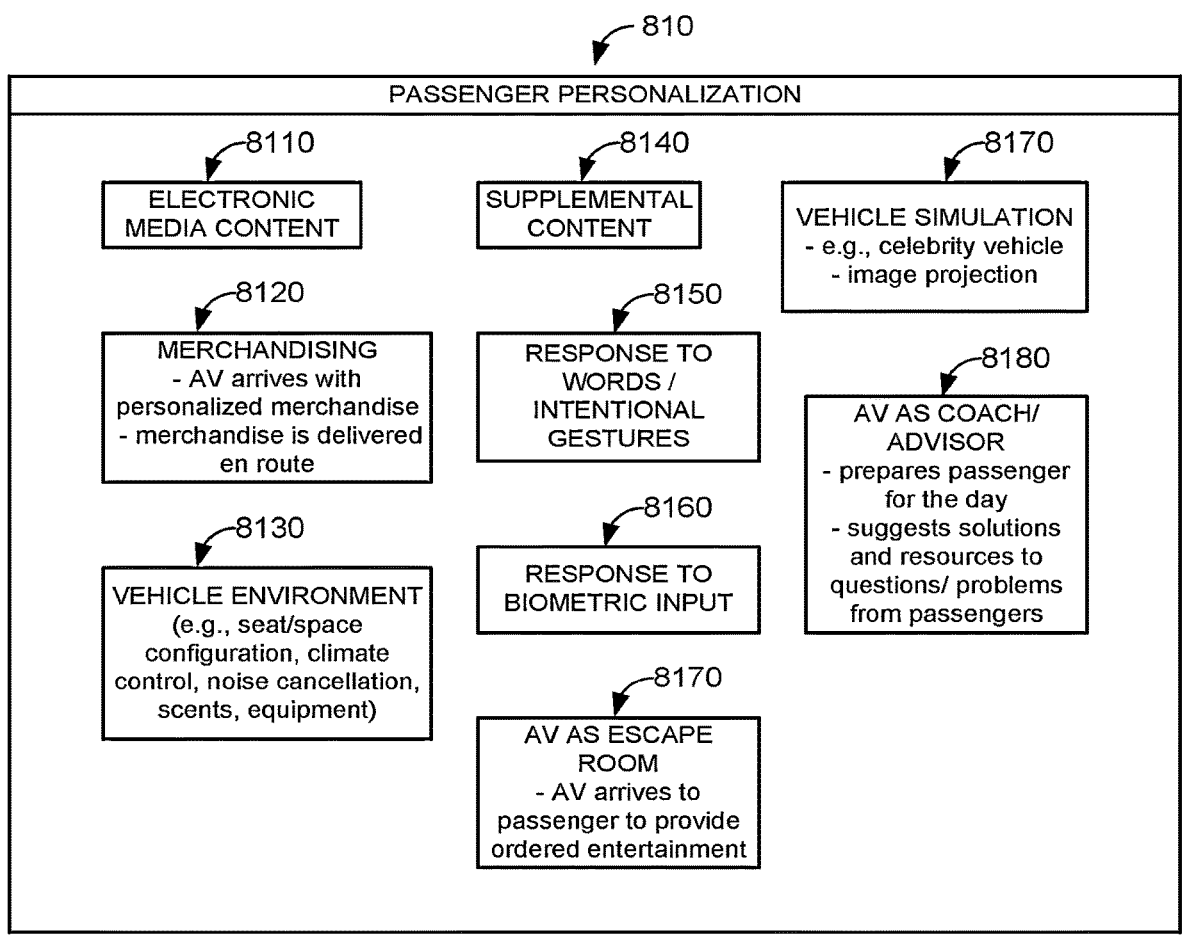
FIG. 8A is a schematic block diagram of the passenger personalization aspects of the database of sensory contents with profile values.

FIG. 8A is a schematic block diagram of the passenger personalization aspects of the example data structure of sensory contents. In some embodiments, the personalization parameters may be set or detected for a single passenger, or multiple passengers as a group, in or boarding the one or more vehicles 101 (group personalization). In some embodiments, the passenger personalization 810 aspects of the sensory contents may include one or more of the following characteristic parameters, and a mix or combination of various degrees of passenger personalization parameters may be processed by the one or more processors in the method of the instant disclosure for selecting or configuring the sensory contents, using a rule-based algorithm or predictive analytics algorithm described elsewhere herein:

Electronic media content 8110: examples of parameters of electronic media content 8110 include audio, video and text; virtual or augmented reality (AR/VR) content, and the like.

Merchandising 8120: vehicles 101 may arrive with personalized merchandise. Examples include characteristic parameters indicating preferred merchandise and shopping styles (e.g., cinema character goods, or shopping at a particular retail store, etc.); cartoon character merchandise, such as a plush toy of Bugs Bunny; brand merchandise, such as a Starbuck's coffee. Parameters may indicate whether such merchandise is located in the selected vehicle 101, or the merchandise may be delivered to the passenger or the vehicle 101 en route. The means of delivery may include drones or traditional delivery services such as a courier or a parcel service.

Response to Words/Intentional Gestures 8150: Sensory content may be selected or configured in response to word input or intentional gestures by passengers (incl. drivers). For example, a verbal input by the passenger, "Play 'Harry Potter and the Half-Blood Prince' movie" would activate selection of the movie, "Harry Potter and the Half-Blood Prince" as the sensory content for consumption during the vehicular trip. In some embodiments, intentional gestures such as the hand gesture by the passenger may be detected by the sensors 328 to control the sensory content. For example, waving the hand from left to right in front of the sensor 328 (gesture recognition sensor) may fast-forward the movie play, etc. Other speech recognition and gesture recognition techniques known in the art may be used.

Response To Biometric Input 8160: Characteristic parameter for sensory content may account for biometric inputs received from the passenger(s) to select or configure the sensory content. For example, in case the passenger is a child, and the passenger exerts negative emotion (e.g., fear) upon seeing a violent scene in a movie, "Star Wars: Clone Wars" movie displayed in the vehicle during the trip, the movie may either be terminated, or the violent scene in question may be censored/filtered for viewing (by the child-passenger only, or entirely).

AV as Escape Room 8170: In some embodiments, the sensory content will render the vehicle 101 as an "escape room," where the vehicle 101 pulls up at a location designated by the passenger for providing an ordered sensory content. For example, the vehicle 101 may be configured as a 4D cinema room equipped with specific vehicle environment 8130 (discussed below) tailored for a 4D cinematic experience of a movie, such as "Harry Potter and the Half-Blood Prince (4D)" ordered for consumption during the vehicular trip by the passenger. In such example, the vehicle would select said movie for showing inside the vehicle during the trip. Also, a 4D seating and display configuration (e.g., 4D chair, VR/AR goggle, etc.) may be selected for provision to the passenger to provide 4D cinematic experience to the passenger during the trip. An Escape Room may be useful for a passenger who does not own home theater equipment to enjoy the movie at home, or who prefers enjoying the movie in solitude (or with a group of select members such as close friends) in a more personal setting, or anyone who prefers a realistic movie experience without having to go to a movie theater.

Vehicle Environment 8130: Examples include configuration or adjustment of vehicle seat or space configuration, equipment such as window screens, climate control, noise cancellation (on/off, degree, locations, speaker selections, etc.), scent/deodorant atomizer, or any other physical features of the vehicle environment. In some embodiments, the vehicle environment 8130 may be configured or adapted to suit context and passenger mood. For example, when the sensor 328 detects that the sun is setting (e.g., based on the color tone, angle of light, and/or tied to sunset information provided by the GPS, etc.) and obstructing passenger's view, the window screen in the vehicle 101 may automatically activate to block the sunlight. In another implementation, when the sensors 328 and biometric data 620 indicate that the passenger has fallen asleep, the vehicle may automatically adjust the seat configuration to a bed mode, and also adjust the climate control to comfortable sleeping temperature (predetermined by the passenger profile, or automatically detected and adjusted according to biometric sensor data 620. In another aspect, vehicle equipment such as the table (e.g., with touchscreen built in and stowed away in a seatback when inactivated) may configure itself to reveal or activate a touchscreen for games, etc., when the passenger requests a game configuration mode.

Supplemental Content 8140: Characteristic parameters of the sensory content may include parameters for providing contents that augment other content the passenger has consumed or is interested in consuming (as indicated by the preference profile, past viewing history, etc.). Examples of supplemental content include movie trailer/teaser, back story/behind the scenes, different perspectives (e.g., character perspectives) or camera angles viewable or selectable for a movie content, side narratives, etc. in some instances, supplemental content may include advertisement contents.

Vehicle Simulation 8170: Vehicle 101 may be "customized," e.g., configured to simulate a particular likeness or appearance, such as a celebrity vehicle including Presidential Limousine or Batmobile, including, e.g., the vehicle appearance, interior configuration, items and objects (e.g., merchandising 8120) within the vehicle, etc.

AV as Coach/Advisor 8180: The vehicle 101 may be configured to serve as a personal coach or advisor, by providing contents that assist or advise the passenger on certain activities or topics. In some implementations, the selected sensory content may prepare a passenger for the day, or suggest solutions and resources to questions or problems raised by the passenger(s). For example, the passenger whose personal profile is a yoga instructor may receive a list of lessons that she is teaching for the day as she commutes to work in the morning, displayed on the display 412 inside the vehicle 101 she rides. The yoga instructor may additionally receive useful information, such as student profiles (level of expertise, progress report, etc.), and video clips showing suggested yoga poses tailored for the students as sensory content output.

Figure 8B:
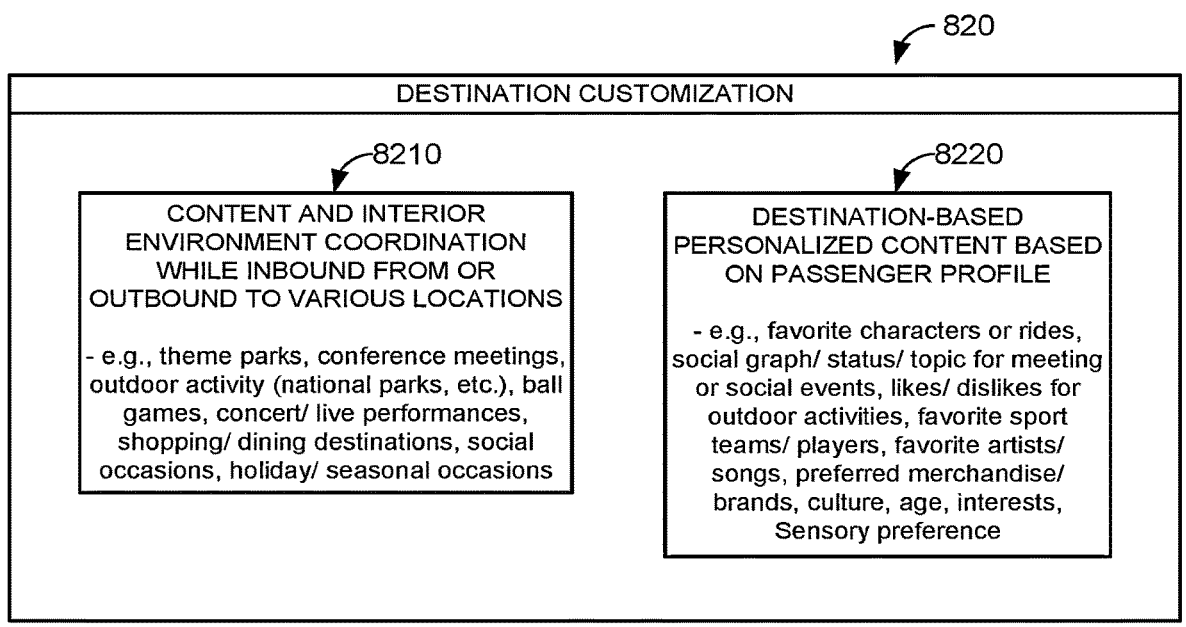
FIG. 8B is a schematic block diagram of the destination customization aspects of the database of sensory contents with profile values.

FIG. 8B is a schematic block diagram of the destination customization aspects of the data structure of sensory contents. In some embodiments, the destination customization parameters may be set or detected for a single passenger, or multiple passengers as a group, in or boarding the one or more vehicles 101 (group customization). In some embodiments, the destination customization 820 aspects of the sensory contents may include one or more of the following characteristic parameters, and a mix or combination of various degrees of destination customization parameters may be processed by the one or more processors in the method of the instant disclosure for selecting or configuring the sensory contents, using a rule-based algorithm or predictive analytics algorithm described elsewhere herein:

Content and Interior Environment Coordination While Inbound From or Outbound to Various Locations 8210: Passenger profile may include preference data such as travel context data regarding a purpose of a trip, for example time, place, booking information, or a stated reason, such that the sensory components are directed to furthering the purpose of the trip, for example, by preparing the passenger for the destination or revisiting an experience at the origin or places along the route. A purpose of a trip may be determined based on the origin or destination, or both, for example, a theme park, a conference, an outdoor activity, a sporting event, a musical performance, a dramatic performance, a cinematic experience, a shop or collection of shops, a restaurant or collection of restaurants, a social event, or a holiday celebration. In an aspect, the purpose of the trip may be determined or received from a tour application or a ride sharing app used or associated with the passenger in hailing a ride on the vehicle 101. For example, if the processor determines that a purpose of the trip is work-related and the business of the passenger is real estate, the processor may select and configure current news regarding notable real estate transactions past and present along the route of the ride on the vehicle 101. As another example, if the purpose of the trip is a leisurely visit to a theme park, the processor may feature introductions to the attractions of the park on the inbound ride and "behind the scenes" content on the outbound ride.

Destination-Based Personalized Content Based on Passenger Profile 8220: Passenger profile may include preference data such as destination-based personal preference, such as favorite characters or rides, social graph/status/topic for meeting or social events, likes/dislikes for outdoor activities, favorite sport teams/players, favorite artists/songs, preferred merchandise/brands, culture, age, interests, sensory preference, and the like, that may or may not be tied to a purpose of a trip. In an aspect, the destination-based personal preference may be determined or received from a tour application or a ride sharing app used or associated with the passenger in hailing a ride on the vehicle 101. For example, if the processor determines that the passenger's favorite cartoon character is Bugs Bunny, the processor may select and configure video clips showing Bugs Bunny as the main character during the ride on the vehicle 101. As another example, if the passenger's sensory preference includes calming music and calming environmental theme, the processor may feature a set of slow-tempo meditation or healing music for playback during the ride on the vehicle 101, and interior lighting will match soothing color tone (e.g., blue hue rather than red), and intensity or volume (e.g., low). If more than the vehicle is traveling as part of a group (e.g. caravan), then an exterior lighting theme can also show membership in the group, with the limiting case of a single vehicle's exterior lighting showing some theme even if other vehicles are not part of the group. In either example above, the purpose of the trip may be determined by the processor as work-related, yet the selected sensory contents in the above examples may or may not have direct relationship to such work-related trip per se.

Figure 8C:
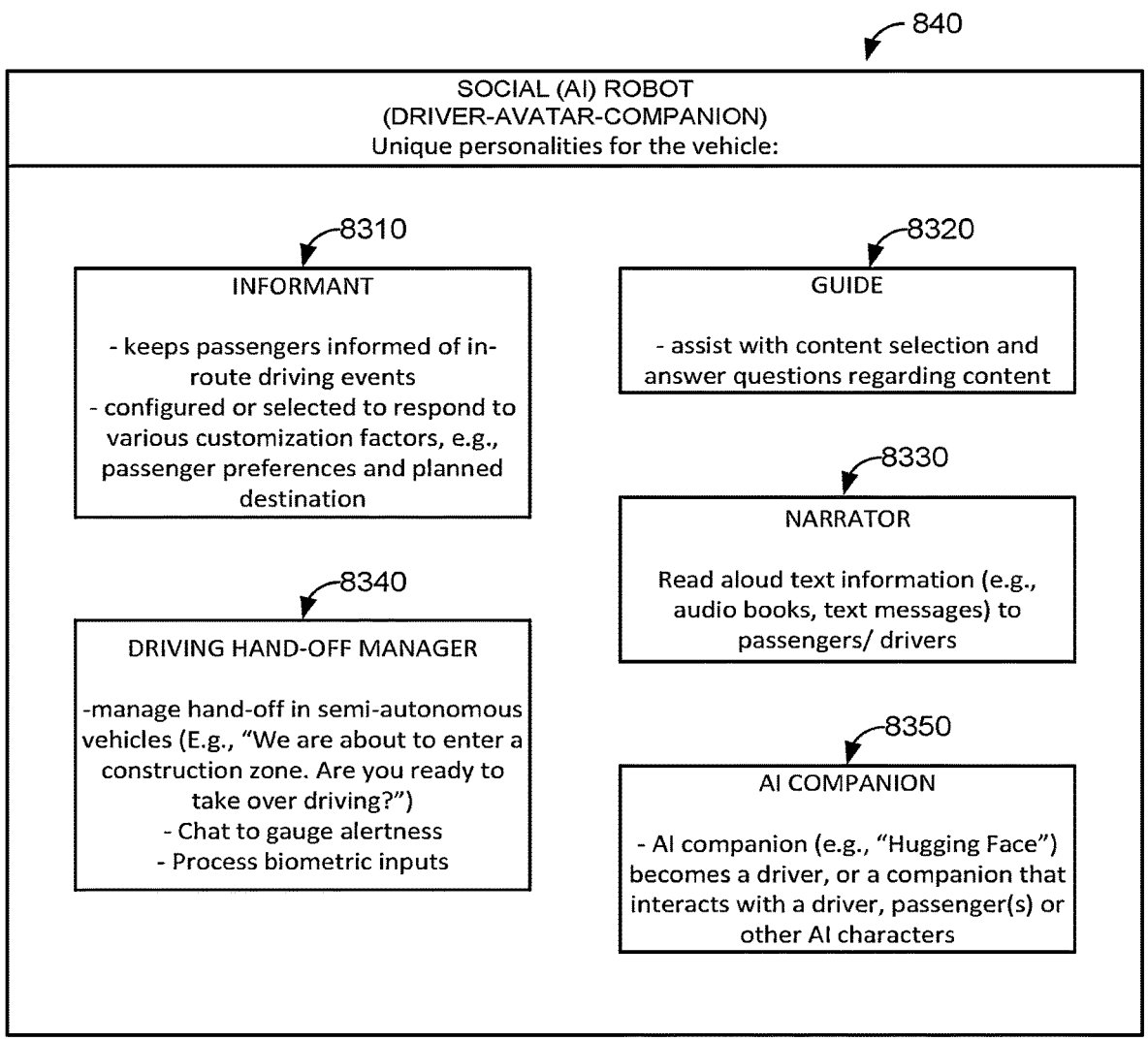
FIG. 8C is a schematic block diagram of the social (AI) robot aspects of the database of sensory contents with profile values.

FIG. 8C is a schematic block diagram of the social (AI) robot aspects of the data structure of sensory contents. Social (AI) robots provide unique personalities or persona for the vehicles 101 that keep passengers informed of in-route driving events. In some embodiments, an AI robot is displayed as an avatar of the vehicle 101 on a display (e.g., 320, 412, 4112, etc.) of the vehicle 101, or the avatar may be a holographic projection inside the vehicle 101 via projector 4212. A different or the same avatar may represent each AI robot parameter described below. In some embodiments, the social (AI) robot parameters may be set or detected for a single passenger, or multiple passengers as a group or individually, in or boarding the one or more vehicles 101 (group customization). In some embodiments, the social (AI) robot aspects 840 of the sensory contents may include one or more of the following characteristic parameters, and a mix or combination of various degrees of AI robot parameters may be processed by the one or more processors in the method of the instant disclosure for selecting or configuring the sensory contents, using a rule-based algorithm or predictive analytics algorithm described elsewhere herein:

Informant 8310: The AI robot 840 may simulate the role of an informant that keeps passengers informed of in-route driving events. For example, the AI robot 840 as an informant 8310 may be configured or selected to respond vocally and/or visually to various customization factors, e.g., passenger preferences and planned destination. Informant 8310 may also provide subtitles for sensory contents to hearing impaired individuals, and larger textual displays for vision impaired individuals.

Guide 8320: The AI robot 840 may serve as a content guide 8320, who assists the passenger(s) with content selection and may also answer questions regarding available sensory contents via audio-visual presentations.

Narrator 8330: The AI robot 840 may serve as a narrator 8330, who is able to read aloud text information to the passenger(s) and/or driver via text-to-speech technology, such as audio books and incoming and/or outgoing text messages. Narrator 8330 may also disqualify drivers from receiving video contents, for safety or other reasons.

Driving Hand-Off Manager 8340: The AI robot 840 as a persona of an autonomous driving or connected vehicle 101 may serve the persona of a driving hand-off manager 8340. For example, the driving hand-off manager 8340 may initiate and respond to hand-off process of the autonomous driving to a human driver by executing an audio and/or visual alert message, "We are about to enter a construction area. Are you ready to take over driving?" In response, the human drive may simply reply, "Yes" or "No," and the vehicle 101 will handle the hand-off procedure accordingly. As such, the hand-off procedure does not involve complicated steps of entering multiple commands or pressing multiple buttons or icons to control the vehicle operation, and rather, it is as if the driver is interacting with a real human persona in dealing with the autonomous driving or connected vehicle 101 with respect to the driving hand-off process. Other vehicular operation processes may similarly be "handed-off" to the human driver via the AI robot 840.

AI Companion 8350: The AI robot 840 may serve as a companion to the passenger(s) or driver during a trip in the vehicle 101. For example, the AI companion may be a social avatar such as Hugging Face (huggingface.co), which may be displayed on the passenger's smartphone device that is communicably connected to the vehicle 101. In some aspect, the AI companion 8350 may provide companionship such as a conversational counterpoint for passengers and/or drivers. For example, a passenger's smartphone may contain an application that simulates a character from movies, online video, television, video gaming or other fiction. When the application senses or receives a message informing it that the passenger is traveling, it may activate the character simulation and operate the simulation to entertain or inform the passenger using the voice and mannerisms of the character. Further details of character simulation may be as described in more detail in International Application Serial No. PCT/US2017/044038 by inventors hereof, which is incorporated herein in its entirely by reference.

FIG. 9 diagrams a useful automatic process 900 for automatically personalizing a vehicle including one or more sensory output devices communicatively coupled to a server, by producing sensory content for delivery to the passenger in the vehicle based on the preference data and geographic location data. In an aspect of the disclosure, the process 900 may be performed by one or more processors at a content server or other servers described herein. At 910, a processor receives a signal indicating at least one of an identity or passenger profile of a detected passenger in or boarding the vehicle. For example, in one aspect, the passenger uses her smartphone communicably connected to the vehicle to hail the vehicle using a ridesharing app (e.g., Uber, etc.) to take a trip on the vehicle to a desired destination. As part of hailing the vehicle, passenger identity and passenger profile may be collected from the smartphone by one or more processors. The sensory content includes sensory content provided to a user/passenger/player actor via software or hardware or both during a time spent in a vehicle, such as electronic media content including audio, video and text; virtual or augmented reality (AR/VR) content; vehicle simulation; image projection/projection mapping; surround screen; olfactory or tactile stimulus; merchandise; vehicle environment configuration, climate control, noise cancellation; artificial intelligence robot; and the like. For example, sensory content may refer to digital audio-video content that is arranged at least in part by a script designed to entertain and evoke emotions in viewers according to an emotional arc. The sensory content may also be configured to support interactive features resembling video game features or may be devoid of interactive features except for responding to data indicative of user neurological or neurophysiological states. The passenger profile may include physical location/city, context such as weather, rain or snow, social trends broadly or in their network, attributes of the person such as age, or a location in a franchise venue universe (e.g., DC Universe). In addition, passenger profile may include a reward status, e.g., points earned in the franchise universe set of venues, including retail stores, parks, and events, and subscription status (e.g. Gold level in DC Universe).

At 920, the processor accesses preference data and geographic location data for the passenger. For example, at least preference data and the destination and timing (trip start time and estimated or actual end time) may be collected as part of hailing the vehicle in the foregoing example. In other embodiments, the passenger profile including preference data may be collected or inferred from input by the passenger via a user interface, or from available information on the internet including social media information pertaining to the passenger (e.g., Facebook accounts, etc.).

At 930, the one or more processors assembles and produces sensory content for delivery to the passenger in the vehicle based on the preference data and geographic location data. In an aspect, the selected or configured sensory content may refer to at least one place along the travel route as part of a defined narrative, topical assembly, or video game. The sensory content may include audio video work of, for example entertainment, instructional information, video gaming, advertisement, and social networking. The sensory content may also include AR/VR content. In an aspect, at least one of the selecting or configuring may include use of a predictive algorithm. For example, the method 900 may further include, by one or more processors predicting an affinity of a user of the sensory output device based at least in part on passenger identity, preference data and the geographic location data, using a predictive algorithm, for example, a machine-learning algorithm based on a deep neural network trained on sensory content relative to affinities of consumers matching the passenger profile. Such an algorithm may include, for example a trained machine learning process or a rules-based algorithm that weights and compares characteristics of passenger profiles to semantic tags in media component metadata.

At 940, the one or more processors deliver the sensory content to at least one of the vehicle or the one or more sensory output devices, for example, by streaming media or by pushing one or more files. In an aspect, a content production server may produce the sensory content, and a content server may stream the sensory content. In an aspect, the content production server and the content server may be co-located or may be combined in one server. In another aspect, a sensory output device may produce the sensory content. Other logical and physical arrangements as to where the sensory content is produced are also possible.

At 950, the one or more processors detect a mood of the passenger based on one or more biometric indicators, wherein the selecting is further based on the passenger's mood. For example, the biometric indicators may refer to the biometric data or emotion indicator as shown in FIG. 6A. Further details of selecting or configuring may be as described in International Application PCT/US2018/053625 by inventors hereof, which is incorporated herein in its entirely by reference.

FIGS. 10-13 show additional operations 1000-1320 that may optionally be included in the method 900 and performed by one or more processors performing the method 900, in any operative order. Any one or more of the additional operations 1000-1320 may be omitted unless needed by a downstream operation and one or more of the operations 1000-1320 may replace one or more others of the operations of the method 900. Any useful combination of operations selected from the group consisting of the operations 1000-1320 may be performed by one or more processors of an apparatus as described herein as an independent method distinct from other useful combinations selected from the same group.

Referring to FIG. 10, the method 900 may further include at 1010 by one or more processors, upon receiving the signal, accessing a database of configuration information for the vehicle, such as the vehicle space configuration, scents, equipment, interface (e.g., 4D chairs), noise cancellation, seat configuration, climate control, etc. At 1020, the method 900 may include dispatching, by the one or more processors, the vehicle selected from a set of different available vehicles, based on the sensory content. In an aspect, at 1030, the one or more processors select the vehicle based on installed hardware for entertainment consumption.

Referring to FIG. 11, the method 900 may further include wherein the sensory content may include electronic media content and the delivering may include providing the electronic media content to the vehicle before the passenger enters the vehicle. For example, when a passenger hails a ride share using an app and orders a Presidential Limousine sensory content, the vehicle simulating the Presidential Limousine arrives to the passenger. At 1120, the one or more processors may select a second passenger to share the vehicle based on matching an interest of the second passenger to the electronic media content. For example, a second passenger interested in ridesharing a simulated Presidential Limousine may be selected for sharing the ride with the initial passenger by the one or more processors.

Referring to FIG. 12, the method 900 may further include, at 1210, an optical projector as the sensory output device, and the one or more processors select a still or video image for projecting to a display surface in or on the vehicle. For example, in the Presidential Limousine example, the interior and/or exterior of the vehicle may have a simulated image of the Presidential Limousine interior and/or exterior projected thereon (e.g. projection mapping).

At 1220, the method 900 may further include the still or video image that is selected for projecting onto clothing, and the delivering further may include projecting the still or video image onto clothing of the passenger. For example, an image of a chess board and chess pieces may be projected onto the clothing of a passenger, and the passenger may play chess using the projected image either against an AI robot, or another passenger. In another example, as described herein above, the simulating may be for purposes of furthering a narrative or for providing companionship such as a conversational counterpoint for passengers. The simulating may include applying a voice and personality profile to a responsive engine that answers questions posed by passengers, suggests activities at the destination or comments on points of interest along the way, for example. Further details of character simulation may be as described in more detail in International Application PCT/US2017/044038 by inventors hereof, which is incorporated herein in its entirely by reference.

Referring to FIG. 13, the method 900 may further include, at 1310, selecting the sensory content that involves selecting content simulating at least one of a vehicle driver or fellow passenger. For example, in the projection-mapped chess game example above, the AI robot or the simulated second passenger playing chess against the passenger is the simulated content.

At 1320, the method 900 may further include generating the sensory content for a simulated personality based on a fictional character. For example, in the projection-mapped chess game example above, the simulated passenger or AI robot is a likeness of Bug's Bunny. The sensory content when executed by a processor of a media player causes the media player to output a simulation of the fictional character.

Figure 14:
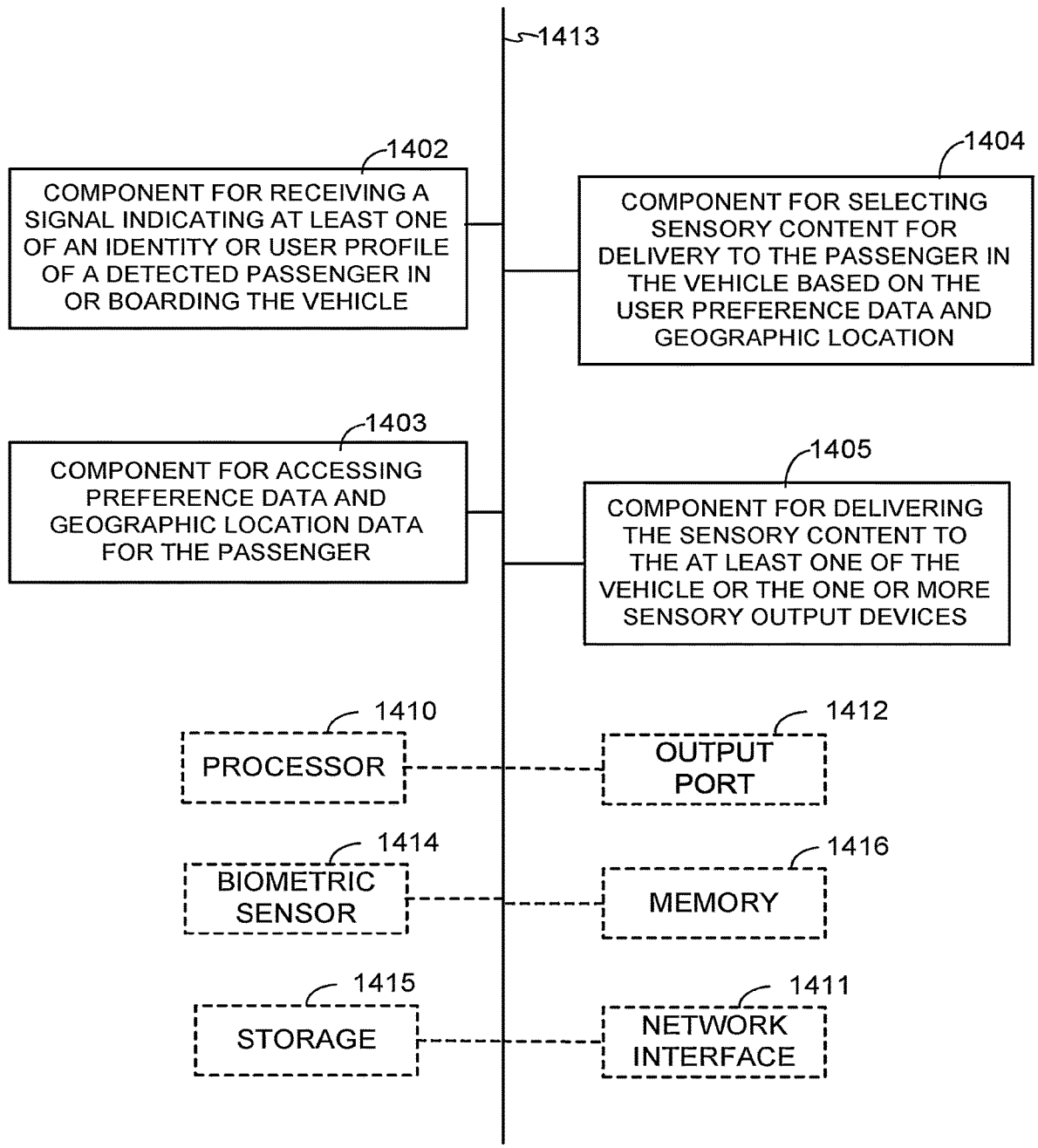
FIG. 14 is a conceptual block diagram illustrating components of an apparatus or system for personizing sensory output for a vehicle or in relation to a vehicular trip.

FIG. 14 is a conceptual block diagram illustrating components of an apparatus or system 1400 for personalizing a vehicle including one or more sensory output device communicably coupled to a server. The apparatus or system 1400 may include additional or more detailed components for performing functions or process operations as described herein. For example, the processor 1410 and memory 1416 may contain an instantiation of a process for navigating a story network in response to sentic modulation data as described herein above. As depicted, the apparatus or system 1400 may include functional blocks that can represent functions implemented by a processor, software, or combination thereof (e.g., firmware).

As illustrated in FIG. 14, the apparatus or system 1400 may comprise an electrical component 1402 for receiving a signal indicating at least one of an identity or user profile of a detected passenger in or boarding the vehicle. The component 1402 may be, or may include, a means for said receiving. Said means may include the processor 1410 coupled to the memory 1416, a network interface 1411, a biometric sensor (array) 1414, a storage 1415, an output port 1412, and a bus 1413, the processor executing an algorithm based on program instructions stored in the memory. Such algorithm may include a sequence of more detailed operations, for example, initiating a communication session with a client device, receiving identity information and an authentication token during the session, checking the authentication token, and holding the identity in a memory register one authenticated.

The apparatus 1900 may further include an electrical component 1403 for accessing preference data and geographic location data for the passenger. The component 1403 may be, or may include, a means for said accessing. Said means may include the processor 1410 coupled to the memory 1416, a network interface 1411, a biometric sensor (array) 1414, a storage 1415, an output port 1412, and a bus 1413, the processor executing an algorithm based on program instructions stored in the memory. Such algorithm may include a sequence of more detailed operations, for example, as shown in FIG. 6A.

The apparatus 1400 may further include an electrical component 1404 for selecting sensory content for delivery to the passenger in the vehicle based on the user preference data and geographic location. The component 1404 may be, or may include, a means for said selecting. Said means may include the processor 1410 coupled to the memory 1416, a network interface 1411, a biometric sensor (array) 1414, a storage 1415, an output port 1412, and a bus 1413, the processor executing an algorithm based on program instructions stored in the memory. Such algorithm may include a sequence of more detailed operations, for example, as shown in FIGS. 6B-6D.

The apparatus 1400 may further include an electrical component 1405 for delivering the sensory content to the at least one of the vehicle or the one or more sensory output devices. The component 1405 may be, or may include, a means for said delivering. Said means may include the processor 1410 coupled to the memory 1416, a network interface 1411, a biometric sensor (array) 1414, a storage 1415, an output port 1412, and a bus 1413, the processor executing an algorithm based on program instructions stored in the memory. Such algorithm may include a sequence of more detailed operations, for example, establishing a communication session with a sensory output device located in the one or more vehicles, and at least one of streaming or pushing the sensory content to the sensory output device for output in or on the one or more vehicles.

The apparatus 1400 may optionally include a processor module 1410 having at least one processor. The processor 1410 may be in operative communication with the modules 1402-1405 via a bus 1413 or similar communication coupling. In the alternative, one or more of the modules may be instantiated as functional modules in a memory of the processor. The processor 1410 may schedule and initiate the processes or functions performed by electrical components 1402-1405.

In related aspects, the apparatus 1400 may include a network interface module 1411 operable for communicating with system components over a computer network, or communicating with any external storage device, with external systems or servers, or connected vehicles over a computer network. A network interface 1411 module may be, or may include, for example, an Ethernet port or serial port (e.g., a Universal Serial Bus (USB) port), a Wi-Fi interface, or a cellular telephone interface. In further related aspects, the apparatus 1400 may optionally include a module for storing information, such as, for example, a memory device 1416. The computer readable medium or the memory module 1416 may be operatively coupled to the other components of the apparatus 1400 via the bus 1413 or the like. The memory module 1416 may be adapted to store computer readable instructions and data for effecting the processes and behavior of the modules 1402-1405, and subcomponents thereof, or the processor 1410, the method 900 and one or more of the additional operations 1000-1320 disclosed herein, or any method for performance by a sensory output device described herein. The memory module 1416 may retain instructions for executing functions associated with the modules 1402-1405 and any one or more of the operations described herein, for example in connection with one or more of FIGS. 5, 6A-6D, and 9-13. While shown as being external to the memory 1416, it is to be understood that the modules 1402-1405 can exist within the memory 1416 or an on-chip memory of the processor 1410.

The apparatus 1400 may include a transceiver 1412 configured as a wireless transmitter/receiver, or a wired transmitter/receiver, for transmitting and receiving a communication signal to/from another system component such as, for example, an RFID tag or location information transmitter. In alternative embodiments, the processor 1410 may include networked microprocessors from devices operating over a computer network. In addition, the apparatus 1400 may include a stereoscopic display or other immersive display device for displaying immersive content, or other suitable output device. A stereoscopic display device may be, or may include, any suitable stereoscopic AR or VR output device as described herein above, or as otherwise known in the art. The apparatus 1400 may include, or may be connected to, one or more biometric sensors 1414 as described elsewhere herein.

In an aspect, a processor may execute algorithms for matching the playing length of a sensory content to the length of a ride in a vehicle or a journey involving multiple vehicles. Content can be configured to an approximate length and adjusted as the journey or trip progresses to more exactly fill the time. For example, each component segment may have two associated quantities, an essential length and padding. The padding may be disposed of to shorten play time or added to increase play time.

Figure 15:
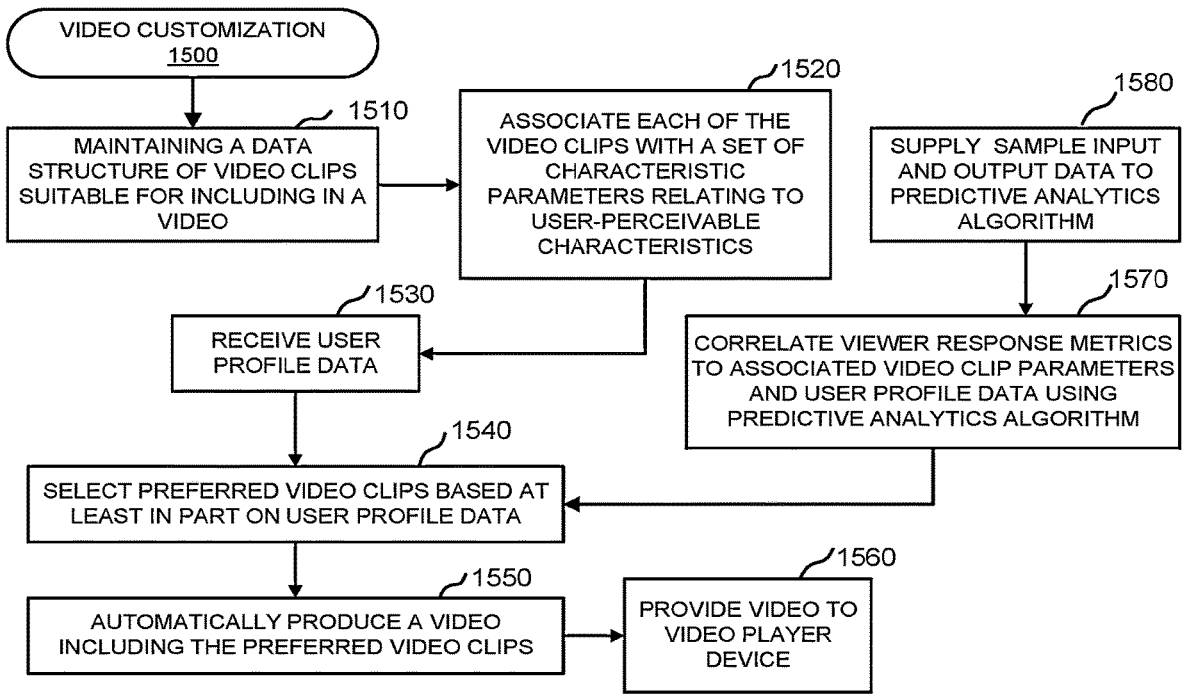
FIG. 15 is a flow chart illustrating high-level aspects of a method for producing video customized for a preference profile of a person or cohort.

The apparatus 200 and 300 may perform methods for producing video customized for a preference profile of a person or cohort, each alone, or working in cooperation. FIG. 15 shows an overview 1500 of producing real-time video content customized for a preference profile of a person or cohort. The method 1500 may be performed by one or more computer processors of a server in electronic communication with a connected vehicle (e.g., vehicle 101) and servers within the system 100, and/or an independent server of the vehicle not in electronic communication with other vehicle or the servers. At the process 1510, the one or more processors at a content server maintain a data structure holding video clips suitable for including in a video. The data structure may be of any useful type, for example as described herein above in relation to FIG. 3B or FIG. 19. In an aspect, the video clips may include a defined narrative such as audio video work, for example a movie, an episode of a serial drama, a documentary, an infomercial, a video game, an advertisement, a talk show or social game, or other programs, animated or not. The data structure may further include an ordered arrangement of media components for the video content, for example audio video clips or an episode of a series and the like, as already described.

At the process 1520, the method may further include determining associations of each of the video clips with a set of characteristic parameters relating to user-perceivable characteristics. The video clips may fit within a defined narrative. The user-perceivable characteristics may include an indicator of semantic meaning (e.g., a tag or hashtag) relevant to one or more preference profile including user profile data, and may include other metadata, for example a duration if the video clip is a segment, for example a segment of audio, video, or audio-video data. In addition, the processor may associate the video clip with an address or other locator (e.g., a link) using the data structure and use the locator to acquire a copy of the video clip component. In some embodiments, the processor may associate the video clip with a logical address (e.g., position) of the component in a narrative tree. The narrative tree may be an organized and/or ordered listing of media segments, for example based on chronological order of the segments or video clips within the narrative, including one or more branches leading to alternative storylines. In an aspect, other metadata for the video clip may include, for example, an episode identifier of a program series, ratings, genre, and so on.

At the process 1530, the method may (e.g., still at the content server) include receiving user profile data related to a person or one or more groups of people via a computer network in the system 100, e.g., physical location/city of the passenger, passenger's surrounding context such as weather and temperature (e.g., sunny, raining, snowing, daytime/nighttime, hot vs. cold, etc.), social trends in general or in the passenger's own social network, personal attributes of the passenger such as age/sex/height/weight/race, passenger's status in a role-play game, or passenger status in a real or fantasy social network. Passenger profile may also include the reward status (points earned in one or more venues of a franchise (e.g., retail stores, amusement parks, live events, etc.) hosted or sponsored by an entertainment company. User profile data may also include information about a travel route of the travel event. In an aspect of the present disclosure, the sources of the user profile data may include another server, or from an application (or "app"), or from a third-party server. For example, the source may be a server or an application from a tour company.

At the process 1540, based at least in part on the user profile data, the method may include selecting preferred video clips by at least one of selecting or configuring the video clips from the media database. In an aspect, the selected or configured video clips refer to at least one user preference profile. In an aspect, at 1570, the method correlates viewer response metrics to associated video clip parameters and user profile data using predictive analytics algorithm to determine the preferred video clips. In doing so, at 1580, the method may include supplying input and output data to the predictive analytics algorithm for training the analytics algorithm. At 1550, the method automatically assembles a video including the preferred video clips.

At the process 1560, the method may include providing (e.g., streaming) the video to a video player device operated by the person or by at least one of the groups of people. For example, at 1560, the method may include a video player device at the vehicle 101 receiving and outputting the video content at the start, during or at the destination of the trip.

In an aspect, one or more processors at the content server may perform one or more of the processes 1510-1560. In another aspect, one or more processors at the connected vehicle may perform one or more of the processes 1510-1560. Therefore, it should be noted that the descriptions of these processes refer to either the content server or the vehicle, unless noted otherwise.

Figure 16:
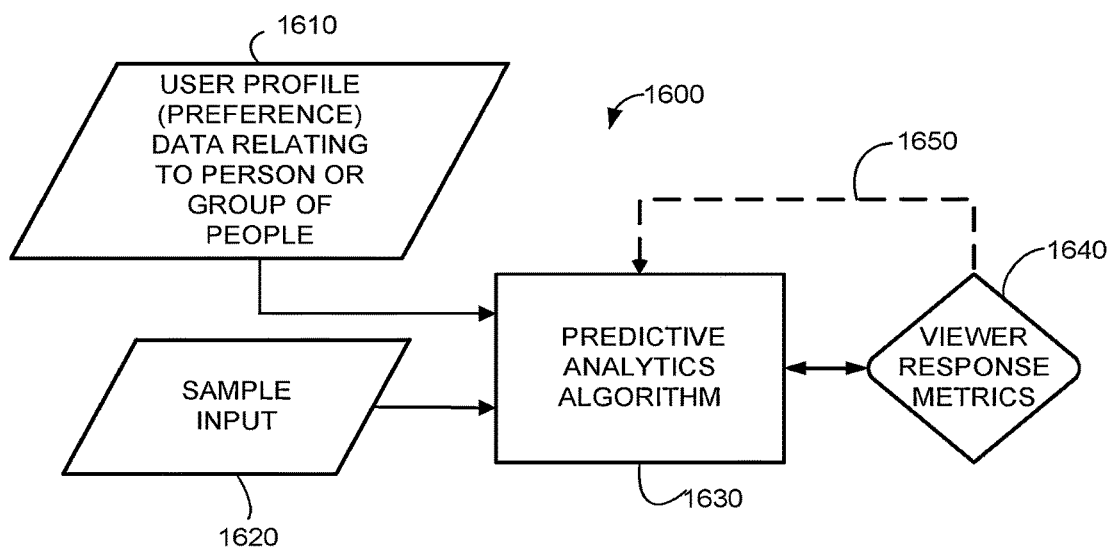
FIG. 16 is a block diagram illustrating high-level aspects of a system or apparatus for producing video customized for a preference profile of a person or cohort.

As shown in FIG. 16, a system 1600 for controlling output of video responsive to preference profile or user profile data relating to a person or a group of people may use a predictive analytics algorithm 1630, e.g., using artificial intelligence (AI) to detect correlations between video or video components (video clips) and viewer response metrics 1640. Viewer response metrics 1640 may be provided intentionally by the user via user input devices, or they may be collected from other sources such as biometric data collected from the users. The predictive analytics algorithm 1630 may receive preference profile or user profile data from client devices (e.g., clients 300, 402, 4102, 4202, and the like). The data may be associated with a specific passenger/user or cohort or may be generic. Both types of input data (associated with a user and generic) may be used together. Generic input data can be used to calibrate a baseline for preference determination, to classify a baseline preference for video clips. If most users exhibit similar viewer response metrics when viewing the video clip within a narrative context, the video clip can be classified with other components that provoke similar viewer response metrics from users. The similar video components may be collected and reviewed by a human creative producer, who may score the components on viewer response metrics 1640 manually, assisted by automated analysis tools. In an alternative, the viewer response metrics 1640 can be scored by human and semi-automatic classed with similar components. These human-scored elements become training data for the predictive analytics process 1630 at the training process 1650. In some embodiments, humans scoring elements of the video content may include the users, such as via online survey forms. Scoring should consider cultural demographics and may be informed by expert information about responses of different cultures to scene elements.

The predictive analytics algorithm 1630 compares human and machine-determined scores of components or other video elements and uses iterative machine learning methods as known in the art to reduce error between the training data and its own estimates.

Once the process has learned correlations for a user or group of users, it is ready to apply its learned correlations during real-time content consumption. Multilevel AI loops inform cooperating software modules for vehicle personalization AI. Trials explore past AI successes and identify opportunities to achieve goals using AI tools. Procedures implement the AI tools used in each trial. Rewards incentivize application of the tools when goals are achieved.

Story management software may be used to implement a method for creating multilevel AI loops for each player actor. Loops may include, for example, a story world loop, a non-player character (NPC) loop, and a player actor loop. In a story world AI loop, stories are enabled according to an emotional plan or "arc" as a goal and adapted in real time to achieve the goal by detecting emotions of a player actor interacting with NPCs, optionally viewing immersive content using a VR or AR headset. In an NPC AI loop, the goal is to elicit a specific story element emotion by controlling NPC interactions with the player actor. In a player actor AI loop, the AI is directed to correctly identifying sentic modulations in biometric data and corresponding emotions of the player actor.

Figure 17A:
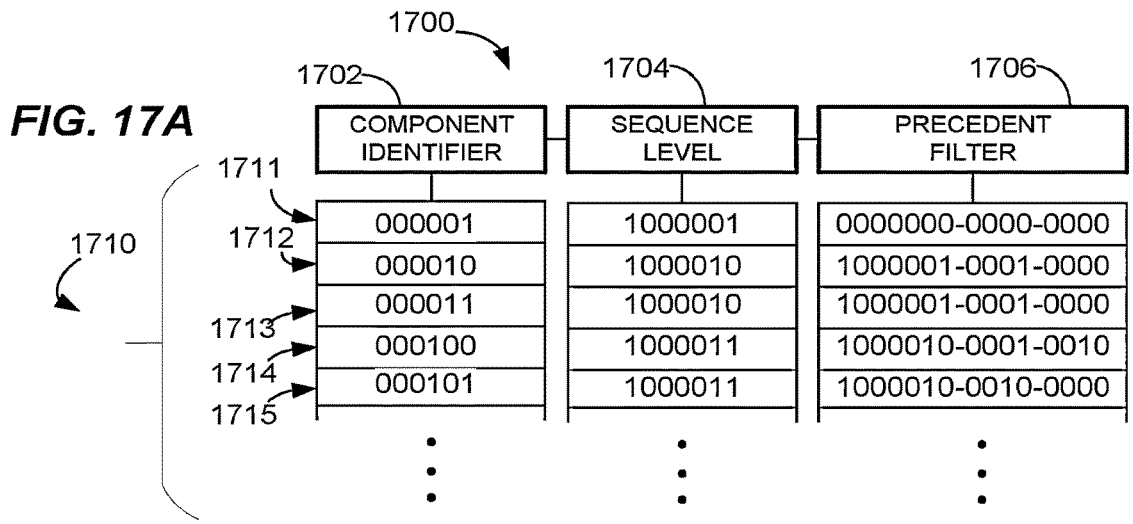
FIG. 17A is a diagram illustrating aspects of a narrative tree data structure for use by one or more processors in determining a logical address of a content component (e.g., video clip) in a narrative tree.

FIG. 17A shows aspects of a narrative tree data structure 1700 for use by one or more processors in determining a logical address of a content component in a narrative tree, illustrated as a binary data table representing a directed acyclic graph. A first column 1702 holds component identifiers, for example, an index or serial number that is unique for the set of content components (e.g., video clips) of the media content (e.g., video). In an aspect, the identifier may represent a link to a copy of the component. In this example, the column 1702 holds a sequence of integers 1, 2, 3 . . . expressed as binary data.

A second column 1704 holds at least one narrative level assigned to each content component. Each level may be expressed as one value of an uninterrupted linear sequence (i.e., a sequence number), for example the sequence of integers 1, 2, 3 . . . expressed as binary data. In some aspect, the sequence numbers may be used to indicate compatibility of the content components (video clips) with their adjacent counterparts in the narrative tree. For example, a video clip with the sequence number of 2 may be compatible with the video clips with sequence numbers 1 and 3, respectively. To provide a tree structure, at least one content component is assigned to each level, and more than one content component is assigned to at least one of the levels. In many narrative structures, multiple unique content components are assigned to most levels and each content component is assigned to only one level. In some embodiments, a content component may be assigned to multiple narrative levels. In some embodiments, a plurality of content components may be grouped together under a sequence group number, for example, sequence levels 1-5 (e.g., expressed in binary data) under sequence group number CH1 for "Chapter 1" contents in the narrative structure, sequence levels 6-10 under group number CH2 for "Chapter 2" contents, etc. In some instances, a video clip from the one sequence group number may be compatible with any other video clip within the same sequence group number.

A third column 1706 may hold filter criteria for determining eligible (compatible) content components based on a current narrative level and an identity of a most recent content component last played. In this example, three values are used in the third column 1706, displayed as binary numbers separated by dashes. The first value is the prior level identifier, the second value identifies a first segment of a range, and the third value is null ('0000') or identifies a last segment of the range. The range values may be based on the position of each segment in the level, for example, a first position in the level may be identified as '0001,' a second position as '0010,' and so forth.

The rows 1710 hold example values in each column to demonstrate application of the data structure 1700, for a list of content components beginning with an initial "Segment 1" in row 1711, column 1702. At row 1711, column 1704, Segment 1 is assigned to "Level 1," the first level in the tree. The third column 1706 is filled with null values indicating no eligible prior components in the tree 1700. A "Segment 2" in the second row 1712 at column 1702 is associated by the table 1700 to a second "Level 2" at column 1704, as is "Segment 3" at row 1713, column 1704. At row 1702, column 1706, three values indicate that Segment 2 is eligible to follow Level 1, Segment 1. The same is indicated at row 1703, column 1706 for Segment 3, because Level 1 holds only one segment. Segments 4 and 5 at rows 1714, 1715 respectively are likewise assigned to Level 3. At column 1706, row 1714, Segment 4 is indicated as eligible to follow the first segment of Level 2 only, which is Segment 2. At column 1706, row 1715, Segment 5 is indicated as eligible to follow the first or second segments of Level 2, which is Segments 2 or 3. The data structure 1700 may be continued for additional component components in like fashion.

Figure 17B:
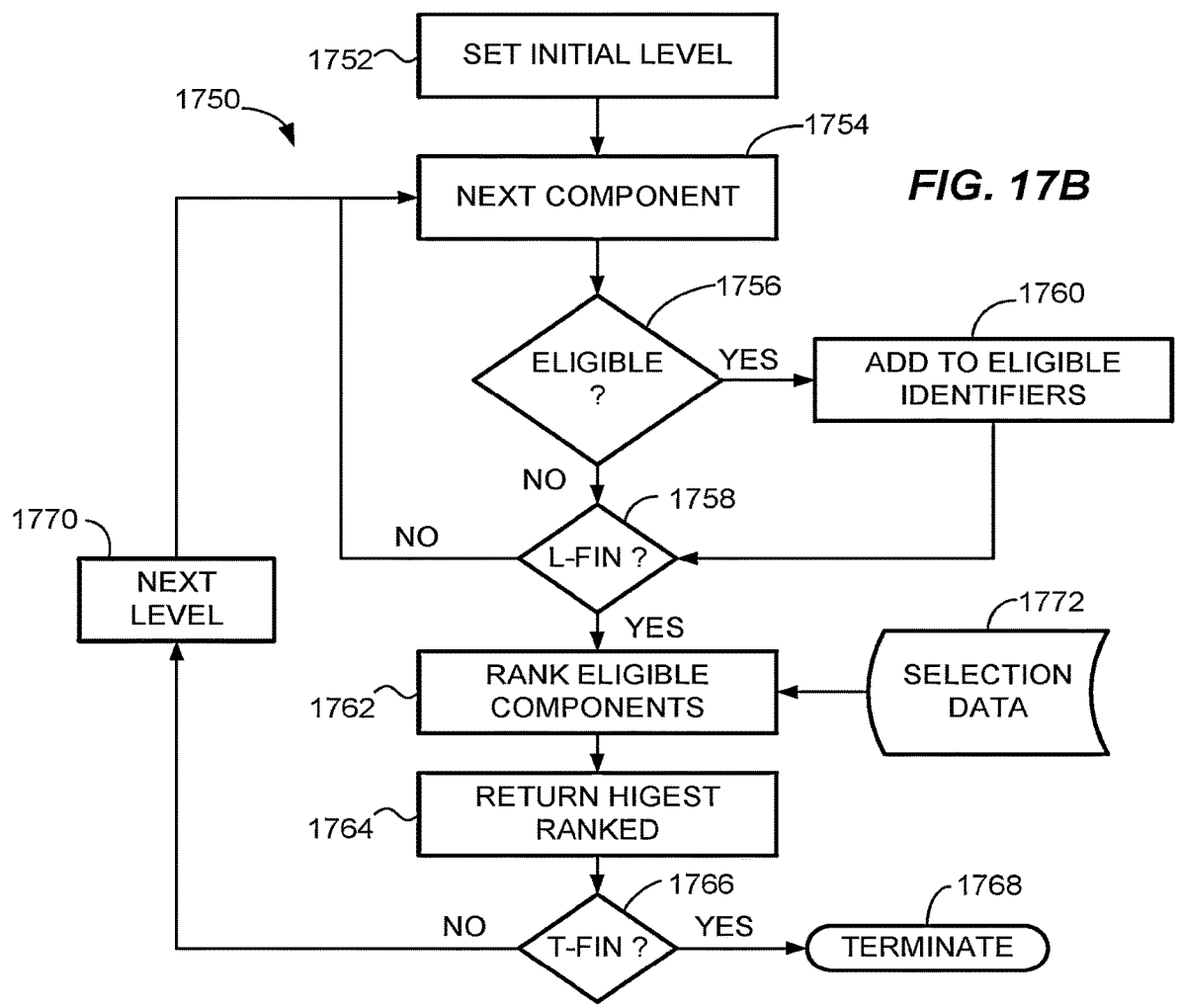
FIG. 17B is a flow chart showing an algorithm for selecting a content component based on an address in a narrative tree.

FIG. 17B shows a method or algorithm 1750 for selecting a content component based on an address in a narrative tree. At 1752, one or more processors set an initial level of a narrative for a sequence of content components. Oftentimes, this will be the tree's first level, but the initial level may be set at a lower level when the narrative has been interrupted and is resuming at a later time. At 1754, the processor picks the first or next compatible component in the level, for example, in order of a level sequence identifier or in order of the component identifier. At 1756, the processor may determine whether each content component is eligible or compatible for play in the current loop, for example by applying a filter as described in connection with column 1706 in FIG. 17A. At 1760, if the component is eligible for the level, the processor may place its identifier in a memory cache as one of a list (e.g., level-eligible components list). At 1758, if all the components in the level have not been considered, the processor at 1754 picks the next component for filtering. If all the components in the level have been picked, the processor at 1762 may rank the eligible components based on any applicable selection data 1772, for example, preference profile, characteristic parameter, travel data, user input, biometric response data, or any useful combination of the foregoing. For example, the processor may rank by various criteria, for example, by degree of relation to a travel component; closest predicted adherence to a targeted story arc for emotional responses, closest data distance to a set of user preferences; of a combination of the foregoing factors. In alternative embodiments, the processor may rank the components based on a predictive machine-learning algorithm trained over a training set to achieve a target objective including maximizing one or more of the ranking criteria noted above. At 1764, the processor may return a value of the highest ranked media component for use in assembling media content for play in a vehicle during travel. At 1766, the processor may determine whether it is finished selecting media components from the narrative tree. If it is not finished, the processor may select the next level at 1770, clear the cache of eligible components or start a new list for the next level and continue at 1754. If it is finished, the processor may terminate the method 1750 at 1768.

Figure 18:
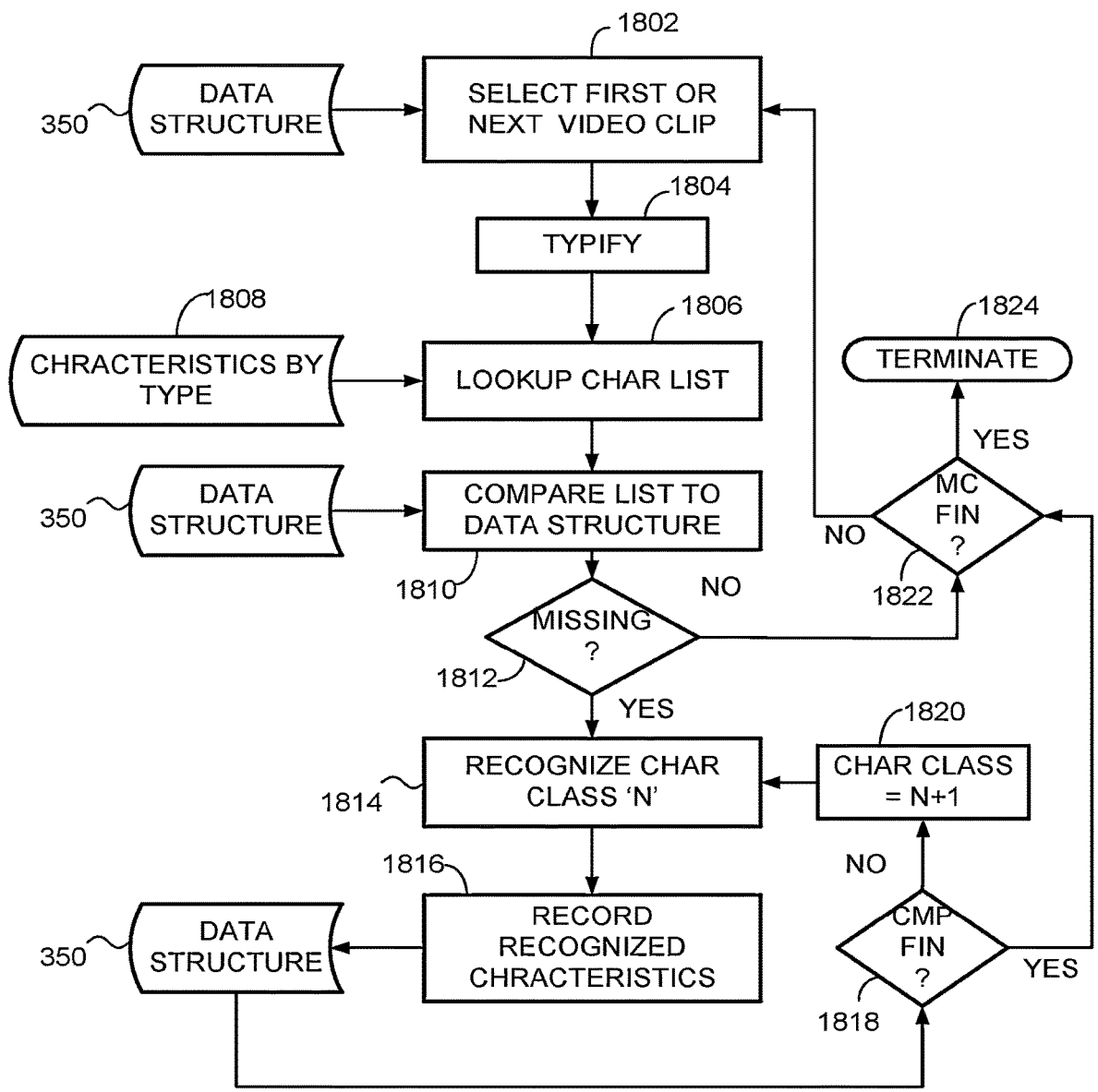
FIG. 18 is a flow chart illustrating aspects of associating by one or more processors a content component (e.g., video clip) with a user-perceivable characteristic.

FIG. 18 shows aspects of an algorithm or method 1800 for associating by one or more processors a content component (e.g., a video clip) with a user-perceivable characteristic of the component. Parameters of user-perceivable characteristics that may be associated with the content components (video clips) include, for example, tone of a color scheme, mood of a sound track, position in a narrative tree, a duration of a segment, a video clip's length, an identity of an actor appearing or represented in a content component, an actor's dialogue, a pace, a mood of the video clip, a technical format, color temperature, a scene position, an intensity (e.g., in an emotional arc), special effects metric, a subject, and identity or identities of one or more characters or objects appearing in or represented by the content component. At 1802, the processor may select the content component (e.g., video clip), for example, using a loop to pick the next or first content component in a list such as the data structure 350 shown in FIG. 3B. An equivalent or different list may also be suitable. An initial list of content may be assembled by a production team. For example, it may be convenient for a production team to create and partially or completely populate a data structure 350 as shown in FIG. 3B or equivalent structure during production of components for sensory content (e.g., video), as part of a content production process. If a complete data structure is already produced and does not need to be augmented, associating is already completed and there may be no need to execute an automatic process 1800. However, some user-perceivable characteristics may not easily be collected or described by the production team. In addition, when converting legacy media content (e.g., digital content converted from film, or older digital content) for use with the methods herein, essentially no user-perceivable characteristics may be available. In some embodiments, object recognition software or image analysis software can be used to pre-analyze video content prior to the associating (e.g., categorizing) noted in this paragraph so that the semantic meaning of clips can be factored into the set of parameters that drive clip selection and/or clip adjustments. Semantic meaning of content segments may be indicated using tags or other markers, and besides referring to meaning in the context of a content's narrative may also refer to external contexts such as, for example, the purpose of a trip.

At 1804-1812, the processor may determine whether the component is missing any needed characteristic data. For example, at 1804 the processor may determine a type of the content component, for example, video clip, audio clip, 3D model, and so forth, based on metadata or based on a trained machine-learning recognition algorithm for digital data. Then, at 1806 the processor may look up a list 1808 of desired characteristic classes for the type of media component detected. For example, the list may contain classes of information relevant to travel events such as, for example, a geographic location, historical significance, relation to fictional or historical characters, or play duration; classes of emotional response such as valance, arousal, or content engagement power (CEP); or a class of eligible position or positions in a narrative tree. Then, at 1810 the processor may compare the list to the characteristic classes of the content component in the data structure and based on the comparison determine whether the data structure 350 is lacking any desired class of characteristics defined by list 1808 for media components of its type. At 1812, if the processor determines characterization in a desired class of characteristic is missing, it may execute a process 1814 for recognizing characteristics of the missing class. If at 1812 the processor determines that no desired characteristic class is missing, it may proceed to determine at 1822 whether characterization of the media content is finished. From block 1822, if the process 1800 is not complete the processor may proceed to select the next media component in the content at block 1802.

The process 1814 may receive at least a portion (e.g., a frame of video data) of the content component and/or its metadata as input and output a characteristic in a specified class. The character may be expressed as metadata in the data structure 350, for example, as one of the semantic tags 356 or the characteristic parameters 353. The process 1814 may be, or may include, one or more of: a deterministic rules-based algorithm that processes the input using a predetermined ruleset; a machine-learning algorithm trained to recognize a characteristic (e.g., a character, place or object identity) over a set of training data; or a combination of deterministic and machine-learning algorithms. At 1816, the processor may record the determined characteristic in the data structure 350. At 1818, the processor may determine whether determining characteristics for the content component is finished; if not, if may increment the class by one at 1820 and revert to process 1814 for the next class. If determination is finished, the processor may determine at 1822 whether characterization of the sensory content is finished. If the determination of the content is complete the processor may terminate the process 1800 at 1824.

Figure 19:
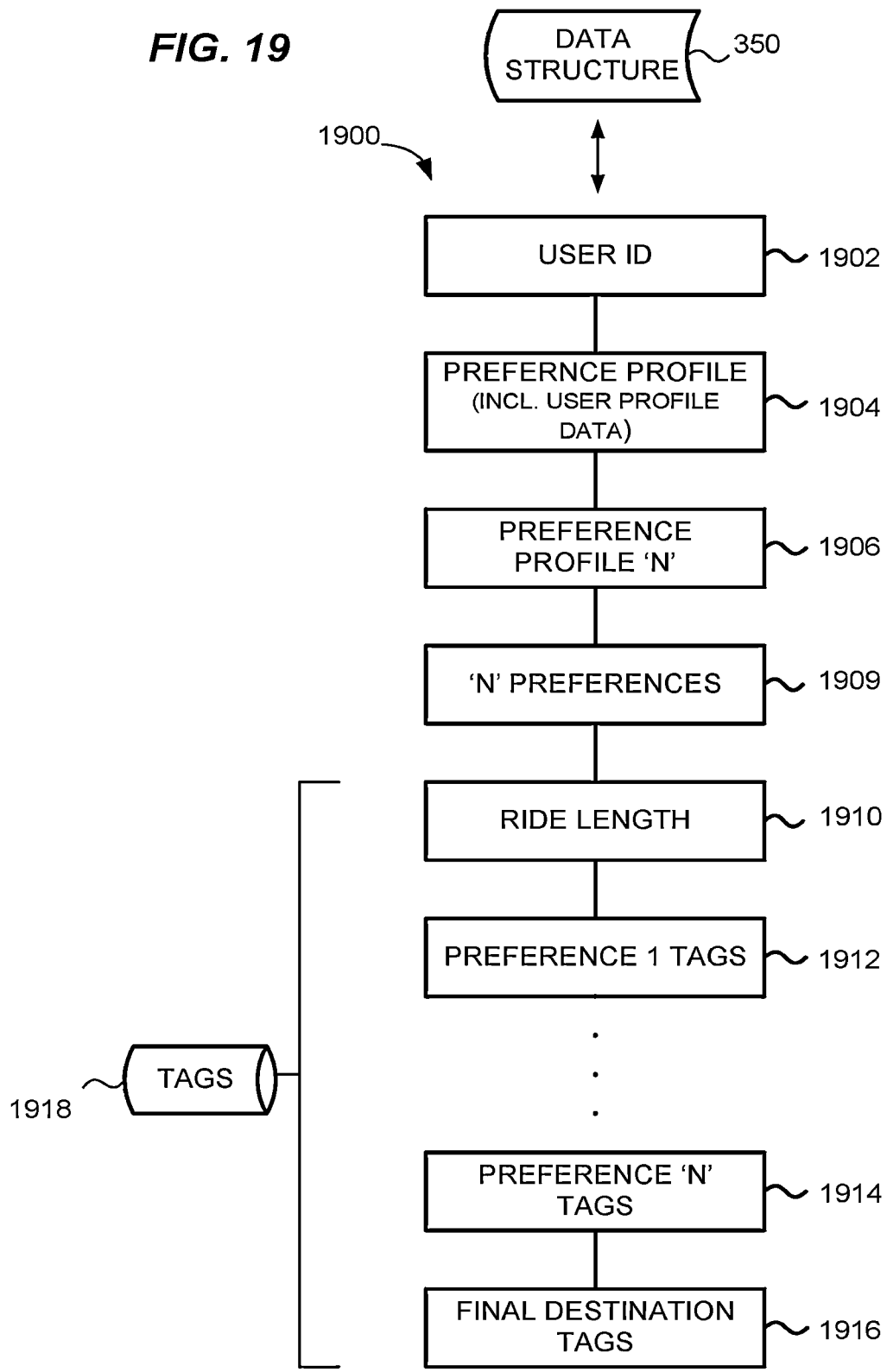
FIG. 19 is a diagram illustrating aspects of a data structure for use by one or more processors for relating a user-perceivable characteristic with a user preference profile.

FIG. 19 shows an example of a data structure 1900 for use by one or more processors for relating a user-perceivable characteristic, for example a clip length, an identify of an actor, an actor's dialogue, a pace, a mood, technical format, a color temperature, a scene position, an intensity, a special effects metric, or the like. Elements of the data structure 1900 shown in FIG. 19 may be linked to any component identifier by a data structure 350 as shown in FIG. 3B, or equivalent data structure having elements corresponding to one or more of the elements 1902-1916. The elements 1906-1916 are generic with respect to any particular trip or passenger, and so may be used to correlate a content component to multiple trips by multiple passengers. For example, a processor may correlate a content component with a duration of 15 seconds (i.e., a particular duration) and a semantic tag of "Burbank" (i.e., a particular semantic tag) in the data structure 350 to any trip by any passenger along a route that includes at least one destination tag of "Burbank" (i.e., a matching tag) involved in an event (e.g., "proceeding towards") with a duration of 15 seconds or longer. The data structure 1900 may be of any suitable type, for example as described in connection with data structure 350 herein above.

The data structure 1900 may include elements pertaining to a particular trip and passenger. A processor of a client device or server may set certain elements, for example, the user ID 1902, user profile data 1904, a ride length 1910, an origin name included in the preference tags 1912-1914 and a final destination name included in the final destination tags 1916, based on a trip request by the passenger (e.g., from a ride hailing application). Other elements may be populated automatically by a server. For example, a remote trip configuration and tracking server may assign a unique trip ID (not shown) for the dataset 1900, select one or more intermediate destination names and locations if any (not shown), based on route information from the trip provided by a navigation server.

The trip configuration and tracking server may plan the content based on affinity, preference, passenger requests, and other information applicable to passenger profit and routes between the trip origin and destination, which can change en-route as known in the art. In addition, the trip configuration and tracking server may plan the content based on other information including road and traffic and other information in content planning. For example, suppose a passenger traveling from Encino to Burbank has some time to kill and requests "a fun video content related to local pop musicians adding not more than the ride length." Based on his request, the trip configuration and tracking server may pick a non-zero integral number 'N' of preferred video clips and add their identifiers and descriptions to the data structure 1900 at elements 1912-1914. To pick the preferred video clips, the server may select from a list of preference by filtering against expressed or implied preferences of the passenger, subject to the constraints that the added travel time should not be more than an allotted time. For example, if the Encino passenger has an expressed or implied interest in "famous pop musicians," the server may weight a list of video clips relevant to famous local musicians based on likely passenger interest using any available information, calculate the ride length from Encino to Burbank, calculate the content length of one or more video clips that meet the weighted preference criteria provided by the passenger within the requested time limit (within the ride length), and pick the video clips having the highest weighted passenger interest. In an alternative, or in addition, the server may calculate one or more of most preferred video clip or clips using a machine-learning algorithm trained over a set of interest data (and optionally travel data). Once picking the most preferred video clips, server may populate the relevant elements 1912-1914.

In addition to identifiers and descriptions of any preference elements 1910-1916, the server may add other semantic tags relating to the preference, for example from a database of tags or other source. Continuing the Encino passenger example, the tags may include the names of the famous pop musicians and descriptions of how the place relates to each name, for example, "birthplace," "home," "studio," "concert," "behind-the-scenes footage," "commentary," "promotional video," and so forth. In a similar manner, the server may assign any tag relevant to the passenger preference or affinity data, and also to location information.

The preference profile element 1908 defines one or more preference profiles relevant to each preference elements 1910-1916. The preference profiles may include any user profile data or affinity data that can be determined by the server or a client device. The ride length element 1910 and 'N' preferences element 1909 are of special interest to production of content (e.g., video), which is a forward-looking operation unconcerned with the past. To produce and configure the video in real time, the server needs to know how much time will pass until the vehicle reaches its final destination or passes an intermediate destination for which the server will select one or more content components. Preferences may include, for example, "famous pop singer," "famous comedian," "famous actress," and "a video clip of 5 min or less," each of which can then be calculated at any point along the travel route. "Wait at" events can have a set duration that does not change during the route. Preference profile element 1906 may change during travel, and may be updated in the data structure 1900 as travel progresses.

Preference elements can apply to specific identified places (e.g., "famous comedian from Encino") or to a changing set of preferences as travel progresses. For example, at the beginning of the trip the server may calculate one or more preferred video clips for Preference 1 in 1912, and for the remaining Preferences and add each preference tag to the data structure. The server may refresh the 'N' Preferences element 1906 during travel, periodically and/or in response to user inputs (which may include biometric data from the user or passenger). For example, once the vehicle has completed the one or more video clips selected for Preference 1, the server may recalculate the remaining ride length and the allowed length of a video for the remaining trip, based at least in part on the user profile data. In between the video clips, the server may update the "ride length" element periodically, for example, every 5 or 10 seconds. In addition, the server may change, add, or remove preference tags and add or remove semantic tags associated with each preference, as the trip progresses based on passenger input, biometric data, traffic data and any other new available information. Thus, the data structure 1900 can be updated and support dynamic configuring, assembling and producing of the video during travel.

Figure 20:
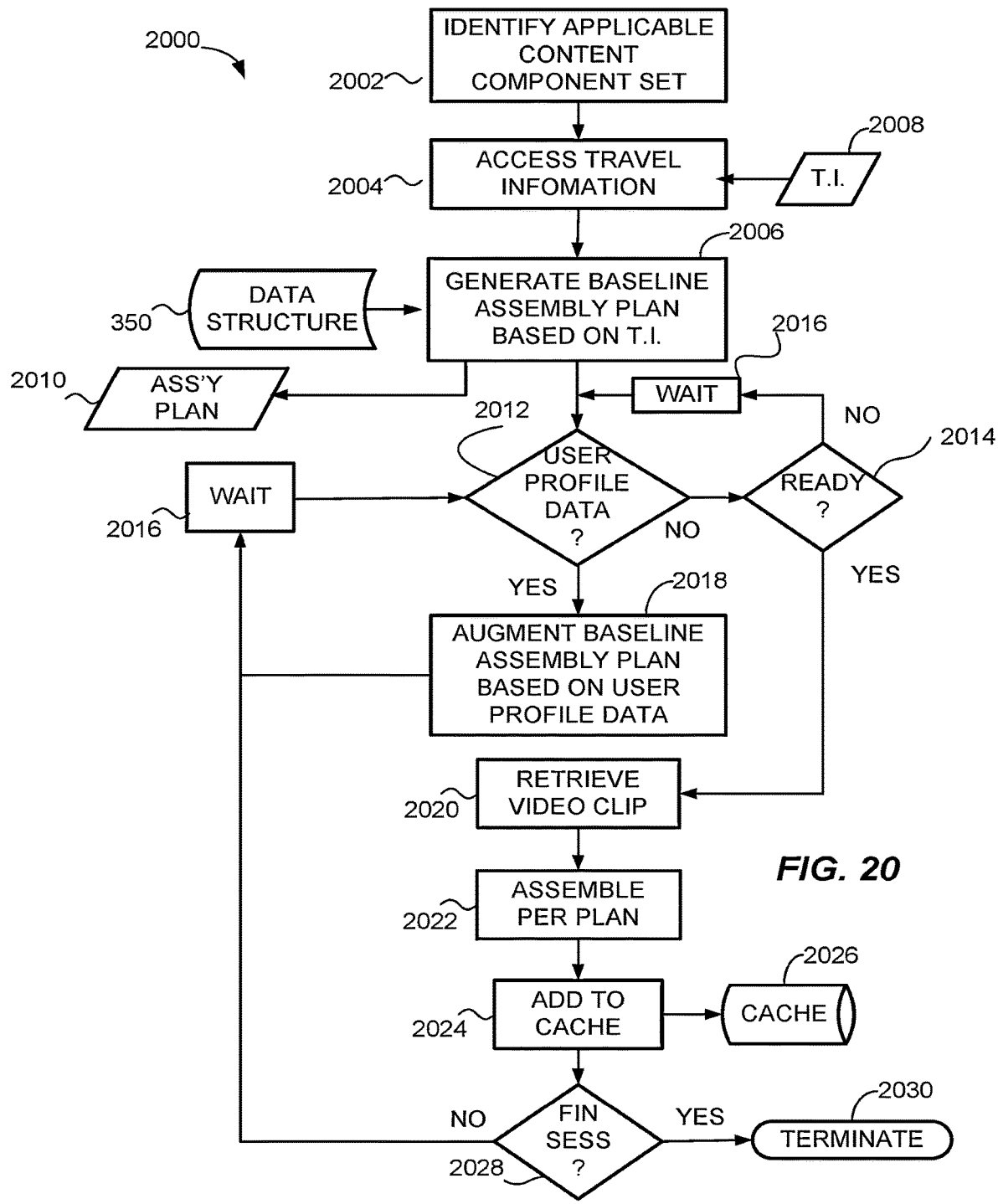
FIG. 20 is a flow chart illustrating aspects of assembling by one or more processors content (e.g., video) from a set of content components (e.g., video clips) based on user profile data (preference profile) information.

Based on the information as described in connection with data structures 350 and 1900, a server may assemble sensory content (video) for use during a trip. For example, FIG. 20 shows a method 2000 for assembling by one or more processors a video including the preferred video clips, based at least partly on the user profile data. At 2002, the processor may identify an applicable content component set (e.g., video clips) for a passenger and preference profile. For example, based on one or more records (e.g., in a passenger profile) stating the passenger prefers English-language content, lives in Encino, and abhors violent content, the server may filter out identifiers for non-pertinent content components from its library of all available content components. At 2004, the server may access travel information 2008, for example by identifying a passenger ID and for locating pertinent travel information in a data structure 800. At 2006, the server may generate a baseline (e.g., initial) assembly plan based on the travel information 2008, which may be contained in the data structure 1900. The server may generate the plan based on preference profile, the trip origin, destination, ride length, user profile data, and other criteria as described elsewhere herein. The plan 2010 may comprise a sequence of video segments with or without other content components, arranged in a list or other useful data structure.

At 2012, the server may determine that a preference element defined in the data structure 800 has been detected, for example by receiving user profile data (e.g., passenger input or biometric data). If the preference input is detected, the server may update the assembly plan 2010 based on the detections(s). Although not shown in FIG. 20, the augmentation process 2018 may use the most recent copies of the data structures 350, 800 available. For example, if a preference profile is deleted or changed, the server may remove components picked for a deleted preference, add components picked for the new preference, and adjust components based on changes in estimated ride length, for example by adding or removing segments (or portions of segments) designated as non-essential padding. At 2016, the server may wait for the next user profile data input to occur. If, at any time or times while waiting 2016, the server determines at 2014 that it is ready to assemble and produce the sensory content (e.g., video) for presentation in the vehicle under travel, at 2020 it may retrieve the content components (e.g., video clips) for assembly. Then, at 2022, the server may assemble the components (video clips) into the sensory content or portion thereof (e.g., video), for example by arranging content segments in a sequence and/or rendering a content component to produce a content segment including video.

At 2024, the server may add the assembled components to a cache 2026 for deliver to the vehicle under travel. Content in the cache may be streamed or delivered in periodic packages to a media player in the vehicle, and thus, produced for consumption in real time. Once delivered, the server may delete delivered content from the cache 2026, immediately after delivery, immediately after the trip is completed, or at some later time. At 2028, the server may determine whether the production session is completed, for example in response to termination of the trip or termination of the session by the passenger. Once finished, the server may terminate 2030 the session.

Figure 21:
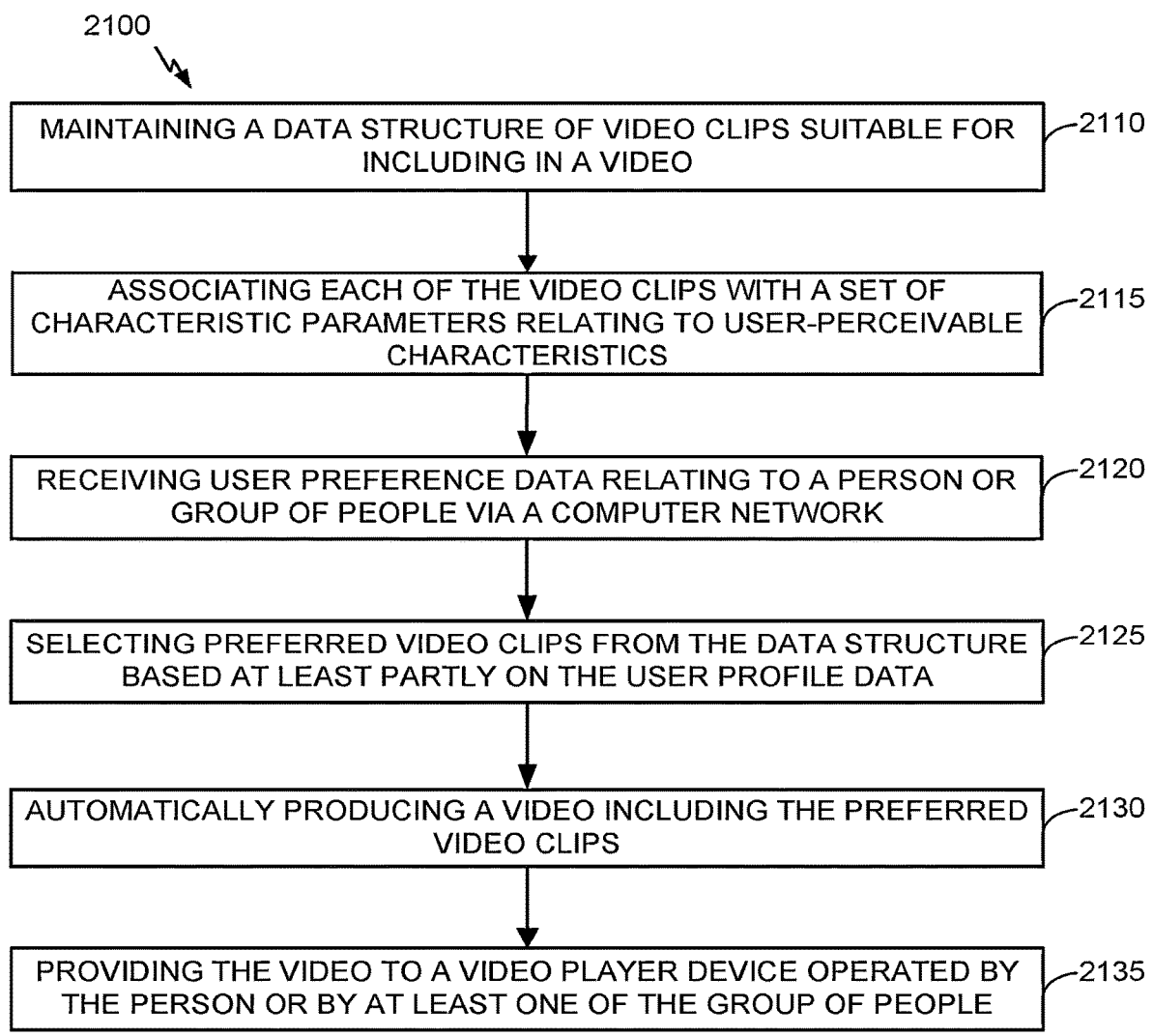
FIG. 21 is a flow chart illustrating aspects of a method for producing video customized for a preference profile of a person or cohort.

FIG. 21 diagrams a useful automatic process 2100 for producing video customized for a preference profile or a person or cohort, by automatically producing a video including preferred video clips based at least in part on the user profile data. In an aspect of the disclosure, the process 2100 may be performed by one or more processors at a content server or other servers described herein. At 2100, the processor maintains a data structure of video clips suitable for including in the video. The data may include analog or digital audio-video work, for example entertainment work, instructional, advertisement, gaming, social networking, and so on. The audio-video work may be a defined narrative. The data structure may further include an ordered arrangement of media components for the defined narrative, for example audio video clips or an episode of a series and the like.

At 2115, the processor determines associations of the video clips with a set of characteristic parameters indicating user-perceivable characteristics of a media segment or other video component. For example, the processor may refer to a data structure 350 for example as shown in FIG. 3B and/or structure 1900 as shown in FIG. 19 to retrieve a list of semantic tags and preference information.

At 2120, a processor receives user preference data relating to a person or one or more groups of people via a computer network, which may include information about a travel route of a trip on a vehicle 101.

At 2125, the processor selects preferred video clips from the data structure based at least partly on the user profile data. In an aspect, the selected or configured preferred video clips may refer to at least one preference profile parameter shown in FIG. 7, and as more specific examples, in FIGS. 8A-8C. The video clips may include audio video work of, for example entertainment, instructional information, video gaming, advertisement, and social networking. The video clips may also include xR content.

At 2130, the processor automatically assembles or produces a video including the preferred video clips. In an aspect, the processor uses a predictive analytics algorithm to determine and select preferred video clips as described herein to automatically produce the video.

At 2135, a processor provides the video to a video player device operated by the person or by at least one of the groups of people, for example, to content consumption apparatus 300 in or on vehicles 101 boarded by the user. In an aspect, the providing occurs by streaming the video or by pushing one or more video clip files. In an aspect, a content production server may produce the video, and a content server may stream the video. In an aspect, the media production server and the media content server may be co-located or may be combined in one server. In another aspect, a media player device may produce the media content. Other logical and physical arrangements as to where the media content is produced are also possible.

In aspects of the method 1100, the video may include a set of discrete video clips. In the alternative, the video may include modeled three-dimensional elements suitable for rendering, and the producing further may include rendering the modeled three-dimensional elements. In another aspect, the video player device may be or may include a mobile communication device, in addition to or instead of vehicle-based media players. In another aspect, the production of video may include using dataset addresses in a data structure holding the video clips. Examples of video player devices include xR output devices (e.g., xR headsets), computers (e.g., mobile), televisions, digital projectors, smartphones, personal digital assistants (PDAs), and other electronic devices, either wired or wireless or both.

Figure 22:
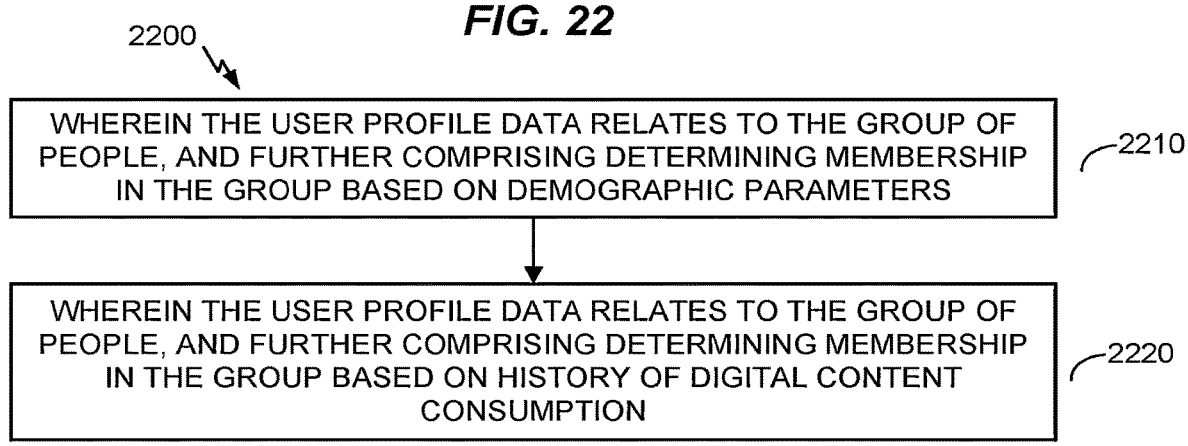
FIGS. 22-24 are flow charts illustrating further optional aspects or operations of the method diagrammed in FIG. 17.
Figure 23:
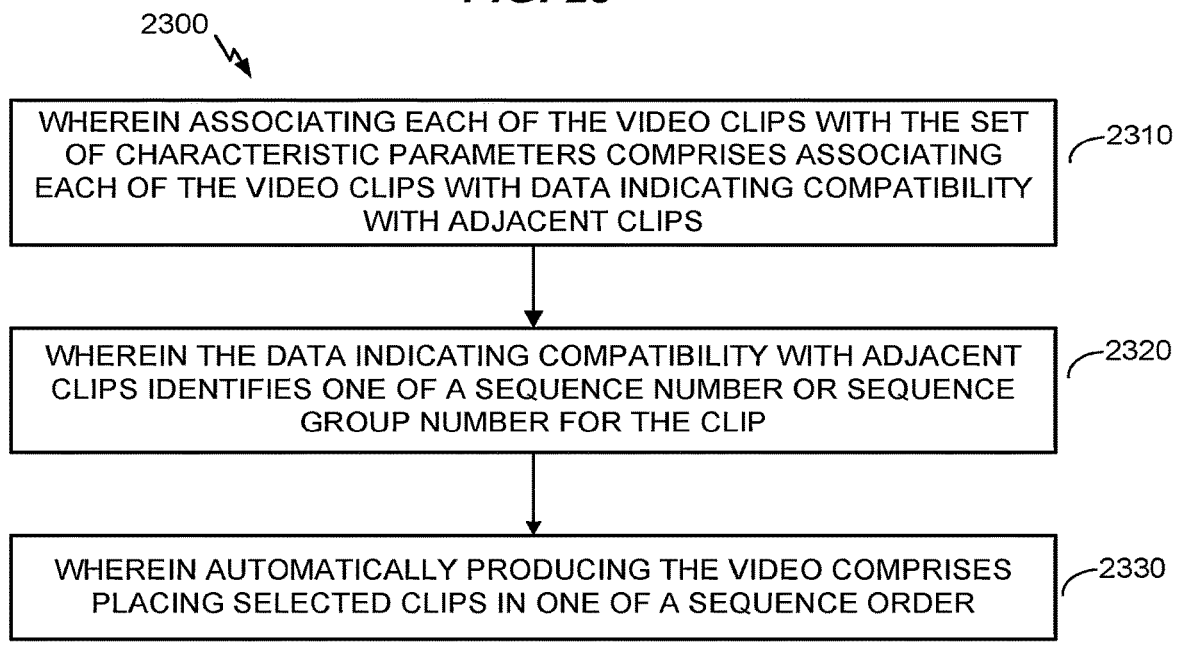
Figure 24:
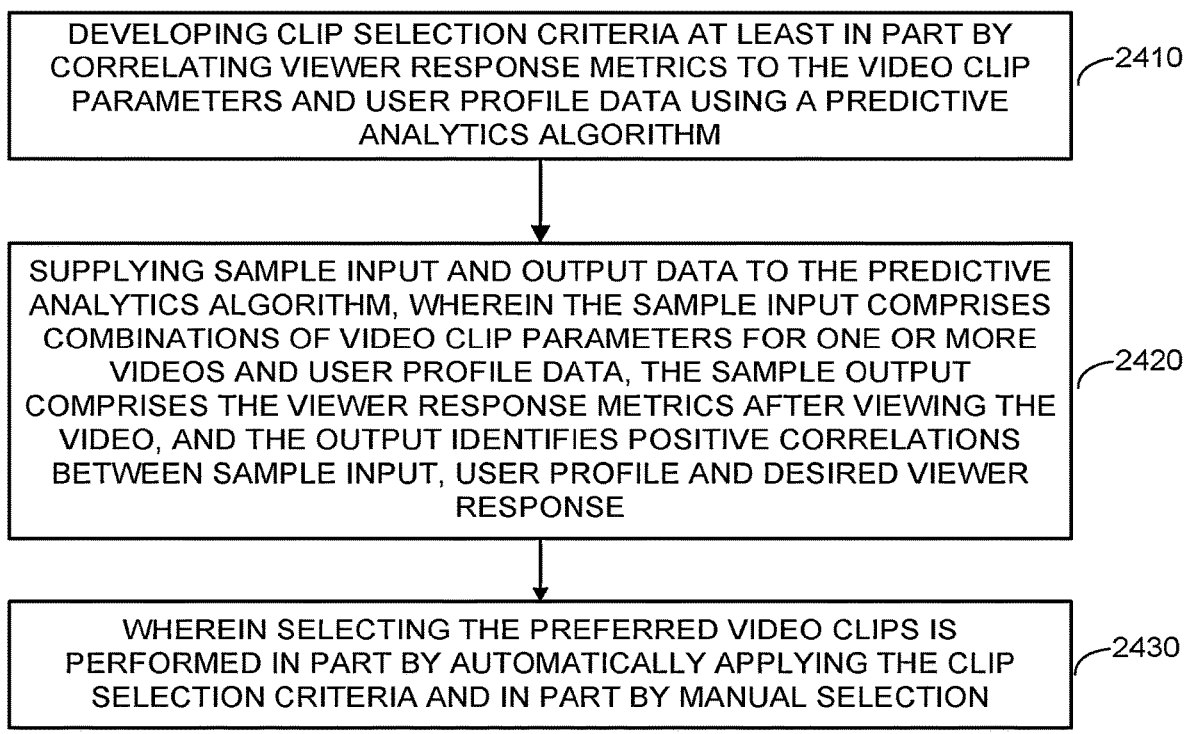

FIG. 22-24 show additional operations 2200-2430 that may optionally be included in the method 2100, in any operative order as logically permits. Any one or more of the additional operations 2200-2430 may be omitted unless needed by a downstream operation and one or more of the operations 2200-2430 may replace one or more others of the operations of the method 2100. Any useful combination of operations selected from the group consisting of the operations 2110-2430 may be performed by one or more processors of an apparatus as described herein as an independent method distinct from other useful combinations selected from the same group.

Referring to FIG. 22, the method 2100 may further include at 2210, wherein the user profile data relates to the group of people and may further include determining membership in the group based on demographic parameters. Demographic parameters may include, for example, favorite character or rides (e.g., amusement rides), social graph, status, topic for a social or business occasions such as a meeting or social event preparation, activity level or likes/dislikes for outdoor activity, favorite teams or players, favorite artists, songs, movies, or other artistic work, preferred merchandise and shopping style, culture, age, interests, sensory preferences for holiday or seasonal celebrations, or any other suitable demographic grouping or profiling for video production. At 2220, the user profile data relates to the group of people, and the process 2100 may further include determining membership in the group based on history of digital content consumption.

Referring to FIG. 23, the method 2100 may further include at 2310, wherein associating each of the video clips with the set of characteristic parameters, including associating each of the video clips with data indicating compatibility with adjacent clips. In an aspect, the compatibility with adjacent clips may be determined according to an algorithm depicted in FIGS. 17A-18. At 2320, the data indicating compatibility with adjacent clips identifies one of a sequence number or sequence group number for the clip, for example, according to an algorithm depicted in FIGS. 17A-18. At 2330, automatically producing the video may include placing selected clips in one of a sequence order, for example, according to an algorithm depicted in FIGS. 17A-18.

Referring to FIG. 24, the method 2100 may further include, at 2410, developing clip selection criteria at least in part by correlating viewer response metrics to the video clip parameters and user profile data using a predictive analytics algorithm. Example of the predictive analytics algorithm and its operation are depicted in FIGS. 15-16 and 20. At 2420, the method 2100 may further include supplying sample input and output data to the predictive analytics algorithm, wherein the sample input may include combinations of video clip parameters for one or more videos and user profile data, the sample output may include the viewer response metrics after viewing the video, and the output identifies positive correlations between sample input, user profile and desired viewer response. At 2430, the method 2100 may further include wherein selecting the preferred video clips is performed in part by automatically applying the clip selection criteria and in part by manual selection.

Figure 25:
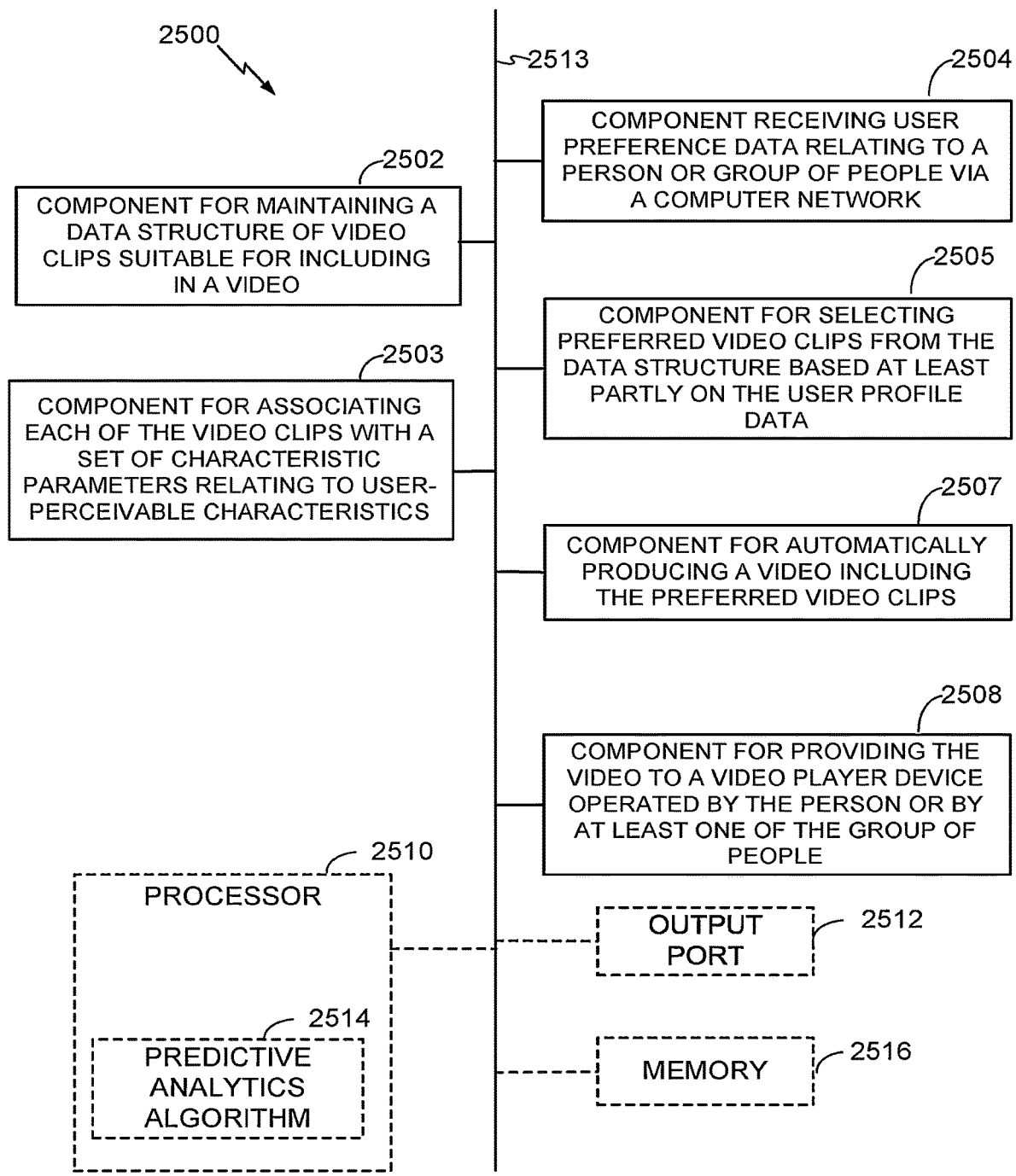
FIG. 25 is a conceptual block diagram illustrating components of an apparatus or system for producing video customized for a preference profile of a person or cohort.

FIG. 25 is a conceptual block diagram illustrating components of an apparatus or system 2500 for producing video customized for a preference profile or a person or cohort, by automatically producing a video including preferred video clips based at least in part on the user profile data, as described herein, according to one embodiment. As depicted, the apparatus or system 2500 may include functional blocks that can represent functions implemented by a processor, software, or combination thereof (e.g., firmware).

As illustrated in FIG. 25, the apparatus or system 2500 may include an electrical component 2502 for maintaining a data structure of video clips suitable for including in a video. The component 2502 may be, or may include, a means for said maintaining. Said means may include the processor 2510 coupled to the memory 2516, storage which may store the data structure (not shown), the output port 2512 and to the network interface (not shown), the processor executing an algorithm based on program instructions stored in the memory. Such algorithm may include a sequence of more detailed operations, for example, as described in connection with FIGS. 3B and 19 above; more particularly, the operations may include accessing video clips stored in a computer memory; accessing user profile data and metadata for the video clips, accessing a data structure as described in connection with FIG. 3B and optionally FIG. 19, and updating the data structure with new information derived from the video clips, user profile data, and/or its metadata. Optionally, the operations may include deriving the new information by processing the video clips using a rules-based and/or machine learning algorithm.

The apparatus or system 2500 may further include an electrical component 2503 for associating each of the video clips with a set of characteristic parameters relating to user-perceivable characteristics. The component 2503 may be, or may include, a means for said associating. Said means may include the processor 2510 coupled to the memory 2516, storage which may store the data structure (not shown), the output port 2512 and to the network interface (not shown), the processor executing an algorithm based on program instructions stored in the memory. Such algorithm may include a sequence of more detailed operations, for example, as described in connection with FIG. 18 above.

The apparatus or system 2500 may further include an electrical component 2504 receiving user preference data relating to a person or group of people via a computer network. The component 2504 may be, or may include, a means for said receiving. Said means may include the processor 2510 coupled to the memory 2516, storage which may store the data structure (not shown), the output port 2512 and to the network interface (not shown), the processor executing an algorithm based on program instructions stored in the memory. Such algorithm may include a sequence of more detailed operations, for example, as described in connection with FIG. 16 above. In an aspect, the user preference data may be received from external systems via the network interface (not shown). Such algorithm may include a sequence of more detailed operations, for example, establishing a communication session with a client device associated with at least one of a passenger or a vehicle; receiving during the session information from the client device identifying a second client device associated with the other one of a passenger or a vehicle, establishing a second communication session with the second client device, requesting and/or receiving the information about a travel route from one or both of the client device and the second client device; and determining travel event information based at least in part on the travel route and a position of the vehicle.

The apparatus or system 2500 may further include an electrical component 2505 for selecting preferred video clips from the data structure based at least partly on the user profile data. The component 2505 may be, or may include, a means for said selecting. Said means may include the processor 2510 coupled to the memory 2516, storage which may store the data structure (not shown), the output port 2512 and to the network interface (not shown), the processor executing an algorithm based on program instructions stored in the memory. Such algorithm may include a sequence of more detailed operations, for example, as described in connection with FIG. 17B above.

The apparatus or system 2500 may further include an electrical component 2507 for automatically producing a video including the preferred video clips. The component 2507 may be, or may include, a means for said associating. Said means may include the processor 2510 coupled to the memory 2516, storage which may store the data structure (not shown), the output port 2512 and to the network interface (not shown), the processor executing an algorithm based on program instructions stored in the memory. Such algorithm may include a sequence of more detailed operations, for example, as described in connection with FIG. 20 above.

The apparatus or system 2500 may further include an electrical component 2508 for providing the video to a video player device operated by the person or by at least one of the group of people. The component 2508 may be, or may include, a means for said providing. Said means may include the processor 2510 coupled to the memory 2516, storage which may store the data structure (not shown), the output port 2512 and to the network interface (not shown), the processor executing an algorithm based on program instructions stored in the memory. Such algorithm may include a sequence of more detailed operations, for example, for example, establishing a communication session with a video player device located in the one or more connected vehicles, and at least one of streaming or pushing the media content to the video player device for output in the one or more connected vehicles during travel consistent with the travel information.

The apparatus or system 2500 may further include a processor 2510 having one or more processors, which may include a digital signal processor. The processor 2510, in such case, may be in operative communication with the modules 2502-2508 via a bus 2513 or other communication coupling, for example, a network. The processor 2510 may execute a predictive analytics algorithm 2514 logically structured in memory 2516.

The apparatus or system 2500 may further include an output port 2512 operable for communicating with any external storage device, with external systems or servers, or connected vehicles over a computer network.

The apparatus or system 2500 may further include memory 2516, which may be or include a module for storing information, such as, for example, a memory device/module. The computer readable medium or the memory module 2516 may be operatively coupled to the other components of the apparatus 2500 via the bus 2513 or the like. The memory module 2516 may be adapted to store computer readable instructions and data for effecting the processes and behavior of the modules 2502-2508, and subcomponents thereof, or the processor 2510, or one or more steps of the method 2100. The memory module 2516 may retain instructions for executing functions associated with the modules 2502-2508 and any one or more of the operations described herein, for example in connection with one or more of FIGS. 3B, 15-16, 17A-17B, 18-24. While shown as being external to the memory 2516, it is to be understood that the modules 2502-2508 can exist within the memory 2516.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), televisions, digital projectors, smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device (PLD) or complex PLD (CPLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-ray™ or other format), smart cards, and flash memory devices (e.g., card, stick, or other formats). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A computer-implemented method for personalizing content delivery, the computer-implemented method comprising:
   receiving, by one or more processors, user profile data corresponding to a user, wherein the user profile data includes user preference data and route data corresponding to a travel event, and wherein the route data includes a plurality of locations along a route;
   selecting, by the one or more processors, one or more preferred video clips from a data structure based at least partly on the user preference data and the route data included in the user profile data;
   assembling, by the one or more processors, a video including the one or more preferred video clips, wherein the video includes at least one reference to at least one of the plurality of locations along the route; and
   providing, by the one or more processors, the video to an output device operated by the user.

2. The computer-implemented method of claim 1, wherein receiving the user profile data corresponding to the user comprises:
   receiving, by the one or more processors, at least one signal indicating an identity of the user boarding a vehicle for the travel event; and
   retrieving, by the one or more processors, the user profile data that corresponds to the at least one signal from a database.

3. The computer-implemented method of claim 2, wherein the output device includes a content consumption apparatus located in or on the vehicle.

4. The computer-implemented method of claim 1, wherein assembling the video including the one or more preferred video clips comprises:
   utilizing, by the one or more processors, a predictive analytics algorithm to determine and select the one or more preferred video clips based at least partly on the user profile data.

5. The computer-implemented method of claim 1, wherein assembling the video comprises:
   retrieving, by the one or more processors, one or more video clips from a database; and
   assembling, by the one or more processors, the video to further include the one or more video clips.

6. The computer-implemented method of claim 5, the computer-implemented method further comprising:
   retrieving, by the one or more processors, a list of semantic tags corresponding to the user profile data;
   comparing, by the one or more processors, one or more characteristics of the user profile data to the list of semantic tags; and
   based on the comparing, selecting, by the one or more processors, the one or more video clips from the database.

7. The computer-implemented method of claim 1, wherein the user profile data further includes a user location, a user location context, user social media data, a user subscription status, and/or user travel context data.

8. A computer system for personalizing content delivery, the computer system comprising:
   a memory having processor-readable instructions stored therein; and
   one or more processors configured to access the memory and execute the processor-readable instructions, which when executed by the one or more processors configures the one or more processors to perform a plurality of functions, including functions for:
- receiving, by the one or more processors, user profile data corresponding to a user, wherein the user profile data includes user preference data and route data corresponding to a travel event, and wherein the route data includes a plurality of locations along a route;
- selecting, by the one or more processors, one or more preferred video clips from a data structure based at least partly on the user preference data and the route data included in the user profile data;
- assembling, by the one or more processors, a video including the one or more preferred video clips, wherein the video includes at least one reference to at least one of the plurality of locations along the route; and
- providing, by the one or more processors, the video to an output device operated by the user.

9. The computer system of claim 8, wherein receiving the user profile data corresponding to the user comprises:
- receiving, by the one or more processors, at least one signal indicating an identity of the user boarding a vehicle for the travel event; and
- retrieving, by the one or more processors, the user profile data that corresponds to the at least one signal from a database.

10. The computer system of claim 9, wherein the output device includes a content consumption apparatus located in or on the vehicle.

11. The computer system of claim 8, wherein assembling the video including the one or more preferred video clips comprises:
- utilizing, by the one or more processors, a predictive analytics algorithm to determine and select the one or more preferred video clips based at least partly on the user profile data.

12. The computer system of claim 8, wherein assembling the video comprises:
- retrieving, by the one or more processors, one or more video clips from a database; and
- assembling, by the one or more processors, the video to further include the one or more video clips.

13. The computer system of claim 12, the functions further comprising:
- retrieving, by the one or more processors, a list of semantic tags corresponding to the user profile data;
- comparing, by the one or more processors, one or more characteristics of the user profile data to the list of semantic tags; and
- based on the comparing, selecting, by the one or more processors, the one or more video clips from the database.

14. The computer system of claim 8, wherein the user profile data further includes a user location, a user location context, user social media data, a user subscription status, and/or user travel context data.

15. A non-transitory computer-readable medium containing instructions for personalizing content delivery, the instructions comprising:
- receiving user profile data corresponding to a user, wherein the user profile data includes user preference data and route data corresponding to a travel event, and wherein the route data includes a plurality of locations along a route;
- selecting one or more preferred video clips from a data structure based at least partly on the user preference data and the route data included in the user profile data;
- assembling a video including the one or more preferred video clips, wherein the video includes at least one reference to at least one of the plurality of locations along the route; and
- providing the video to an output device operated by the user.

16. The non-transitory computer-readable medium of claim 15, wherein receiving the user profile data corresponding to the user comprises:
- receiving at least one signal indicating an identity of the user boarding a vehicle for the travel event; and
- retrieving the user profile data that corresponds to the at least one signal from a database.

17. The non-transitory computer-readable medium of claim 16, wherein the output device includes a content consumption apparatus located in or on the vehicle.

18. The non-transitory computer-readable medium of claim 15, wherein assembling the video including the one or more preferred video clips comprises:
- utilizing a predictive analytics algorithm to determine and select the one or more preferred video clips based at least partly on the user profile data.

19. The non-transitory computer-readable medium of claim 15, wherein assembling the video comprises:
- retrieving one or more video clips from a database; and
- assembling the video to further include the one or more video clips.

20. The non-transitory computer-readable medium of claim 19, the instructions further comprising:
- retrieving a list of semantic tags corresponding to the user profile data;
- comparing one or more characteristics of the user profile data to the list of semantic tags; and
- based on the comparing, selecting the one or more video clips from the database.

* * * * *

UNITED STATES PATENT AND TRADEMARK OFFICE
CERTIFICATE OF CORRECTION

PATENT NO. : 12,506,919 B2
APPLICATION NO. : 18/740721
DATED : December 23, 2025
INVENTOR(S) : Justin Herz et al.

Page 1 of 1

It is certified that error appears in the above-identified patent and that said Letters Patent is hereby corrected as shown below:

In the Specification

In Column 1 Lines 8-10 under the "CROSS-REFERENCE TO RELATED APPLICATION(S)" header, delete "This patent application is a continuation of and claims the benefit of priority to U.S. Application No. 17/311,682, filed on June 7, 2021, the entirety of which is incorporated in its entirety herein by reference."

Insert --This patent application is a continuation of, and claims the benefit of priority to, U.S. Application No. 17/311,682, filed on June 7, 2021, now U.S. Patent No. 12,015,817, which is a National Stage of PCT/US2019/065095, filed on December 6, 2019, which claims the benefit of priority to U.S. Provisional Application No. 62/777,025, filed on December 7, 2018, the entireties of which are incorporated herein by reference.--

Signed and Sealed this
Tenth Day of February, 2026

John A. Squires
*Director of the United States Patent and Trademark Office*